US012811634B2

(12) United States Patent
Huang et al.

(10) Patent No.: US 12,811,634 B2
(45) Date of Patent: Nov. 24, 2026

(54) CHANNEL STATE INFORMATION FEEDBACK FOR MULTIPLE TRANSMISSION RECEPTION POINTS

(71) Applicant: QUALCOMM INCORPORATED, San Diego, CA (US)

(72) Inventors: Min Huang, Beijing (CN); Chao Wei, Beijing (CN); Yu Zhang, San Diego, CA (US); Chenxi Hao, Beijing (CN); Liangming Wu, Beijing (CN); Qiaoyu Li, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 17/759,060

(22) PCT Filed: Jan. 20, 2020

(86) PCT No.: PCT/CN2020/073126
§ 371 (c)(1),
(2) Date: Jul. 19, 2022

(87) PCT Pub. No.: WO2021/146829
PCT Pub. Date: Jul. 29, 2021

(65) Prior Publication Data
US 2023/0040058 A1 Feb. 9, 2023

(51) Int. Cl.
*H04B 7/0456* (2017.01)

(52) U.S. Cl.
CPC .................................. *H04B 7/0456* (2013.01)

(58) Field of Classification Search
CPC ................ H04B 7/0456; H04B 7/0695; H04B 7/0639; H04B 7/024; H04B 7/066
See application file for complete search history.

(56) References Cited

U.S. PATENT DOCUMENTS 10,476,781 B2 11/2019 Luo et al.
2009/0141824 A1* 6/2009 Xia ...................... H04B 7/0639 375/267

(Continued)

FOREIGN PATENT DOCUMENTS

CN 109391404 A 2/2019
CN 110326228 A 10/2019

(Continued)

OTHER PUBLICATIONS

R1-1711031, CSI feedback for multi-TRP, Ericsson, 3GPP TSG-RAN WG1 #89ah-NR, China, Jun. 27-30, 2017 (Year: 2017).*

(Continued)

*Primary Examiner* — Aristocratis Fotakis
(74) *Attorney, Agent, or Firm* — Holland & Hart LLP/QUALCOMM Incorporated

(57) ABSTRACT

Methods, systems, and devices for wireless communications are described to support communication between a base station and a user equipment (UE) via multiple transmission reception points (TRPs). The base station may configure the UE to report a precoding matrix indicator (PMI) for various transmission modes, including one or more transmission modes for multiple TRPs. The UE may determine and report first PMI to the base station for each single TRP transmission mode, and the base station may use the first PMI to determine a precoding matrix for each TRP. The UE may determine and report partial PMI to the base station for the one or more multi-TRP transmission modes. The base station may use respective partial PMI to determine a precoding matrix for each multi-TRP transmission mode and may communicate with the UE using the determined precoding matrix or matrices.

35 Claims, 21 Drawing Sheets

(56) References Cited

U.S. PATENT DOCUMENTS

| | | | | |
|---|---|---|---|---|
| 2012/0113897 | A1* | 5/2012 | Thiele | H04B 7/0452 370/328 |
| 2018/0054348 | A1 | 2/2018 | Luo et al. | |
| 2018/0332567 | A1 | 11/2018 | John Wilson et al. | |
| 2019/0223161 | A1 | 7/2019 | Muruganathan et al. | |
| 2019/0334594 | A1* | 10/2019 | Jin | H04L 25/0391 |
| 2020/0220591 | A1* | 7/2020 | Zhang | H04B 7/046 |
| 2020/0383091 | A1* | 12/2020 | Park | H04W 72/23 |
| 2021/0143870 | A1* | 5/2021 | Faxér | H04L 5/0057 |
| 2021/0143878 | A1* | 5/2021 | Suh | H04B 7/024 |
| 2021/0144700 | A1* | 5/2021 | Lee | H04L 5/0094 |
| 2021/0273692 | A1* | 9/2021 | Gao | H04B 7/024 |
| 2022/0094399 | A1* | 3/2022 | Gao | H04B 7/0417 |
| 2022/0124768 | A1* | 4/2022 | Frenne | H04L 1/1819 |
| 2022/0302981 | A1* | 9/2022 | Liu | H04B 7/0632 |
| 2022/0376758 | A1* | 11/2022 | Leng | H04W 72/23 |
| 2023/0291454 | A1* | 9/2023 | Chou | H04L 5/0057 370/252 |
| 2023/0292310 | A1* | 9/2023 | Li | H04W 72/23 |
| 2023/0370861 | A1* | 11/2023 | Hurd | H04B 7/024 |

FOREIGN PATENT DOCUMENTS

| | | | |
|---|---|---|---|
| WO | WO-2018038862 | | 3/2018 |
| WO | WO-2018229078 | A1 | 12/2018 |
| WO | 2019144377 | A1 | 8/2019 |
| WO | 2020006755 | A1 | 1/2020 |

OTHER PUBLICATIONS

R1-1718737, CSI feedback for multi-TRP, Ericsson, 3GPP TSG RAN WG1 Meeting 90bis, Prague, CZ, Oct. 9-13, 2017 (Year: 2017).*

R1-1912822, Remaining Issues on CSI enhancement for MU-MIMO support, Apple, 3GPP TSG RAN WG1 #99, Reno, USA, Nov. 18-22, 2019 (Year: 2019).*

CATT: "Discussion on CSI Feedback for Multi TRP Transmission," 3GPP TSG RAN WG1 #90, R1-1712375, Prague, Czechia, Aug. 21-25, 2017 (Aug. 25, 2017), 4 pages.

Ericsson: "CSI Feedback for Multi-TRP," 3GPP TSG-RAN WG1 NRAd Hoc #3, R1-1716363, Sep. 18-21, 2017 (Sep. 21, 2017), 9 pages.

International Search Report and Written Opinion—PCT/CN2020/073126—ISA/EPO—Oct. 23, 2020.

Ericsson: "On CSI Enhancements for MU-MIMO," 3GPP TSG RAN WG1 Meeting RAN1 #96-bis, R1-1905519, 3rd Generation Partnership Project (3GPP), Mobile Competence Centre, 650, Route Des Lucioles, F-06921, Sophia-Antipolis Cedex, France, Apr. 8, 2019, pp. 1-13, XP051707583, pp. 1, 6-9, Section 2, p. 3.

Supplementary Partial European Search Report—EP20914821—Search Authority—Munich—Dec. 4, 2023 (201625EP).

ZTE: "Multi-TRP Transmission and Interference Coordination", 3GPP TSG RAN WG1 Meeting #88, R1-1707117, Hangzhou, P.R. China, May 15-19, 2017, 9 Pages.

Apple: "Considerations on CSI Enhancement for MU-MIMO Support", R1-1910967, 3GPP TSG RAN WG1 #98bis, Chongqing, China, Oct. 14-20, 2019, Oct. 20, 2019, pp. 1-8.

Huawei., et al., "Discussion on CSI Enhancement", 3GPP TSG RAN WG1 Meeting #98, R1-1908065, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019, 14 Pages, XP051764688, Section 5, p. 9-10.

Supplementary European Search Report—EP20914821—Search Authority—Munich—Mar. 5, 2024 (201625EP).

* cited by examiner

CHANNEL STATE INFORMATION FEEDBACK FOR MULTIPLE TRANSMISSION RECEPTION POINTS

CROSS REFERENCES

The present application is a 371 national stage filing of International PCT Application No. PCT/CN2020/073126 by HUANG et al. entitled "CHANNEL STATE INFORMATION FEEDBACK FOR MULTIPLE TRANSMISSION RECEPTION POINTS," filed Jan. 20, 2020; which is assigned to the assignee hereof, and which is expressly incorporated by reference in its entirety herein.

FIELD OF TECHNOLOGY

The following relates generally to wireless communications and more specifically to channel state information (CSI) feedback for multiple transmission reception points (TRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may communicate with a UE via multiple transmission reception points (TRPs). The base station may request some feedback (e.g., channel state information (CSI) feedback, such as a precoding matrix indicator (PMI)) from the UE for each TRP and for combinations of TRPs. In some cases, the feedback may result in increased overhead and related system latency.

SUMMARY

The described techniques relate to improved methods, systems, devices, and apparatuses that support channel state information (CSI) feedback for multiple transmission reception points (TRPs). Generally, the described techniques provide for communication between a base station and a user equipment (UE) in the uplink and/or downlink via multiple TRPs. The communications between the base station and the UE may include one or more multi-TRP transmission modes, and the base station may configure the UE to report CSI that includes precoding matrix information such as a precoding matrix indicator (PMI) for various transmission modes (e.g., including the one or more multi- TRP transmission modes). For example, the base station may configure the UE to report PMI for individual ones of the multiple TRPs (e.g., for a first TRP, for a second TRP) and for one or more combinations of different ones of the multiple TRPs (e.g., for a combination of the first and second TRPs).

The UE may independently determine and report first (e.g., full, complete) PMI to the base station for each single TRP transmission mode, using one or more approaches (e.g., including or not including frequency compression). For example, the UE may determine or identify one or more matrices for each TRP independently of any other TRP and may transmit the one or more matrices to the base station. The base station may use respective matrices, or the information included in the respective matrices, to determine a precoding matrix for each individual TRP. The UE may additionally determine and report second (e.g., partial, incomplete, reduced, alternative) PMI to the base station for one or more transmission modes that include combinations of TRPs (e.g., multi-TRP transmission modes).

In a first example, the second PMI may indicate a set of columns for each precoding matrix associated with each respective TRP of a combination of TRPs (e.g., in a multi-TRP transmission mode). In a second example, the second PMI may include a matrix associated with each respective TRP of a combination of TRPs (e.g., in a multi-TRP transmission mode). The base station may use respective second PMI, or the information included in the respective second PMI, to determine a precoding matrix for each transmission mode including multiple TRPs, possibly in conjunction with the respective precoding matrices for the individual TRPs included in the multiple TRPs associated with a given transmission multi-TRP transmission mode (or the associated first PMI). In the first example, the base station may determine a precoding matrix by performing a block diagonalization on the indicated sets of columns. In the second example, the base station may determine a precoding matrix by performing a block diagonalization on a product of one or more matrices (e.g., or columns thereof) included in a respective TRP's first PMI and a respective matrix included in the second PMI. The base station may use a precoding matrix determined using the second PMI for communications with the UE.

A method of wireless communication is described. The method may include receiving, at a UE, a request for precoding matrix information related to a set of transmission modes associated with a set of TRPs for a base station, transmitting, from the UE to the base station, a respective precoding matrix information report for each transmission mode in a first subset of the set of transmission modes, and transmitting, from the UE to the base station, a respective partial precoding matrix information report for each transmission mode in a second subset of the set of transmission modes.

An apparatus for wireless communication is described. The apparatus may include a processor, memory coupled with the processor, and instructions stored in the memory. The instructions may be executable by the processor to cause the apparatus to receive, at a UE, a request for precoding matrix information related to a set of transmission modes associated with a set of TRPs for a base station, transmit, from the UE to the base station, a respective precoding matrix information report for each transmission mode in a first subset of the set of transmission modes, and transmit, from the UE to the base station, a respective partial precoding matrix information report for each transmission mode in a second subset of the set of transmission modes.

Another apparatus for wireless communication is described. The apparatus may include means for receiving, at a UE, a request for precoding matrix information related to a set of transmission modes associated with a set of TRPs for a base station, transmitting, from the UE to the base station, a respective precoding matrix information report for each transmission mode in a first subset of the set of transmission modes, and transmitting, from the UE to the base station, a respective partial precoding matrix information report for each transmission mode in a second subset of the set of transmission modes.

A non-transitory computer-readable medium storing code for wireless communication is described. The code may include instructions executable by a processor to receive, at a UE, a request for precoding matrix information related to a set of transmission modes associated with a set of TRPs for a base station, transmit, from the UE to the base station, a respective precoding matrix information report for each transmission mode in a first subset of the set of transmission modes, and transmit, from the UE to the base station, a respective partial precoding matrix information report for each transmission mode in a second subset of the set of transmission modes.

In some examples of the method, apparatuses, and non-transitory computer-readable medium described herein, each transmission mode in the first subset of the set of transmission modes corresponds to a single TRP of the set of TRPs, and each transmission mode in the second subset of the set of transmission modes corresponds to at least two TRPs of the set of TRPs.

Some examples of the method, apparatuses, and non-transitory computer-readable medium described herein may further include operations, features, means, or instructions for determining, for each transmission mode in the first subset, a respective first set of values for a respective spatial domain basis matrix, and determining, for each transmission mode in the first subset, a respective second set of values for a respective coefficient matrix, each element of the respective coefficient matrix including a coefficient for a corresponding beam within a corresponding transmission layer, where the respective precoding matrix information report for a transmission mode in the first subset indicates the respective first set of values and the respective second set of values for the transmission mode in the first subset.

In some examples of the method, apparatuses, and non-transitory computer-readable medium described herein, the coefficient for the corresponding beam may be based on an amplitude coefficient and a phase coefficient for the corresponding beam.

Some examples of the method, apparatuses, and non-transitory computer-readable medium described herein may further include operations, features, means, or instructions for determining, for a transmission mode in the second subset, a first quantity of columns within a first precoding matrix for a first transmission mode in the first subset and a second quantity of columns within a second precoding matrix for a second transmission mode in the first subset, where the first precoding matrix for the first transmission mode in the first subset may be based on the respective spatial domain basis matrix and the respective coefficient matrix for the first transmission mode in the first subset, the second precoding matrix for the second transmission mode in the first subset may be based on the respective spatial domain basis matrix and the respective coefficient matrix for the second transmission mode in the first subset, and the respective partial precoding matrix information report for the transmission mode in the second subset indicates the first quantity of columns and the second quantity of columns.

Some examples of the method, apparatuses, and non-transitory computer-readable medium described herein may further include operations, features, means, or instructions for determining, for a transmission mode in the second subset, a first set of one or more columns within a first precoding matrix for a first transmission mode in the first subset and a second set of one or more columns within a second precoding matrix for a second transmission mode in the first subset, where the first precoding matrix for the first transmission mode in the first subset may be based on the respective spatial domain basis matrix and the respective coefficient matrix for the first transmission mode in the first subset, the second precoding matrix for the second transmission mode in the first subset may be based on the respective spatial domain basis matrix and the respective coefficient matrix for the second transmission mode in the first subset, and the respective partial precoding matrix information report for the transmission mode in the second subset indicates the first set of one or more columns and the second set of one or more columns.

Some examples of the method, apparatuses, and non-transitory computer-readable medium described herein may further include operations, features, means, or instructions for determining, for a transmission mode in the second subset, a first set of values for a first alternative coefficient matrix and a second set of values for a second alternative coefficient matrix, where a precoding matrix for the transmission mode in the second subset may be based on a first product of the respective spatial domain basis matrix for the first transmission mode in the first subset and the first alternative coefficient matrix and at least in part on a second product of the respective spatial domain basis matrix for the second transmission mode in the first subset and the second alternative coefficient matrix, and the respective partial precoding matrix information report for the transmission mode in the second subset indicates the first set of values and the second set of values.

In some examples of the method, apparatuses, and non-transitory computer-readable medium described herein, the precoding matrix for the transmission mode in the second subset may be based on a block diagonalization of the first product and the second product.

Some examples of the method, apparatuses, and non-transitory computer-readable medium described herein may further include operations, features, means, or instructions for determining, for a transmission mode in the second subset, a first set of values for a first alternative coefficient matrix and a second set of values for a second alternative coefficient matrix, and determining, for the transmission mode in the second subset, a first set of one or more columns within the respective spatial domain basis matrix for a first transmission mode in the first subset and a second set of one or more columns within the respective spatial domain basis matrix for a second transmission mode in the first subset, where a precoding matrix for the transmission mode in the second subset may be based on a first product of the first set of one or more columns and the first alternative coefficient matrix and at least in part on a second product of the second set of one or more columns and the second alternative coefficient matrix, and the respective partial precoding matrix information report for the transmission mode in the second subset indicates the first set of values, the second set of values, the first set of one or more columns, and the second set of one or more columns.

In some examples of the method, apparatuses, and non-transitory computer-readable medium described herein, the precoding matrix for the transmission mode in the second subset may be based on a block diagonalization of the first product and the second product.

In some examples of the method, apparatuses, and non-transitory computer-readable medium described herein, the respective first set of values for a transmission mode corresponds to a set of one or more codebook indices for a precoding matrix for the transmission mode.

Some examples of the method, apparatuses, and non-transitory computer-readable medium described herein may further include operations, features, means, or instructions for determining, for each transmission mode in the first subset, a respective first set of values for a respective spatial domain basis matrix, determining, for each transmission mode in the first subset, a respective second set of values for a respective coefficient matrix, where elements of the coefficient matrix include linear combination coefficients for a set of beams, and determining, for each transmission mode in the first subset, a respective third set of values for a respective frequency domain basis matrix, where the respective precoding matrix information report for a transmission mode in the first subset indicates the respective first set of values, the respective second set of values, and the respective third set of values for the transmission mode in the first subset.

In some examples of the method, apparatuses, and non-transitory computer-readable medium described herein, the linear combination coefficients may be based on amplitude coefficients and phase coefficients.

Some examples of the method, apparatuses, and non-transitory computer-readable medium described herein may further include operations, features, means, or instructions for determining, for a transmission mode in the second subset, a first quantity of columns within a first precoding matrix for a first transmission mode in the first subset and a second quantity of columns within a second precoding matrix for a second transmission mode in the first subset, where the first precoding matrix for the first transmission mode in the first subset may be based on the respective spatial domain basis matrix, the respective coefficient matrix, and the respective frequency domain basis matrix for the first transmission mode in the first subset, the second precoding matrix for the second transmission mode in the first subset may be based on the respective spatial domain basis matrix, the respective coefficient matrix, and the respective frequency domain basis matrix for the second transmission mode in the first subset, and the respective partial precoding matrix information report for the transmission mode in the second subset indicates the first quantity of columns and the second quantity of columns.

Some examples of the method, apparatuses, and non-transitory computer-readable medium described herein may further include operations, features, means, or instructions for determining, for a transmission mode in the second subset, a first set of one or more columns within a first precoding matrix for a first transmission mode in the first subset and a second set of one or more columns within a second precoding matrix for a second transmission mode in the first subset, where the first precoding matrix for the first transmission mode in the first subset may be based on the respective spatial domain basis matrix, the respective coefficient matrix, and the respective frequency domain basis matrix for the first transmission mode in the first subset, the second precoding matrix for the second transmission mode in the first subset may be based on the respective spatial domain basis matrix, the respective coefficient matrix, and the respective frequency domain basis matrix for the second transmission mode in the first subset, and the respective partial precoding matrix information report for the transmission mode in the second subset indicates the first set of one or more columns and the second set of one or more columns.

Some examples of the method, apparatuses, and non-transitory computer-readable medium described herein may further include operations, features, means, or instructions for determining, for a transmission mode in the second subset, a first set of values for a first alternative coefficient matrix and a second set of values for a second alternative coefficient matrix, where a precoding matrix for the transmission mode in the second subset may be based on a first product of the respective spatial domain basis matrix for the first transmission mode in the first subset, the first alternative coefficient matrix, and the respective frequency domain basis matrix for the first transmission mode in the first subset and at least in part on a second product of the respective spatial domain basis matrix for the second transmission mode in the first subset, the second alternative coefficient matrix, and the respective frequency domain basis matrix for the second transmission mode in the first subset, and the respective partial precoding matrix information report for the transmission mode in the second subset indicates the first set of values and the second set of values.

In some examples of the method, apparatuses, and non-transitory computer-readable medium described herein, the precoding matrix for the transmission mode in the second subset may be based on a block diagonalization of the first product and the second product.

Some examples of the method, apparatuses, and non-transitory computer-readable medium described herein may further include operations, features, means, or instructions for determining, for a transmission mode in the second subset, a first set of values for a first alternative coefficient matrix and a second set of values for a second alternative coefficient matrix, and determining, for the transmission mode in the second subset, a first set of one or more columns within the respective spatial domain basis matrix for a first transmission mode in the first subset and a second set of one or more columns within the respective spatial domain basis matrix for a second transmission mode in the first subset, where a precoding matrix for the transmission mode in the second subset may be based on a first product of the respective spatial domain basis matrix for the first transmission mode in the first subset, the first alternative coefficient matrix, and the respective frequency domain basis matrix for the first transmission mode in the first subset and at least in part on a second product of the respective spatial domain basis matrix for the second transmission mode in the first subset, the second alternative coefficient matrix, and the respective frequency domain basis matrix for the second transmission mode in the first subset, and the respective partial precoding matrix information report for the transmission mode in the second subset indicates the first set of values, the second set of values, the first set of one or more columns, and the second set of one or more columns.

In some examples of the method, apparatuses, and non-transitory computer-readable medium described herein, the precoding matrix for the transmission mode in the second subset may be based on a block diagonalization of the first product and the second product.

In some examples of the method, apparatuses, and non-transitory computer-readable medium described herein, the respective first set of values for a transmission mode corresponds to a first set of one or more codebook indices for a precoding matrix for the transmission mode, and the respective third set of values for the transmission mode corresponds to a second set of one or more codebook indices for the precoding matrix for the transmission mode.

In some examples of the method, apparatuses, and non-transitory computer-readable medium described herein, the respective precoding matrix information report for a transmission mode in the first subset includes a first quantity of information, and the respective partial precoding matrix information report for a transmission mode in the second subset includes a second quantity of information that may be less than the first quantity of information.

In some examples of the method, apparatuses, and non-transitory computer-readable medium described herein, the respective precoding matrix information report for a transmission mode in the first subset and the respective partial precoding matrix information report for a transmission mode in the second subset may be transmitted within a single message.

In some examples of the method, apparatuses, and non-transitory computer-readable medium described herein, the respective precoding matrix information report for a transmission mode in the first subset may be transmitted within a first message, and the respective partial precoding matrix information report for a transmission mode in the second subset may be transmitted within a second message.

A method of wireless communication is described. The method may include transmitting, from a base station to a UE, a request for precoding matrix information related to a set of transmission modes associated with a set of TRPs for the base station, receiving, at the base station from the UE, a respective precoding matrix information report for each transmission mode in a first subset of the set of transmission modes, receiving, at the base station from the UE, a respective partial precoding matrix information report for each transmission mode in a second subset of the set of transmission modes, determining a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset, and communicating with the UE based on the precoding matrix for the transmission mode in the second subset.

An apparatus for wireless communication is described. The apparatus may include a processor, memory coupled with the processor, and instructions stored in the memory. The instructions may be executable by the processor to cause the apparatus to transmit, from a base station to a UE, a request for precoding matrix information related to a set of transmission modes associated with a set of TRPs for the base station, receive, at the base station from the UE, a respective precoding matrix information report for each transmission mode in a first subset of the set of transmission modes, receive, at the base station from the UE, a respective partial precoding matrix information report for each transmission mode in a second subset of the set of transmission modes, determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset, and communicate with the UE based on the precoding matrix for the transmission mode in the second subset.

Another apparatus for wireless communication is described. The apparatus may include means for transmitting, from a base station to a UE, a request for precoding matrix information related to a set of transmission modes associated with a set of TRPs for the base station, receiving, at the base station from the UE, a respective precoding matrix information report for each transmission mode in a first subset of the set of transmission modes, receiving, at the base station from the UE, a respective partial precoding matrix information report for each transmission mode in a second subset of the set of transmission modes, determining a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset, and communicating with the UE based on the precoding matrix for the transmission mode in the second subset.

A non-transitory computer-readable medium storing code for wireless communication is described. The code may include instructions executable by a processor to transmit, from a base station to a UE, a request for precoding matrix information related to a set of transmission modes associated with a set of TRPs for the base station, receive, at the base station from the UE, a respective precoding matrix information report for each transmission mode in a first subset of the set of transmission modes, receive, at the base station from the UE, a respective partial precoding matrix information report for each transmission mode in a second subset of the set of transmission modes, determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset, and communicate with the UE based on the precoding matrix for the transmission mode in the second subset.

In some examples of the method, apparatuses, and non-transitory computer-readable medium described herein, each transmission mode in the first subset of the set of transmission modes corresponds to a single TRP of the set of TRPs, and each transmission mode in the second subset of the set of transmission modes corresponds to at least two TRPs of the set of TRPs.

Some examples of the method, apparatuses, and non-transitory computer-readable medium described herein may further include operations, features, means, or instructions for determining the precoding matrix for the first transmission mode in the first subset based on the spatial domain basis matrix and the coefficient matrix.

Some examples of the method, apparatuses, and non-transitory computer-readable medium described herein may further include operations, features, means, or instructions for determining the precoding matrix for the transmission mode in the second subset based on a first set of columns within the first precoding matrix for the first transmission mode in the first subset and a second set of columns within the second precoding matrix for the second transmission mode in the first subset, where the first set of columns includes the first quantity of columns and the second set of columns includes the second quantity of columns.

In some examples of the method, apparatuses, and non-transitory computer-readable medium described herein, determining the precoding matrix for the transmission mode in the second subset may include operations, features, means, or instructions for determining a block diagonalization of the first set of columns and the second set of columns.

Some examples of the method, apparatuses, and non-transitory computer-readable medium described herein may further include operations, features, means, or instructions for determining the precoding matrix for the transmission mode in the second subset based on the first set of one or more columns within the first precoding matrix for the first transmission mode in the first subset and the second set of one or more columns within the second precoding matrix for the second transmission mode in the first subset.

In some examples of the method, apparatuses, and non-transitory computer-readable medium described herein, determining the precoding matrix for the transmission mode in the second subset may include operations, features, means, or instructions for determining a block diagonalization of the first set of one or more columns and the second set of one or more columns.

Some examples of the method, apparatuses, and non-transitory computer-readable medium described herein may further include operations, features, means, or instructions for determining the precoding matrix for the transmission mode in the second subset based on a first product of the spatial domain basis matrix for the first transmission mode in the first subset and the first alternative coefficient matrix and at least in part on a second product of a second spatial domain basis matrix for the second transmission mode in the first subset and the second alternative coefficient matrix.

In some examples of the method, apparatuses, and non-transitory computer-readable medium described herein, determining the precoding matrix for the transmission mode in the second subset may include operations, features, means, or instructions for determining a block diagonalization of the first product and the second product.

Some examples of the method, apparatuses, and non-transitory computer-readable medium described herein may further include operations, features, means, or instructions for determining the precoding matrix for a transmission mode in the second subset based on a first product of the first set of one or more columns and the first alternative coefficient matrix and at least in part on a second product of the second set of one or more columns and the second alternative coefficient matrix.

In some examples of the method, apparatuses, and non-transitory computer-readable medium described herein, determining the precoding matrix for the transmission mode in the second subset may include operations, features, means, or instructions for determining a block diagonalization of the first product and the second product.

Some examples of the method, apparatuses, and non-transitory computer-readable medium described herein may further include operations, features, means, or instructions for determining the precoding matrix for the transmission mode in the first subset based on the spatial domain basis matrix, the coefficient matrix, and the frequency domain basis matrix.

Some examples of the method, apparatuses, and non-transitory computer-readable medium described herein may further include operations, features, means, or instructions for determining the precoding matrix for the transmission mode in the second subset based on a first set of columns within the precoding matrix for the first transmission mode in the first subset and a second set of columns within the second precoding matrix for the second transmission mode in the first subset, where the first set of columns includes the first quantity of columns and the second set of columns includes the second quantity of columns.

In some examples of the method, apparatuses, and non-transitory computer-readable medium described herein, determining the precoding matrix for the transmission mode in the second subset may include operations, features, means, or instructions for determining a block diagonalization of the first set of columns and the second set of columns.

Some examples of the method, apparatuses, and non-transitory computer-readable medium described herein may further include operations, features, means, or instructions for determining the precoding matrix for the transmission mode in the second subset based on the first set of one or more columns within the precoding matrix for the transmission mode in the first subset and the second set of one or more columns within the second precoding matrix for the second transmission mode in the first subset.

In some examples of the method, apparatuses, and non-transitory computer-readable medium described herein, determining the precoding matrix for the transmission mode in the second subset may include operations, features, means, or instructions for determining a block diagonalization of the first set of one or more columns and the second set of one or more columns.

Some examples of the method, apparatuses, and non-transitory computer-readable medium described herein may further include operations, features, means, or instructions for determining a precoding matrix for a transmission mode in the second subset based on a first product of the spatial domain basis matrix for the first transmission mode in the first subset, the first alternative coefficient matrix, and the frequency domain basis matrix for the first transmission mode in the first subset and at least in part on a second product of a second spatial domain basis matrix for the second transmission mode in the first subset, the second alternative coefficient matrix, and a second frequency domain basis matrix for the second transmission mode in the first subset.

In some examples of the method, apparatuses, and non-transitory computer-readable medium described herein, determining the precoding matrix for the transmission mode in the second subset may include operations, features, means, or instructions for determining a block diagonalization of the first product and the second product.

Some examples of the method, apparatuses, and non-transitory computer-readable medium described herein may further include operations, features, means, or instructions for determining the precoding matrix for the transmission mode in the second subset based on a first product of the spatial domain basis matrix for the first transmission mode in the first subset, the first alternative coefficient matrix, and the frequency domain basis matrix for the first transmission mode in the first subset and at least in part on a second product of the second spatial domain basis matrix for the second transmission mode in the first subset, the second alternative coefficient matrix, and a second frequency domain basis matrix for the second transmission mode in the first subset.

In some examples of the method, apparatuses, and non-transitory computer-readable medium described herein, determining the precoding matrix for the transmission mode in the second subset may include operations, features, means, or instructions for determining a block diagonalization of the first product and the second product.

DETAILED DESCRIPTION

Figure 1:
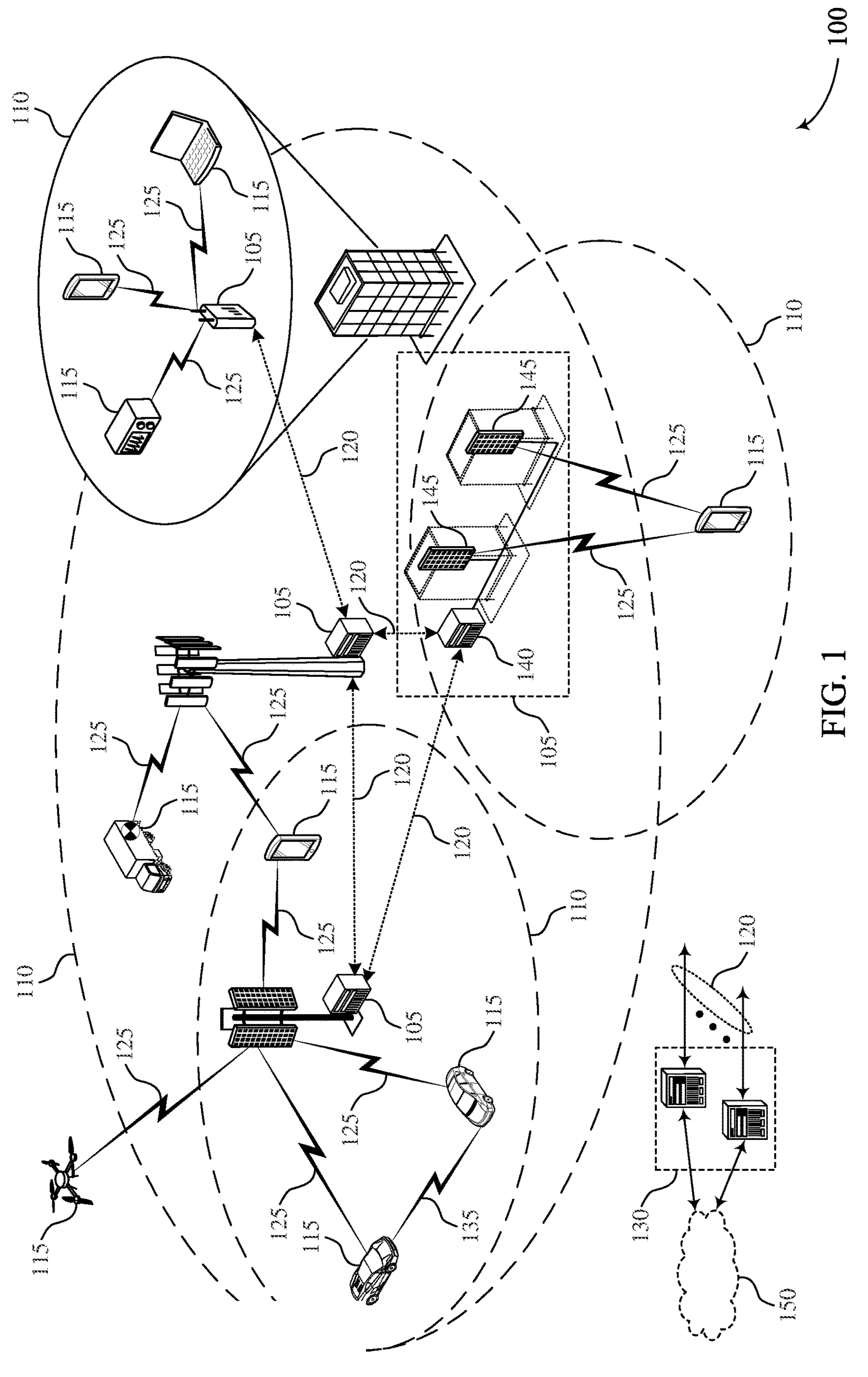
FIG. 1 illustrates an example of wireless communications system that supports channel state information (CSI) feedback for multiple transmission reception points (TRPs) in accordance with aspects of the present disclosure.

A base station may include, be coupled with, or otherwise communicate via two or more (e.g., multiple) transmission reception points (TRPs). For example, a base station may communicate with a user equipment (UE) in the uplink and/or downlink via two or more TRPs and using one or more multi-TRP transmission modes (modes in which communication occurs via at least two of the two or more TRPs). In some cases, the base station may configure the UE to report channel state information (CSI) that includes precoding matrix indicator information—which may alternatively be referred to as precoding matrix information or PMI for brevity—for various transmission modes (e.g., including the one or more multi-TRP transmission modes). For example, the base station may configure the UE to report PMI for a first TRP, for a second TRP, and for a combination of the first and second TRPs, where communication in accordance with a multi-TRP transmission mode occurs via both the first and second TRPs.

In some cases, PMI reported for multi-TRP transmission modes may increase transmission overhead, for example due to a number of CSI bits needed to transmit the PMI for multiple transmission hypotheses associated with the multi-TRP transmission modes. The increased overhead may increase latency and decrease available energy at the UE, among other examples. A modified CSI reporting scheme for multi-TRP communications may reduce a number of bits used to transmit the PMI and the corresponding CSI feedback. For example, the UE may use a PMI reporting scheme that reduces an amount of reported information for multi-TRP transmission modes above and beyond that reported for single TRP transmission modes for TRPs associated with the multi-TRP transmission modes. The PMI reporting scheme may include methods for reporting CSI feedback from the UE to the base station and may apply to PMI both with or without frequency compression.

The UE may independently determine and report first (full, complete) PMI to the base station for each single TRP transmission mode, using one or more approaches (e.g., including or not including frequency compression). For example, the UE may determine or identify one or more PMI-related matrices for each TRP independently of any other TRP and may transmit the one or more matrices to the base station. The base station may use respective matrices, or the information included in the respective matrices, to determine a precoding matrix for each TRP.

The UE may additionally determine and report second (e.g., partial, incomplete, reduced, alternative) PMI to the base station for one or more transmission modes that include combinations of TRPs (e.g., multi-TRP transmission modes). In some cases, the second PMI and the first PMI may be included in a same CSI report message, and in some cases, the second PMI and the first PMI may be included in different CSI report messages. The second PMI may include less information than the first PMI, such that the first PMI may be referred to as full PMI and the second PMI may be referred to as partial PMI.

In a first example, the second PMI may indicate a set of columns for each precoding matrix associated with each respective TRP of a combination of TRPs (e.g., individual TRPs in a multi-TRP transmission mode). For example, the second PMI may indicate (e.g., using a number of columns or using column indices) a first set of columns of a first precoding matrix associated with a first TRP and may indicate a second set of columns of a second precoding matrix associated with a second TRP.

In a second example, the second PMI may include a matrix associated with each respective TRP of a combination of TRPs (e.g., in a multi-TRP transmission mode). For example, the second PMI may include a first matrix associated with a first TRP and may include a second matrix associated with a second TRP, where the base station may use the matrices included in the second PMI and one or more matrices included in first PMI for the relevant TRPs to determine a precoding matrix for the combination of TRPs. In some cases, the second PMI may include the first and second matrices and may further indicate sets of columns in the one or more matrices of the first PMI, where the base station may use the matrices included in the second PMI and the indicated sets of columns to determine a precoding matrix using the second PMI. Herein, where PMI is discussed as including or indicating a matrix or aspects (e.g., columns) thereof, it is to be understood that the PMI may indicate values (e.g., quantization results) associated with elements of the matrix, which may in some cases be associated with one or more codebook indices for a precoding codebook.

The base station may use respective second PMI, or the information included in the respective second PMI, to determine a precoding matrix for each transmission mode including multiple TRPs (e.g., each transmission mode including a combination of TRPs). In the first example, the base station may determine a precoding matrix by performing a block diagonalization on the indicated sets of columns. In the second example, the base station may determine a precoding matrix by performing a block diagonalization on a product of one or more matrices (e.g., or columns thereof) included in a respective TRP's first PMI and a respective matrix included in the second PMI. The base station may use a precoding matrix determined using the second PMI for communications with the UE, for example, to implement beamformed communications, to reduce interference between TRPs associated with the base station, or to increase data throughput, among other examples.

Aspects of the disclosure are initially described in the context of wireless communications systems. Aspects of the disclosure are further illustrated by and described with reference to processes, a process flow, apparatus diagrams, system diagrams, and flowcharts that relate to channel state information feedback for multiple transmission reception points.

FIG. 1 illustrates an example of a wireless communications system 100 that supports CSI feedback for multiple TRPs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as “listening” according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 and a UE may communicate via multiple TRPs, where the communications may include one or more multi-TRP transmission modes. The base station 105 may configure the UE to report CSI that includes PMI for transmission modes including the one or more multi-TRP transmission modes. For example, the base station may configure the UE to report PMI for a first TRP, for a second TRP, and for a combination of the first and second TRPs. The UE may independently determine and report first PMI to the base station for each single TRP transmission mode, using one or more approaches. For example, the UE may determine or identify one or more matrices for each TRP independently of any other TRP and may transmit the one or more matrices to the base station. The base station may use respective matrices, or the information included in the respective matrices, to determine a precoding matrix for each individual TRP.

The UE may additionally determine and report second PMI to the base station for one or more transmission modes that include combinations of TRPs (e.g., multi-TRP transmission modes). In a first example, the second PMI may indicate a set of columns for each precoding matrix associated with each respective TRP of a combination of TRPs (e.g., in a multi-TRP transmission mode). In a second example, the second PMI may include a matrix associated with each respective TRP of a combination of TRPs (e.g., in a multi-TRP transmission mode). The base station may use respective second PMI, possibly in conjunction with first PMI or precoding matrices associated with individual TRPs of the combination of TRPs, to determine a precoding matrix for each transmission mode including multiple TRPs. In the first example, the base station may determine a precoding matrix by performing a block diagonalization on the indicated sets of columns. In the second example, the base station may determine a precoding matrix by performing a block diagonalization on a product of one or more matrices (e.g., or columns thereof) included in a respective TRP’s first PMI and a respective matrix included in the second PMI. The base station may use a precoding matrix determined using the second PMI for communications with the UE.

Figure 2:
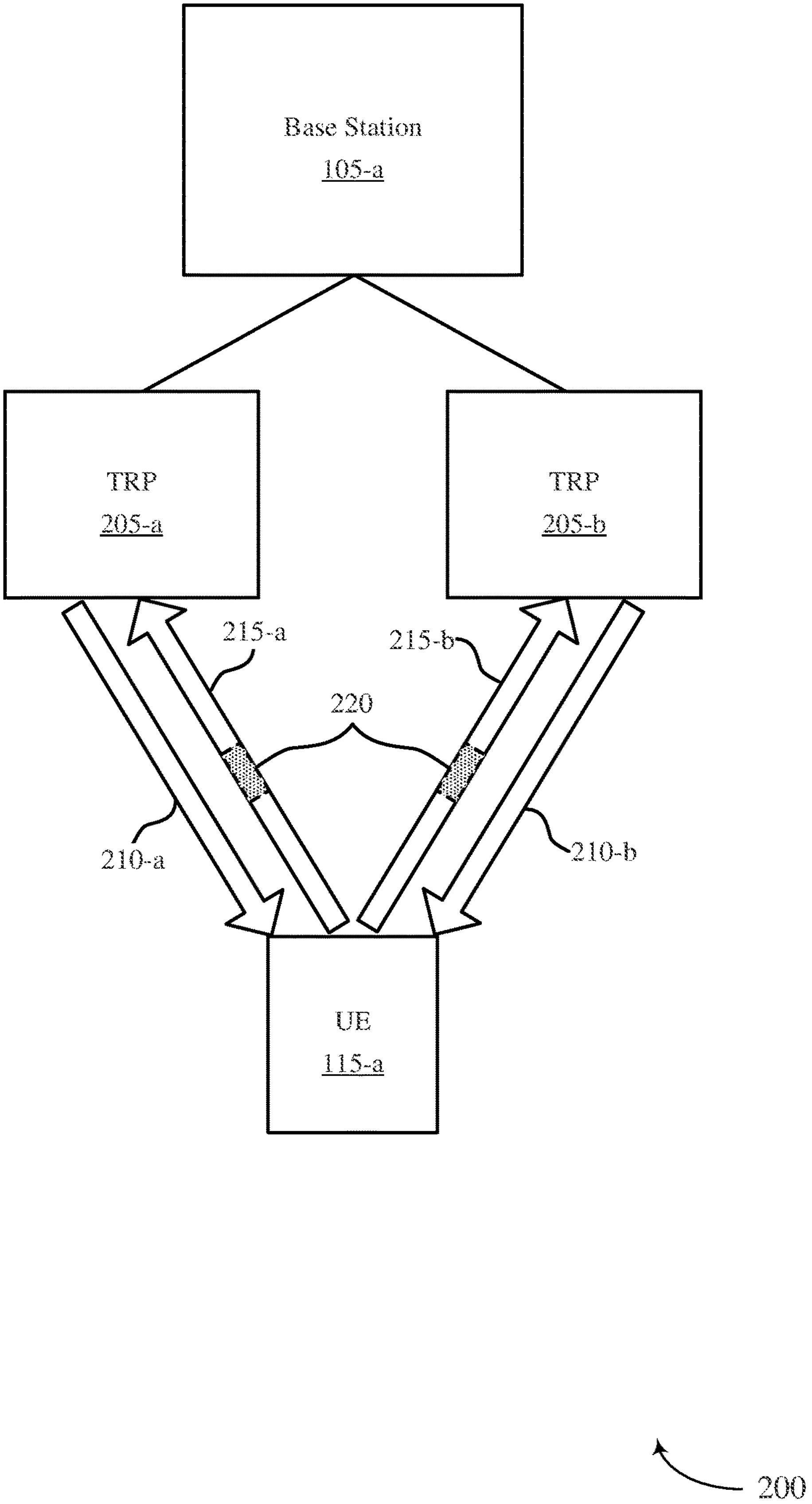
FIG. 2 illustrates an example of a wireless communications system that supports CSI feedback for multiple TRPs in accordance with aspects of the present disclosure.

FIG. 2 illustrates an example of a wireless communications system 200 that supports CSI feedback for multiple TRPs in accordance with aspects of the present disclosure. In some examples, wireless communications system 200 may implement aspects of wireless communications system 100. For example, wireless communications system 200 may include a base station 105-*a* and a UE 115-*a*, which may be examples of a base station 105 and a UE 115 described with reference to FIG. 1. Base station 105-*a* may include, be coupled with, or otherwise communicate via two or more TRPs 205. For example, base station 105-*a* may communicate with UE 115-*a* in the uplink and/or downlink via TRP 205-*a* and via TRP 205-*b* (e.g., using one or more multi-TRP transmission modes). While two TRPs 205 (e.g., TRPs 205-*a* and 205-*b*) are illustrated and described with reference to the methods described herein, it is to be understood that base station 105-*a* and UE 115-*a* may communicate via two or more TRPs, and that any method or procedure that applies to TRPs 205-*a* and TRP 205-*b* may be extended to any number of TRPs 205 (e.g., to N TRPs 205).

Base station 105-*a* may transmit from TRPs 205-*a* and 205-*b* to UE 115-*a* on downlink communication links 210 (e.g., physical downlink shared channel (PDSCH) links). Base station 105-*a* may also receive transmissions from UE 115-*a* via TRPs 205-*a* and 205-*b* on uplink communication links 215 (e.g., physical uplink share channel (PUSCH) or physical uplink control channel (PUCCH) links). TRP 205-*a* or TRP 205-*b* may be associated with one downlink communication link 210, multiple downlink communication links 210, one uplink communication link 215, multiple uplink communication links 215, or any combination thereof.

The downlink communication links 210 provided by TRPs 205-*a* and 205-*b* may increase downlink diversity gain, downlink system capacity (e.g., increase a downlink data rate), and/or downlink cell coverage. Similarly, the uplink communication links 215 provided by TRPs 205-*a* and 205-*b* may increase uplink diversity gain, uplink system capacity (e.g., increase an uplink data rate), and/or uplink cell coverage.

In some cases, base station 105-*a* may configure UE 115-*a* to report CSI feedback 220 via an uplink communication link 215, such as via a PUCCH as one example. The CSI feedback 220 may include information (e.g., including PMI) for various transmission modes (e.g., hypotheses for different combinations of TRPs 205). For example, base station 105-*a* may configure UE 115-*a* to report CSI feedback 220 for TRP 205-*a*, for TRP 205-*b*, and for a combination of TRPs 205-*a* and 205-*b*. The CSI feedback 220 for the various transmission modes may support selection of one or more TRPs 205 (e.g., selection of a transmission mode) for communications with UE 115-*a*. The CSI feedback 220 may additionally support determination of one or more precoding parameters for communications with UE 115-*a*. UE 115-*a* may transmit the CSI feedback 220 to one or both of TRPs 205-*a* and 205-*b*.

In some cases, increased amounts of PMI reported via CSI feedback 220 for multi-TRP hypotheses may increase transmission overhead (e.g., for one or more uplink channels, such as one or more PUCCHs) due to a number of CSI bits needed to transmit the PMI for the multiple hypotheses. The increased overhead may increase latency and decrease available energy at UE 115-*a*, among other examples. A modified CSI reporting scheme for multi-TRP communications may reduce or at least mitigate any increase in a number of bits used to transmit the PMI and the corresponding CSI feedback 220.

For example, base station 105-*a* may configure UE 115-*a*, or UE 115-*a* may be previously configured (e.g., according to a communications standard), to use a CSI reporting scheme that reduces an amount of information associated with PMI for multi-TRP transmission modes. A number of bits used to transmit associated CSI feedback 220 may therefore be reduced, which may reduce overhead, decrease latency, and increase energy available to UE 115-*a*. The CSI reporting scheme may include two methods or steps for reporting CSI feedback 220 from UE 115-*a* to base station 105-*a* and may apply to PMI both with or without frequency compression.

In a first step, UE 115-*a* may independently determine and report first (full, complete) PMI to base station 105-*a* for each single TRP 205 (e.g., for TRP 205-*a* and TRP 205-*b*). UE 115-*a* may use one or more approaches to determine the first PMI (e.g., as configured by base station 105-*a* or specified by a communications standard), such as the approaches described with reference to FIGS. 3A and 4A. For example, UE 115-*a* may determine a matrix $W_1$ and a matrix $W_2$ for PMI reporting associated with a configured wideband, or may determine a single matrix $W_1$ and multiple matrices $W_2$ (e.g., one for each of a set of configured sub-bands). Additionally or alternatively, UE 115-*a* may determine matrices $W_1$, $\tilde{W}_2$, and $$W_f^H.$$

Further details of matrices $W_1$, $W_2$, $\tilde{W}_2$, and $$W_f^H$$

are described elsewhere herein, including with reference to FIGS. 3 and 4.

UE 115-*a* may determine the appropriate matrices for each TRP 205 (e.g., for TRP 205-*a* or TRP 205-*b*) independently of any other TRP 205 and may transmit the matrices to base station 105-*a* (e.g., via CSI feedback 220). Base station 105-*a* may use respective matrices, or the information included in the respective matrices, to determine a precoding matrix (which may in some cases be alternatively referred to as a precoder) for each individual TRP 205 (e.g., for each transmission mode associated with just one of the TRPs 205). Base station 105-*a* may use such a precoding matrix for communications with UE 115-*a*, for example, to implement beamformed communications, to reduce interference between TRPs 205 associated with base station 105-*a*, or to increase data throughput (e.g., via MIMO operations), among other examples.

In a second step, UE 115-*a* may determine and report second (e.g., partial, incomplete, reduced, alternative) PMI to base station 105-*a* for one or more transmission modes that include combinations of TRPs 205 (e.g., for a transmission mode that includes a combination of TRPs 205-*a* and 205-*b*). In some cases, the second PMI and the first PMI may be included in a same CSI report message, and in some cases, the second PMI and the first PMI may be included in different CSI report messages. The second PMI may include less information than the first PMI, such that the first PMI may be referred to as full PMI and the second PMI may be referred to as partial PMI.

For example, the second PMI may reuse (e.g., indicate or otherwise account for some subset of) information from the first PMI, or may disregard (e.g., exclude) information associated with the first PMI, or may otherwise include less information (e.g., a smaller quantity of bits for reporting via communication link 215) than the first PMI. In one example of re-using information, each TRP 205 may transmit or receive along a selected (e.g., highest quality) beam associated with UE 115-*a*, such that PMI reporting for any mode including a given TRP 205 may include the beam index for the selected beam for that TRP 205, regardless of whether the TRP is used as part of a single TRP or a multi-TRP transmission mode. In an example of disregarding information, some transmission beams from two TRPs 205 may have similar directions (e.g., from a perspective of UE 115-*a*) and may cause interference such that some or all of these beams may be modified in a multi-TRP transmission mode.

In a first example of the second PMI, the second PMI may indicate a set of columns for each precoding matrix associated with each respective TRP 205 of a combination of TRPs 205. For example, the second PMI may indicate (e.g., using a number or using column indices) a first set of columns of a first precoding matrix associated with TRP 205-*a* and may indicate a second set of columns of a second precoding matrix associated with TRP 205-*b*.

In a second example, the second PMI may include a matrix associated with each respective TRP 205 of a combination of TRPs 205. For example, the second PMI may include a first matrix $\hat{W}_2^{(1)}$ associated with TRP 205-*a* and may include a second matrix $\hat{W}_2^{(2)}$ associated with TRP 205-*b*. In some cases, the second PMI may include the matrices and may further indicate sets of columns in matrices of the first PMI, where base station 105-*a* may use the indicated sets of columns to determine a precoding matrix using the second PMI.

Base station 105-*a* may use respective second PMI, or the information included in the respective second PMI, to determine a precoding matrix for each transmission mode including multiple TRPs 205 (e.g., including a combination of TRPs 205). In the first example, base station 105-*a* may determine a precoding matrix by performing a block diagonalization on the indicated sets of columns. In the second example, base station 105-*a* may determine a precoding matrix by performing a block diagonalization on a product of one or more matrices included a respective TRP's first PMI and a respective matrix included in the second PMI. In some cases, base station 105-*a* may determine a precoding matrix by performing a block diagonalization on a product of indicated columns of one or more matrices included a respective TRP's first PMI and a respective matrix included in the second PMI. Techniques for determining a precoding matrix for a multi-TRP transmission mode are further described with reference to FIGS. 3B and 4B.

Base station 105-*a* may use a precoding matrix determined using the second PMI for communications with UE 115-*a*, for example, to implement beamformed communications, to reduce interference between TRPs 205 associated with base station 105-*a*, or to increase data throughput (e.g., via MIMO operations), among other examples.

Figure 3A:
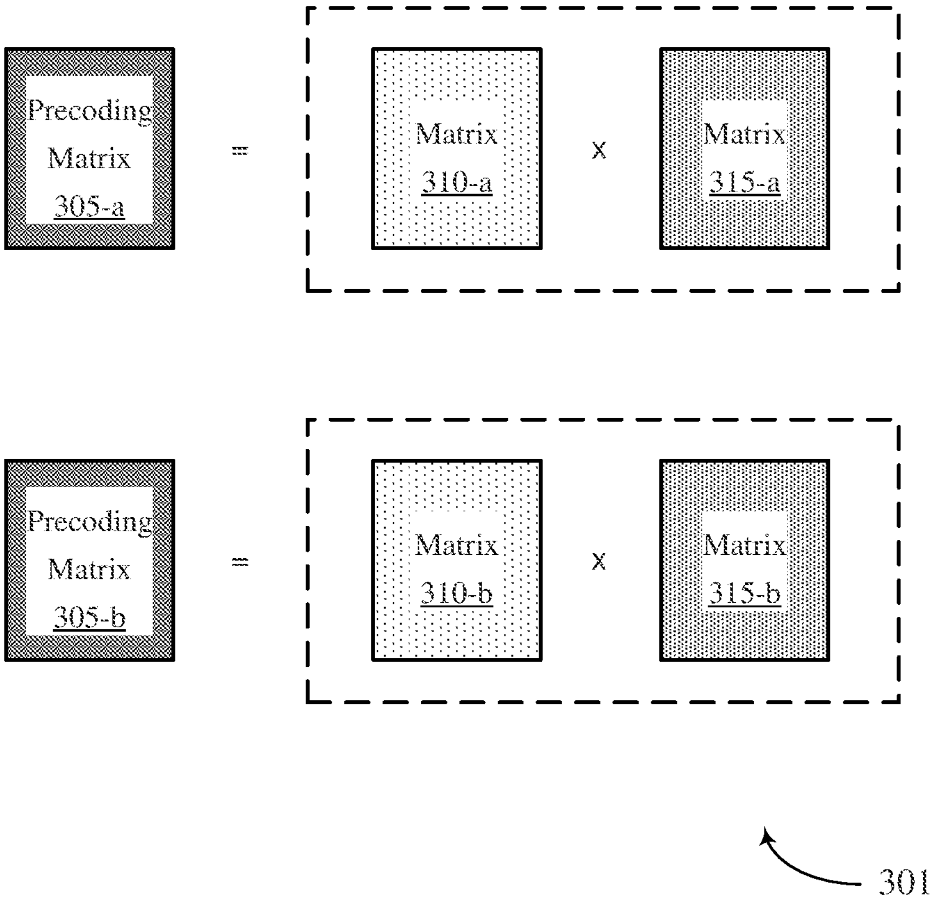
FIGS. 3A and 3B respectively illustrate examples of a process that support CSI feedback for multiple TRPs in accordance with aspects of the present disclosure.
Figure 3B:
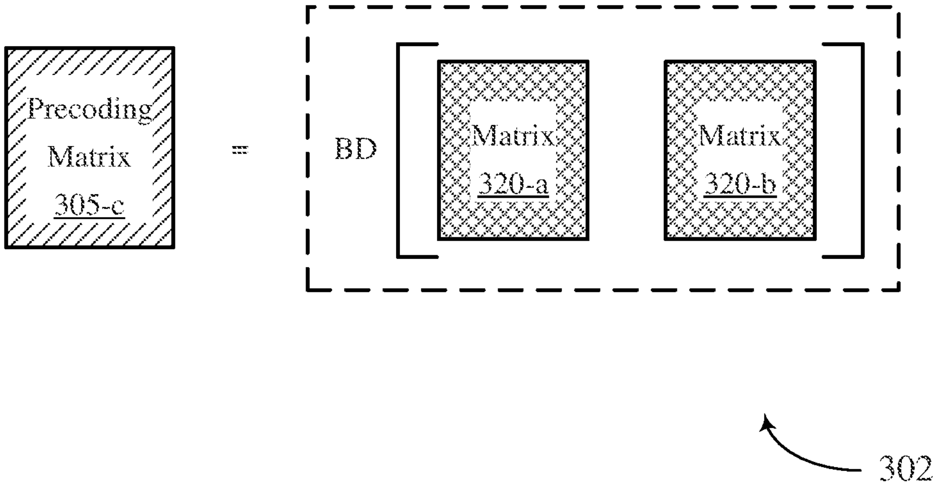

FIGS. 3A and 3B illustrate examples of respective processes 301 and 302 that support CSI feedback for multiple TRPs in accordance with aspects of the present disclosure. In some examples, processes 301 and 302 may implement aspects of wireless communications systems 100 or 200. For example, processes 301 and 302 may include information (e.g., PMI) determined by a UE 115 and transmitted to a base station 105 (e.g., via CSI), where the UE 115 and the base station 105 may be examples of a UE 115 and a base station 105 described with reference to FIGS. 1 and 2. The base station 105 and the UE 115 may communicate via multiple TRPs (e.g., two or more TRPs), using one or more multi-TRP transmission modes. Processes 301 and 302 may include methods performed by the base station 105 to determine respective precoding matrices 305 for each transmission mode associated with the base station 105 and the UE 115, where the precoding matrices 305 may be based on a codebook that does not include frequency compression.

The base station 105 and the UE 115 may communicate in the downlink and/or the uplink via a first TRP and a second TRP. The hypotheses for different transmission modes for multi-TRP communications between the base station 105 and the UE 115 may therefore include a transmission mode for each individual (e.g., single) TRP and a transmission mode for the combination of the first TRP and the second TRP. While two TRPs are described with reference to the methods herein, it is to be understood that the base station 105 and the UE 115 may communicate via two or more TRPs, and that any method or procedure that applies to the first TRP and the second TRP may be extended to any number of TRPs (e.g., to N TRPs).

The base station 105 may configure the UE 115 to report PMI for each of the one or more multi-TRP transmission modes. For example, the UE 115 may report PMI (e.g., first, full, complete PMI) individually for each of the first and second TRPs (e.g., for associated single TRP transmission modes) and may also report PMI (e.g., second, partial, incomplete, reduced, alternative PMI) for a combination of the first and second TRPs (e.g., for both TRPs together). Process 301 may be associated with methods for reporting PMI and for determining a precoding matrix 305 for individual TRPs, while process 302 may be associated with methods for reporting PMI and for determining a precoding matrix 305 for combinations of TRPs.

With reference to process 301, the UE 115 may report first PMI (e.g., via CSI and to the base station 105), including a matrix 310 and a matrix 315, for each individual TRP. For example, the UE 115 may report matrices 310-*a* and 315-*a* for the first TRP and may report matrices 310-*b* and 315-*b* for the second TRP. A matrix 310 (e.g., a matrix $W_1$) may represent a spatial domain basis matrix that includes polarization groups of beams that each correspond to a number of columns in the matrix 310 (e.g., L beams in one group corresponding to L columns). A spatial domain basis matrix may in some cases be used for compression in a spatial domain. In some cases, the matrix 310 may include two polarization groups of beams (e.g., 2L beams) and a corresponding number of columns (e.g., 2L columns). The matrix 310 may include a number of rows (e.g., P rows) that correspond to a number of horizontal antenna elements (e.g., $N_1$ elements), multiplied by a number of vertical antenna elements (e.g., $N_2$ elements), multiplied by a number of polarizations (e.g., two polarizations). A matrix 315 (e.g., a matrix $W_2$) may represent information regarding different transmission layers configured by the base station 105 (e.g., a number, $N_{layer}$, of configured layers) and may in some cases be referred to as a coefficient matrix for the corresponding TRP or single-TRP transmission mode. Each column of the matrix 315 may represent one transmission layer (e.g., as for MIMO transmissions), and each matrix element may represent a coefficient of one beam's contribution within a corresponding layer. Thus, a matrix 315 may have dimension of a number of columns that correspond to a number of layers (e.g., $N_{layer}$ columns) and a number of rows that correspond to a number of beams (e.g., 2L rows).

In some cases, the base station 105 may configure the UE 115 to report the first PMI for a wideband precoding matrix 305. As such, both matrices 310 and 315 may correspond to a wideband of system bandwidth and the UE 115 may report one matrix 310 and one matrix 315 for each individual TRP. In some cases, the base station 105 may configure the UE 115 to report the first PMI for one or more sub-band precoding matrices 305. As such, a matrix 310 may correspond to a wideband and a matrix 315 may correspond to a sub-band of system bandwidth, and the UE 115 may report one matrix 310 and multiple matrices 315 for each individual TRP (e.g., one matrix 315 for each sub-band configured or indicated by the base station 105).

The base station 105 may determine respective precoding matrices 305 (e.g., a precoder) for each individual TRP using the matrices 310 and 315 (e.g., the first PMI) reported by the UE 115. For example, the base station 105 may determine a precoding matrix 305-*a* for the first TRP by multiplying matrix 310-*a* and matrix 315-*a* and may determine a precoding matrix 305-*b* for the second TRP by multiplying matrix 310-*b* and matrix 315-*b*. In some examples, precoding matrix 305-*a* may be determined using equation (1):

$$W^{(1)}=W_1^{(1)}W_2^{(1)}, \tag{1}$$

where $W^{(1)}$ represents precoding matrix 305-*a* (e.g., the precoding matrix 305 corresponding to the first TRP), $W_1^{(1)}$ represents matrix 310-*a* (e.g., corresponding to a wideband of the first TRP), and $W_2^{(1)}$ represents matrix 315-*a* (e.g., corresponding to a wideband of the first TRP). In some examples, precoding matrix 305-*b* may be determined using equation (2):

$$W^{(2)}=W_1^{(2)}W_2^{(2)}, \tag{2}$$

where $W^{(2)}$ represents precoding matrix 305-*b* (e.g., the precoding matrix 305 corresponding to the second TRP), $W_1^{(2)}$ represents matrix 310-*b* (e.g., corresponding to a wideband of the second TRP), and $W_2^{(2)}$ represents matrix 315-*b* (e.g., corresponding to a wideband of the second TRP).

When the first PMI is associated with one or more sub-band precoding matrices 305, the base station 105 may determine a precoding matrix 305 for each sub-band of a TRP. For example, if the first TRP is associated with four sub-bands, the base station 105 may determine four precoding matrices 305 for the first TRP, one corresponding to each of the four sub-bands. A sub-band precoding matrix 305 may be determined by multiplying the wideband matrix 310 and a sub-band matrix 315 associated with the corresponding sub-band of the precoding matrix 305. In some examples, sub-band precoding matrices 305 for the first TRP may be determined using equation (3):

$$W^{(1,n)}=W_1^{(1)}W_2^{(1,n)}, \quad (3)$$

where n represents an index for sub-bands and $1 \le n \le N_{sub\text{-}band}$, $N_{sub\text{-}band}$ represents a total number of sub-bands, $W^{(1,n)}$ represents a precoding matrix 305 corresponding to the nth sub-band of the first TRP, $W_1^{(1)}$ represents matrix 310-*a* (e.g., corresponding to the wideband of the first TRP), and $W_2^{(1,n)}$ represents a matrix 315 corresponding to the nth sub-band of the first TRP. In some examples, sub-band precoding matrices 305 for the second TRP may be determined using equation (4):

$$W^{(2,n)}=W_1^{(2)}W_2^{(2,n)}, \quad (4)$$

where n represents an index for sub-bands and $1 \le n \le N_{sub\text{-}band}$, $N_{sub\text{-}band}$ represents a total number of sub-bands, $W^{(2,n)}$ represents a precoding matrix 305 corresponding to the nth sub-band of the second TRP, $W_1^{(2)}$ represents matrix 310-*b* (e.g., corresponding to the wideband of the second TRP), and $W_2^{(2,n)}$ represents a matrix 315 corresponding to the nth sub-band of the second TRP.

A matrix 310 or a matrix 315, or both, may include or correspond to values that correspond to sets of one or more codebook indices. For example, a matrix 310 or 315 may include values corresponding to sets of one or more codebooks indices defined by a wireless communications standard, where, in some cases, the one or more codebook indices may be stored at the UE 115, at the base station 105, or both.

With reference to process 302, the UE 115 may report second PMI (e.g., partial, incomplete, reduced, alternative PMI) that may include information to determine a matrix 320 for each TRP of a multi-TRP transmission mode (e.g., each of a combination of TRPs). For example, the UE 115 may report information associated with a matrix 320-*a* that corresponds to the first TRP and information associated with a matrix 320-*b* that corresponds to the second TRP.

In a first example, the second PMI reported by the UE 115 may indicate a set of columns (e.g., a set of precoding codes) for each precoding matrix 305 corresponding to a single TRP of the transmission mode. For example, the UE 115 may indicate, to the base station 105, a first set of columns of precoding matrix 305-*a* and a second set of columns of precoding matrix 305-*b*. The UE 115 may determine that the first set of columns and the second set of columns may be combined to form a precoding matrix 305-*c* that corresponds to the transmission mode (e.g., to a combination of the first TRP and the second TRP). In some cases, multiple precoding matrices 305 may correspond to a combination of the first TRP and the second TRP, for example, when one or both TRPs are associated with PMI for multiple sub-bands. Accordingly, the UE 115 may indicate a set of columns for each of the multiple precoding matrices 305.

In some cases, the UE 115 may determine that the first set of columns, or the second set of columns, or both, include a contiguous number of columns beginning at an initial column in the respective matrix 305-*a* or 305-*b*. Accordingly, the second PMI reported by the UE 115 may include a first number (e.g., a value) of the first set of contiguous columns of matrix 305-*a* (e.g., $r_1$ columns), a second number of the second set of contiguous columns of matrix 305-*b* (e.g., $r_2$ columns), or both. The base station 105 may use the first number of columns (e.g., $r_1$ columns) and matrix 305-*a* to construct matrix 320-*a* and may use the second number of columns (e.g., $r_2$ columns) and matrix 305-*b* to construct matrix 320-*b*.

The base station 105 may use the constructed matrices 320-*a* and 320-*b* to determine precoding matrix 305-*c* (e.g., corresponding to a transmission mode for both the first TRP and the second TRP). The base station 105 may determine precoding matrix 305-*c* by performing a block diagonalization (e.g., using a BD operator) on matrix 320-*a* and matrix 320-*b*. For example, the base station 105 may determine precoding matrix 305-*c* using equation (5):

$$W^{(1+2)}=BD[W^{(1)}(:,1:r_1)W^{(2)}(:,1:r_2)]. \quad (5)$$

where $W^{(1+2)}$ represents precoding matrix 305-*c* (e.g., corresponding to a transmission mode including both the first TRP and the second TRP), BD represents a block diagonalization operation, $W^{(1)}(:,1:r_1)$ represents matrix 320-*a* (e.g., formed using the first set of columns of matrix 305-*a*), $r_1$ represents the first number of columns of matrix 305-*a*, $W^{(2)}(:,1:r_2)$ represents matrix 320-*b* (e.g., formed using the second set of columns of matrix 305-*b*), and $r_2$ represents the second number of columns of matrix 305-*b*.

If one or both TRPs are associated with PMI for multiple sub-bands, the UE 115 may report the second PMI for each sub-band. The base station 105 may determine multiple sub-band precoding matrices 305 associated with the combination of the first TRP and the second TRP. For example, the base station 105 may determine the precoding matrices 305 for multiple sub-bands using equation (6):

$$W^{(1+2,n)}=BD[W^{(1,n)}(:,1:r_1)W^{(2,n)}(:,1:r_2)]. \quad (6)$$

where n represents an index for sub-bands and $1 \le n \le N_{sub\text{-}band}$, $N_{sub\text{-}band}$ represents a total number of sub-bands, $W^{(1+2,n)}$ represents precoding matrix 305-*c* for the nth sub-band (e.g., corresponding to a transmission mode including both the first TRP and the second TRP), BD represents a block diagonalization operation, $W^{(1,n)}(:,1:r_1)$ represents matrix 320-*a* for the nth sub-band (e.g., formed using the first set of columns of a matrix 305 corresponding to the nth sub-band for the first TRP), $r_1$ represents the first number of columns of the nth matrix 305 for the first TRP, $W^{(2,n)}(:,1:r_2)$ represents matrix 320-*b* for the nth sub-band (e.g., formed using the second set of columns of a matrix 305 corresponding to the nth sub-band for the second TRP), and $r_2$ represents the second number of columns of the nth matrix 305 for the second TRP.

In some cases, the UE 115 may determine that the first set of columns, or the second set of columns, or both, include non-contiguous columns in the respective matrix 305-*a* or 305-*b*. Accordingly, the second PMI reported by the UE 115 may include indices that indicate the first set of columns of matrix 305-*a*, indices that indicate the second set of columns of matrix 305-*b*, or both. The base station 105 may use the indices indicating the first set of columns and matrix 305-*a* to construct matrix 320-*a* and may use the indices indicating the second set of columns and matrix 305-*b* to construct matrix 320-*b*.

The base station 105 may use the constructed matrices 320-*a* and 320-*b* to determine precoding matrix 305-*c* (e.g., corresponding to a transmission mode for both the first TRP and the second TRP). The base station 105 may determine precoding matrix 305-*c* by performing a block diagonalization (e.g., using a BD operator) on matrix 320-*a* and matrix 320-*b*. For example, the base station 105 may determine precoding matrix 305-*c* using equation (7):

$$W^{(1+2)}=BD[W^{(1)}(:,X)W^{(2)}(:,Y)]. \quad (7)$$

where $W^{(1+2)}$ represents precoding matrix 305-*c* (e.g., corresponding to a transmission mode including both the first TRP and the second TRP), BD represents a block diagonalization operation, $W^{(1)}(:, X)$ represents matrix 320-*a* (e.g., formed using the first set of columns of matrix 305-*a*), X represents the indices of the first set of columns of matrix 305-*a*, $W^{(2)}(:, Y)$ represents matrix 320-*b* (e.g., formed using the second set of columns of matrix 305-*b*), and Y represents the indices of the second set of columns of matrix 305-*b*.

If one or both TRPs are associated with PMI for multiple sub-bands, the UE 115 may report the second PMI for each sub-band. The base station 105 may determine multiple sub-band precoding matrices 305 associated with the combination of the first TRP and the second TRP. For example, the base station 105 may determine the precoding matrices 305 for multiple sub-bands using equation (8):

$$W^{(1+2,n)}=BD[W^{(1,n)}(:,X)W^{(2,n)}(:,Y)]. \qquad (8)$$

where n represents an index for sub-bands and $1 \le n \le N_{sub\text{-}band}$, $N_{sub\text{-}band}$ represents a total number of sub-bands, $W^{(1+2,n)}$ represents precoding matrix 305-*c* for the nth sub-band (e.g., corresponding to a transmission mode including both the first TRP and the second TRP), BD represents a block diagonalization operation, $W^{(1,n)}(:, X)$ represents matrix 320-*a* for the nth sub-band (e.g., formed using the first set of columns of a matrix 305 corresponding to the nth sub-band for the first TRP), X represents the indices of the first set of columns of the nth matrix 305 for the first TRP, $W^{(2,n)}(: Y)$ represents matrix 320-*b* for the nth sub-band (e.g., formed using the second set of columns of a matrix 305 corresponding to the nth sub-band for the second TRP), and Y represents the indices of the second set of columns of the nth matrix 305 for the second TRP.

In some examples, the UE 115 may indicate (e.g., via the second PMI) which columns are not in the first set of columns, which columns are not in the second set of columns, or both. For example, the second PMI reported by the UE 115 may include a first number (e.g., a value) of columns that do not correspond to the first set of contiguous columns of matrix 305-*a*, a second number of columns that do not correspond to the second set of contiguous columns of matrix 305-*b*, or both. The columns that do not correspond to the first set or second set of columns may be columns starting at a last column of the respective matrix 305-*a* or 305-*b* or may be columns starting at an initial column of the respective matrix 305-*a* or 305-*b*. In another example, the second PMI reported by the UE 115 may include indices that indicate columns that do not correspond to the first set of columns of matrix 305-*a*, indices that indicate columns that do not correspond to the second set of columns of matrix 305-*b*, or both. The base station 105 may use the indices or numbers indicating the columns that do not correspond to the first set of columns, and matrix 305-*a*, to construct matrix 320-*a*, and may use the indices indicating the columns that do not correspond to the second set of columns, and matrix 305-*b*, to construct matrix 320-*b*.

In a second example, the second PMI reported by the UE 115 may include a first matrix and a second matrix that may respectively be used to calculate matrices 320-*a* and 320-*b*, and which may in some cases be referred to as alternative coefficient matrices (that is, alternative $W_2$ matrices) for the associated single TRPs. In some cases, the UE 115 may report a first matrix (e.g., first alternative coefficient matrix, meaning first alternative $W_2$) for the first TRP that, when multiplied with matrix 310-*a*, gives matrix 320-*a* and may report a second matrix (e.g., second alternative coefficient matrix, meaning second alternative $W_2$) for the second TRP that, when multiplied with matrix 310-*b*, gives matrix 320-*b*.

The base station 105 may construct matrices 320-*a* and 320-*b* and may use matrices 320-*a* and 320-*b* to determine precoding matrix 305-*c* (e.g., corresponding to a transmission mode for both the first and the second TRP). The base station 105 may determine precoding matrix 305-*c* by performing a block diagonalization (e.g., using a BD operator) on matrix 320-*a* and matrix 320-*b*. For example, the base station 105 may determine precoding matrix 305-*c* using equation (9):

$$W^{(1+2)}=BD[W_1^{(1)}\hat{W}_2^{(1)}W_1^{(2)}\hat{W}_2^{(2)}], \qquad (9)$$

where $W^{(1+2)}$ represents precoding matrix 305-*c* (e.g., corresponding to a transmission mode including both the first TRP and the second TRP), BD represents a block diagonalization operation, $W_1^{(1)}$ represents matrix 310-*a* (e.g., a wideband matrix), $\hat{W}_2^{(1)}$ represents the first matrix that may be used to determine matrix 320-*a* (e.g., by multiplying with $W_1^{(1)}$), $W_1^{(2)}$ represents matrix 310-*b* (e.g., a wideband matrix), and $\hat{W}_2^{(2)}$ represents the second matrix that may be used to determine matrix 320-*b* (e.g., by multiplying with $W_1^{(2)}$).

If one or both TRPs are associated with PMI for multiple sub-bands, the UE 115 may report the second PMI for each sub-band. The base station 105 may determine multiple sub-band precoding matrices 305 associated with the combination of the first TRP and the second TRP. For example, the base station 105 may determine the precoding matrices 305 for multiple sub-bands using equation (10):

$$W^{(1+2,n)}=BD[W_1^{(1)}\hat{W}_2^{(1,n)}W_1^{(2)}\hat{W}_2^{(2,n)}], \qquad (10)$$

where n represents an index for sub-bands and $1 \le n \le N_{sub\text{-}band}$, $N_{sub\text{-}band}$ represents a total number of sub-bands, $W^{(1+2,n)}$ represents precoding matrix 305-*c* for the nth sub-band (e.g., corresponding to a transmission mode including both the first TRP and the second TRP), BD represents a block diagonalization operation, $W_1^{(1)}$ represents matrix 310-*a* (e.g., a wideband matrix), $\hat{W}_2^{(1,n)}$ represents a matrix that may be used to determine matrix 320-*a* for the nth sub-band (e.g., by multiplying with $W_1^{(1)}$), $W_1^{(2)}$ represents matrix 310-*b* (e.g., a wideband matrix), and $\hat{W}_2^{(2,n)}$ represents a matrix that may be used to determine matrix 320-*b* for the nth sub-band (e.g., by multiplying with $W_1^{(2)}$).

In some cases, the UE 115 may report a first matrix for the first TRP that, when multiplied with some columns of matrix 310-*a*, gives matrix 320-*a* and may report a second matrix for the second TRP that, when multiplied with some columns of matrix 310-*b*, gives matrix 320-*b*. The base station 105 may construct matrices 320-*a* and 320-*b* and may use matrices 320-*a* and 320-*b* to determine precoding matrix 305-*c* (e.g., corresponding to a transmission mode for both the first and the second TRP). The base station 105 may determine precoding matrix 305-*c* by performing a block diagonalization (e.g., using a BD operator) on matrix 320-*a* and matrix 320-*b*. For example, the base station 105 may determine precoding matrix 305-*c* using equation (11):

$$W^{(1+2)}=BD[W_1^{(1)}(:,X)\hat{W}_2^{(1)}W_1^{(2)}(:,Y)\hat{W}_2^{(2)}], \qquad (11)$$

where $W^{(1+2)}$ represents precoding matrix 305-*c* (e.g., corresponding to a transmission mode including both the first TRP and the second TRP), BD represents a block diagonalization operation, $W_1^{(1)}(:, X)$ represents selected columns of matrix 310-*a* (e.g., a wideband matrix), X represents indices of columns of matrix 310-*a* that may be used to determine matrix 320-*a*, $\hat{W}_2^{(1)}$ represents the first matrix that may be used to determine matrix 320-*a* (e.g., by multiplying with $W_1^{(1)}(:, X)$), $W_1^{(2)}, Y)$ represents selected columns of matrix 310-*b* (e.g., a wideband matrix), Y represents indices of columns of matrix 310-*b* that may be used to determine matrix 320-*b*, and $\hat{W}_2^{(2)}$ represents the second matrix that may be used to determine matrix 320-*b* (e.g., by multiplying with $W_1^{(2)}(:, Y)$).

If one or both TRPs are associated with PMI for multiple sub-bands, the UE 115 may report the second PMI for each sub-band. The base station 105 may determine multiple sub-band precoding matrices 305 associated with the combination of the first TRP and the second TRP. For example, the base station 105 may determine the precoding matrices 305 for multiple sub-bands using equation (12):

$$W^{(1+2,n)}=BD[W_1^{(1)}(:,X)\hat{W}_2^{(1,n)}W_1^{(2)}(:,Y)\hat{W}_2^{(2,n)}], \quad (12)$$

where $W^{(1+2,n)}$ represents the nth precoding matrix 305-*c* (e.g., corresponding to a transmission mode including both the first TRP and the second TRP), BD represents a block diagonalization operation, $W_1^{(1)}(:, X)$ represents selected columns of matrix 310-*a* (e.g., a wideband matrix), X represents indices of columns of matrix 310-*a* that may be used to determine matrices 320-*a*, $\hat{W}_2^{(1,n)}$ represents a matrix that may be used to determine matrix 320-*a* for the nth sub-band (e.g., by multiplying with $W_1^{(1)}(:, X)$), $W_1^{(2)}(:, Y)$ represents selected columns of matrix 310-*b* (e.g., a wideband matrix), Y represents indices of columns of matrix 310-*b* that may be used to determine matrix 320-*b*, and $\hat{W}_2^{(2,n)}$ represents a matrix that may be used to determine matrix 320-*b* for the nth sub-band (e.g., by multiplying with $W_1^{(2)}(:m\ Y)$).

A matrix 320 may include or correspond to values that correspond to sets of one or more codebook indices. For example, a matrix 320 may include values corresponding to one or more sets of one or more codebooks indices defined by a wireless communications standard, where, in some cases, the one or more codebook indices may be stored at the UE 115, at the base station 105, or both.

Figure 4A:
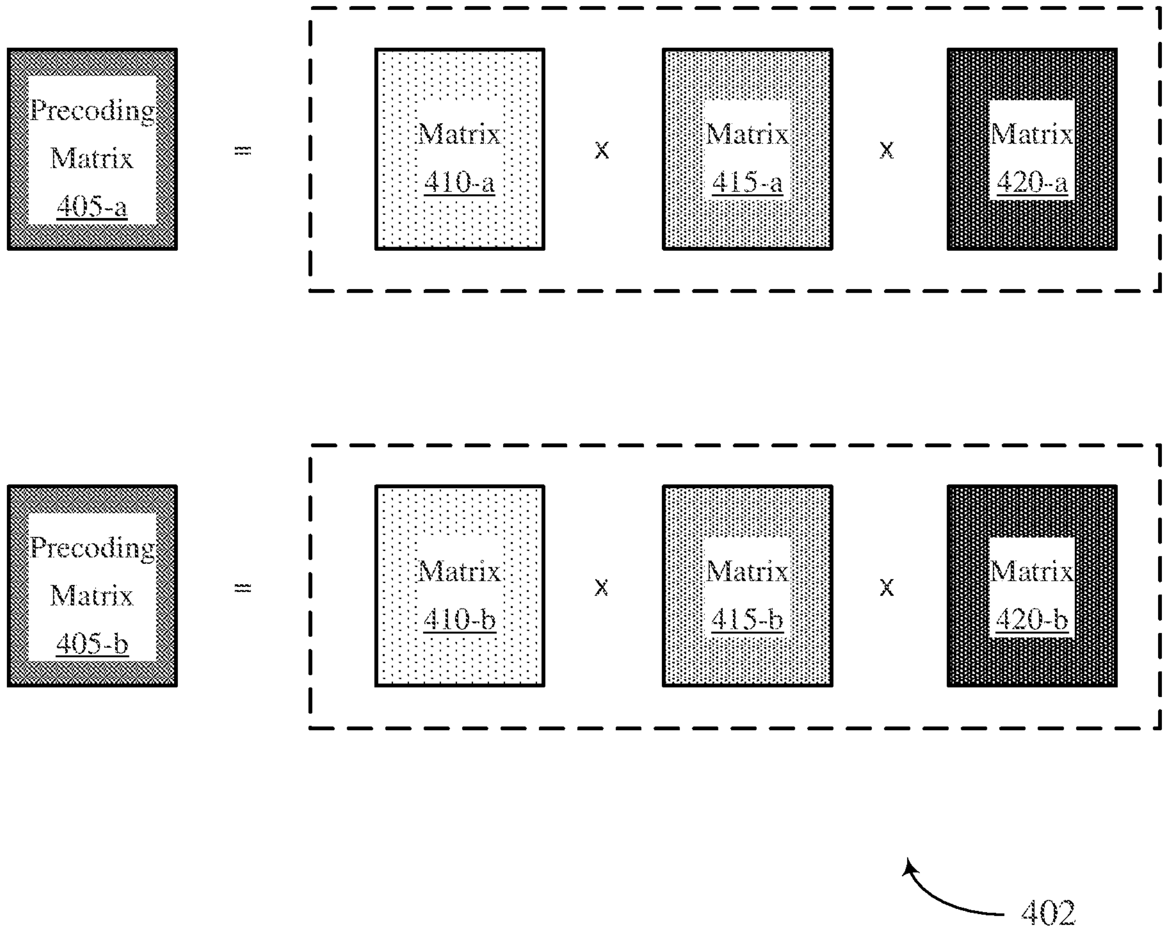
FIGS. 4A and 4B respectively illustrate examples of a process that support CSI feedback for multiple TRPs in accordance with aspects of the present disclosure.
Figure 4B:
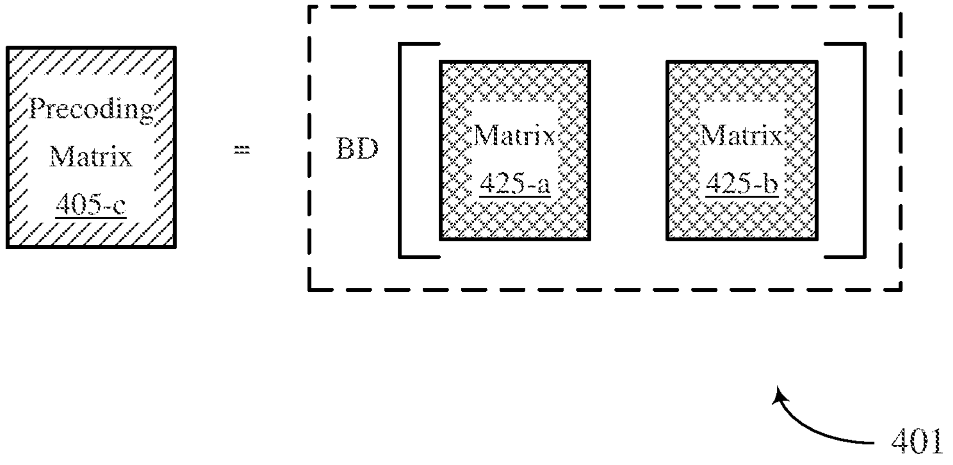

FIGS. 4A and 4B illustrate examples of respective processes 401 and 402 that support CSI feedback for multiple TRPs in accordance with aspects of the present disclosure. In some examples, processes 401 and 402 may implement aspects of wireless communications systems 100 or 200. For example, processes 401 and 402 may include information (e.g., PMI) determined by a UE 115 and transmitted to a base station 105 (e.g., via CSI), where the UE 115 and the base station 105 may be examples of a UE 115 and a base station 105 described with reference to FIGS. 1-3. The base station 105 and the UE 115 may communicate via multiple TRPs (e.g., two or more TRPs), using one or more multi-TRP transmission modes. Processes 401 and 402 may include methods performed by the base station 105 to determine respective precoding matrices 405 for each of the one or more multi-TRP transmission modes, where the precoding matrices 405 may be based on a codebook that includes frequency compression.

For example, the base station and the UE 115 may communicate in the downlink and/or the uplink via a first TRP and a second TRP. The hypotheses for different transmission modes for multi-TRP communications between the base station 105 and the UE 115 may therefore include a transmission mode for each individual (e.g., single) TRP and a transmission mode for the combination of the first TRP and the second TRP. While two TRPs are described with reference to the methods herein, it is to be understood that the base station 105 and the UE 115 may communicate via two or more TRPs, and that any method or procedure that applies to the first TRP and the second TRP may be extended to any number of TRPs (e.g., N TRPs).

The base station 105 may configure the UE 115 to report PMI for each of the one or more multi-TRP transmission modes. For example, the UE 115 may report PMI (e.g., first, full, complete PMI) individually for each of the first and second TRPs (e.g., for associated single TRP transmission modes) and may also report PMI (e.g., second, partial, incomplete, reduced, alternative PMI) for a combination of the first and second TRPs (e.g., for both TRPs together). Process 401 may be associated with methods for reporting PMI and for determining a precoding matrix 405 for individual TRPs, while process 402 may be associated with methods for reporting PMI and for determining a precoding matrix 405 for combinations of TRPs.

With reference to process 401, the UE 115 may report first PMI (e.g., via CSI and to the base station 105), including a matrix 410, a matrix 415, and a matrix 420, for each individual TRP. For example, the UE 115 may report matrices 410-*a*, 415-*a*, and 420-*a* for the first TRP and may report matrices 410-*b*, 415-*b*, and 420-*b* for the second TRP. A matrix 410 (e.g., a matrix $W_1$) may represent a spatial domain basis matrix that includes polarization groups of beams, where each polarization group corresponds to a number of columns in the matrix 410 (e.g., L beams in one polarization group corresponding to L columns). A spatial domain basis matrix may in some cases be used for compression in a spatial domain. In some cases, the matrix 410 may include two polarization groups of beams (e.g., 2L beams) and a corresponding number of columns (e.g., 2L columns). The matrix 410 may include a number of rows (e.g., P rows) that correspond to a number of horizontal antenna elements (e.g., $N_1$ elements), multiplied by a number of vertical antenna elements (e.g., $N_2$ elements), multiplied by a number of polarizations (e.g., two polarizations).

A matrix 415 (e.g., a matrix $\tilde{W}_2$) may represent information regarding linear combination coefficients for a set of communication beams and may in some cases be referred to as a coefficient matrix for the corresponding TRP or single-TRP transmission mode. The matrix 415 may include all linear combination coefficients of a beam, including amplitude coefficients and phase coefficients. Each element of matrix 415 may represent a coefficient of a tap for a beam. A matrix 415 may have dimension of a number of columns that correspond to a number of frequency-domain bases (e.g., M columns) and a number of rows that correspond to a number of beams (e.g., 2L rows). A matrix 420 (e.g., a matrix $$W_f^H)$$

may include basis vectors used to perform compression in a frequency domain and may be referred to as a frequency domain compression matrix or a frequency domain basis matrix. For example, each row of matrix 420 may represent a basis vector, where the basis vectors are derived from a number of columns of a DFT matrix. A matrix 420 may have dimension of a number of columns (e.g., $N_3$ columns) and a number of rows (e.g., M rows). Each matrix 410, 415, and 420 may correspond to or cover multiple frequency sub-bands and to one transmission layer. Thus, one precoding matrix 405 may be determined for each individual TRP using one of each matrix 410, 415, and 420.

A matrix 410 or a matrix 420, or any combination thereof, may include or correspond to values that correspond to sets of one or more codebook indices. For example, a matrix 410 or 420 may include values corresponding to sets of one or more codebooks indices defined by a wireless communications standard, where, in some cases, the one or more codebook indices may be stored at the UE 115, at the base station 105, or both.

The base station 105 may determine respective precoding matrices 405 (e.g., a precoder) for each individual TRP using the matrices 410, 415, and 420 reported by the UE 115 (e.g., using the first PMI). For example, the base station 105 may determine a precoding matrix 405-*a* for the first TRP by multiplying matrix 410-*a*, matrix 415-*a*, and matrix 420-*a* and may determine a precoding matrix 405-*b* for the second TRP by multiplying matrix 410-*b*, matrix 415-*b*, and matrix 420-*b*. In some examples, precoding matrix 405-*a* may be determined using equation (13):

$$W^{(1)}=W_1^{(1)}\tilde{W}_2^{(1)}W_f^{(1),H}, \quad (13)$$

where $W^{(1)}$ represents precoding matrix 405-*a* (e.g., the precoding matrix corresponding to the first TRP), $W_1^{(1)}$ represents matrix 410-*a*, $W_2^{(1)}$ represents matrix 415-*a*, and $W_f^{(1),H}$ represents matrix 420-*a*. In some examples, precoding matrix 405-*b* may be determined using equation (14):

$$W^{(2)}=W_1^{(2)}\tilde{W}_2^{(2)}W_f^{(2),H}, \quad (14)$$

where $W^{(2)}$ represents precoding matrix 405-*b* (e.g., the precoding matrix corresponding to the second TRP), $W_1^{(2)}$ represents matrix 410-*b*, $W_2^{(2)}$ represents matrix 415-*b*, and $W_f^{(2),H}$ represents matrix 420-*b*.

With reference to process 402, the UE 115 may report second PMI (e.g., partial, incomplete, reduced, alternative PMI) that may include information to determine a matrix 425 for each TRP of a multi-TRP transmission mode (e.g., each TRP of a combination of TRPs). For example, the UE 115 may report information associated with a matrix 425-*a* that corresponds to the first TRP and information associated with a matrix 425-*b* that corresponds to the second TRP.

In a first example, the second PMI reported by the UE 115 may indicate a set of columns (e.g., a set of precoding codes) for each precoding matrix 405 associated with a single TRP of the multi-TRP transmission mode. For example, the UE 115 may indicate, to the base station 105, a first set of columns of precoding matrix 405-*a* and a second set of columns of precoding matrix 405-*b*. The UE 115 may determine that the first set of columns and the second set of columns may be combined to form a precoding matrix 405-*c* that corresponds to a transmission mode including the first TRP and the second TRP.

In some cases, the UE 115 may determine that the first set of columns, or the second set of columns, or both, include a contiguous number of columns beginning at an initial column in the respective matrix 405-*a* or 405-*b*. Accordingly, the second PMI reported by the UE 115 may include a first number (e.g., a value) of the first set of contiguous columns of matrix 405-*a* (e.g., $r_1$ columns), a second number of the second set of contiguous columns of matrix 405-*b* (e.g., $r_2$ columns), or both. The base station 105 may use the first number of columns (e.g., $r_1$ columns) and matrix 405-*a* to construct matrix 425-*a* and may use the second number of columns (e.g., $r_2$ columns) and matrix 405-*b* to construct matrix 425-*b*.

The base station 105 may use the constructed matrices 425-*a* and 425-*b* to determine precoding matrix 405-*c* (e.g., corresponding to a transmission mode for both the first TRP and the second TRP). The base station 105 may determine precoding matrix 405-*c* by performing a block diagonalization (e.g., using a BD operator) on matrix 425-*a* and matrix 425-*b*. For example, the base station 105 may determine precoding matrix 405-*c* using equation (15):

$$W^{(1+2)}=BD[W^{(1)}(:,1:r_1)W^{(2)}(:,1:r_2)], \quad (15)$$

where $W^{(1+2)}$ represents precoding matrix 405-*c* (e.g., corresponding to a transmission mode including both the first TRP and the second TRP), BD represents a block diagonalization operation, $W^{(1)}(:,1:r_1)$ represents matrix 425-*a* (e.g., formed using the first set of columns of matrix 405-*a*), $r_1$ represents the first number of columns of matrix 405-*a*, $W^{(2)}(:,1:r_2)$ represents matrix 425-*b* (e.g., formed using the second set of columns of matrix 405-*b*), and $r_2$ represents the second number of columns of matrix 405-*b*.

In some cases, the UE 115 may determine that the first set of columns, or the second set of columns, or both, include non-contiguous columns in the respective matrix 405-*a* or 405-*b*. Accordingly, the second PMI reported by the UE 115 may include indices that indicate the first set of columns of matrix 405-*a*, indices that indicate the second set of columns of matrix 405-*b*, or both. The base station 105 may use the indices indicating the first set of columns and matrix 405-*a* to construct matrix 425-*a* and may use the indices indicating the second set of columns and matrix 405-*b* to construct matrix 425-*b*.

The base station 105 may use the constructed matrices 425-*a* and 425-*b* to determine precoding matrix 405-*c* (e.g., corresponding to a transmission mode for both the first TRP and the second TRP). The base station 105 may determine precoding matrix 405-*c* by performing a block diagonalization (e.g., using a BD operator) on matrix 425-*a* and matrix 425-*b*. For example, the base station 105 may determine precoding matrix 405-*c* using equation (16):

$$W^{(1+2)}=BD[W^{(1)}(:,X)W^{(2)}(:,Y)], \quad (16)$$

where $W^{(1+2)}$ represents precoding matrix 405-*c* (e.g., corresponding to a transmission mode including both the first TRP and the second TRP), BD represents a block diagonalization operation, $W^{(1)}(:, X)$ represents matrix 425-*a* (e.g., formed using the first set of columns of matrix 405-*a*), X represents the indices of the first set of columns of matrix 405-*a*, $W^{(2)}(:, Y)$ represents matrix 425-*b* (e.g., formed using the second set of columns of matrix 405-*b*), and Y represents the indices of the second set of columns of matrix 405-*b*.

In some examples, the UE 115 may indicate (e.g., via the second PMI) which columns are not in the first set of columns, which columns are not in the second set of columns, or both. For example, the second PMI reported by the UE 115 may include a first number (e.g., value) of columns that do not correspond to the first set of contiguous columns of matrix 405-*a*, a second number of columns that do not correspond to the second set of contiguous columns of matrix 405-*b*, or both. The columns that do not correspond to the first set or second set of columns may be columns starting at a last column of the respective matrix 405-*a* or 405-*b* or may be columns starting at an initial column of the respective matrix 405-*a* or 405-*b*. In another example, the second PMI reported by the UE 115 may include indices that indicate columns that do not correspond to the first set of columns of matrix 405-*a*, indices that indicate columns that do not correspond to the second set of columns of matrix 405-*b*, or both. The base station 105 may use the indices or numbers indicating the columns that do not correspond to the first set of columns, and matrix 405-*a*, to construct matrix 425-*a*, and may use the indices indicating the columns that do not correspond to the second set of columns, and matrix 405-*b*, to construct matrix 425-*b*.

In a second example, the second PMI reported by the UE 115 may include a first matrix and a second matrix that may respectively be used to calculate matrices 425-*a* and 425-*b*, and which may in some cases be referred to as alternative coefficient matrices (that is, alternative $\tilde{W}_2$ matrices) for the associated single TRPs. In some cases, the UE 115 may report a first matrix (e.g., first alternative coefficient matrix, meaning first alternative $\tilde{W}_2$) for the first TRP that, when multiplied with matrix 410-*a* and matrix 420-*a*, gives matrix 425-*a*, and may report a second matrix (e.g., second alternative coefficient matrix, meaning second alternative $\tilde{W}_2$) for the second TRP that, when multiplied with matrix 410-*b* and matrix 420-*b*, gives matrix 425-*b*.

The base station 105 may construct matrices 425-*a* and 425-*b* and may use matrices 425-*a* and 425-*b* to determine precoding matrix 405-*c* (e.g., corresponding to a transmission mode for both the first and the second TRP). The base station 105 may determine precoding matrix 405-*c* by performing a block diagonalization (e.g., using a BD operator) on matrix 425-*a* and matrix 425-*b*. For example, the base station 105 may determine precoding matrix 405-*c* using equation (17):

$$W^{(1+2)}=BD[W_1^{(1)}\overline{W}_2^{(1)}W_f^{(1),H}W_1^{(2)}\overline{W}_2^{(2)}W_f^{(2),H}], \tag{17}$$

where $W^{(1+2)}$ represents precoding matrix 405-*c* (e.g., corresponding to a transmission mode including both the first TRP and the second TRP), BD represents a block diagonalization operation, $W_1^{(1)}$ represents matrix 410-*a*, $\overline{W}_2^{(1)}$ represents the first matrix that may be used to determine matrix 425-*a* (e.g., by multiplying with $W_1^{(1)}$ and $W_1^{(1),H)}$, $W_1^{(1),H}$ represents matrix 420-*a*, $W_1^{(2)}$ represents matrix 410-*b*, $\overline{W}_2^{(2)}$ represents the second matrix that may be used to determine matrix 425-*b* (e.g., by multiplying with $W_1^{(2)}$ and $W_f^{(2),H)}$, and $W_f^{(2),H}$ represents matrix 420-*b*.

In some cases, the UE 115 may report a first matrix for the first TRP that, when multiplied with some columns of matrix 410-*a* and the Hermitian of matrix 420-*a*, gives matrix 425-*a*, and may report a second matrix for the second TRP that, when multiplied with some columns of matrix 410-*b* and the Hermitian of matrix 420-*b*, gives matrix 425-*b*. The base station 105 may construct matrices 425-*a* and 425-*b* and may use matrices 425-*a* and 425-*b* to determine precoding matrix 405-*c* (e.g., corresponding to a transmission mode for both the first and the second TRP). The base station 105 may determine precoding matrix 405-*c* by performing a block diagonalization (e.g., using a BD operator) on matrix 425-*a* and matrix 425-*b*. For example, the base station 105 may determine precoding matrix 405-*c* using equation (18):

$$W^{(1+2)}=BD[W_1^{(1)}(:,W)\overline{W}_2^{(1)}(W_f^{(1)}(:,X)^H W_1^{(2)}(:,Y) \overline{W}_2^{(2)}(W_f^{(2)}(:,Z))^H], \tag{18}$$

where $W^{(1+2)}$ represents precoding matrix 405-*c* (e.g., corresponding to a transmission mode including both the first TRP and the second TRP), BD represents a block diagonalization operation, $W_1^{(1)}(:, W)$ represents selected columns of matrix 410-*a*, W represents indices of =columns of matrix 410-*a* that may be used to determine matrix 425-*a*, $\overline{W}_2^{(1)}$ represents the first matrix that may be used to determine matrix 425-*a* (e.g., by multiplying with $W_1^{(1)}(:, W)$ and $(W_f^{(1)}(:,X))^H)$, $W_f^{(1)}(;,X)$ represents selected columns of the Hermitian of matrix 420-*a*, X represents indices of columns of matrix 420-*a* that may be used to determine matrix 425-*a*, $W_1^{(2)}(:, Y)$ represents selected columns of matrix 410-*b*, Y represents indices of columns of matrix 410-*b* that may be used to determine matrix 425-*b*, $\overline{W}_2^{(2)}$ represents the second matrix that may be used to determine matrix 425-*b* (e.g., by multiplying with $W_1^{(2)}(:, Y)$ and $(W_f^{(2)}(:,Z))^H)$, $W_f^{(2)}(:,Z)$ represents selected columns of the Hermitian of matrix 420-*b*, and Z represents indices of columns of matrix 420-*b* that may be used to determine matrix 425-*b*.

A matrix 425 may include or correspond to values that correspond to sets of one or more codebook indices. For example, a matrix 425 may include values corresponding to one or more sets of one or more codebooks indices defined by a wireless communications standard, where, in some cases, the one or more codebook indices may be stored at the UE 115, at the base station 105, or both.

In some cases, if the UE 115 reports PMI for multiple spatial layers, the precoding matrices 405-*a*, 405-*b*, and 405-*c* may be determined and reported on a per-layer basis (e.g., one of each precoding matrix 405-*a*, 405-*b*, and 405-*c* may be determined and reported for each spatial layer).

Figure 5:
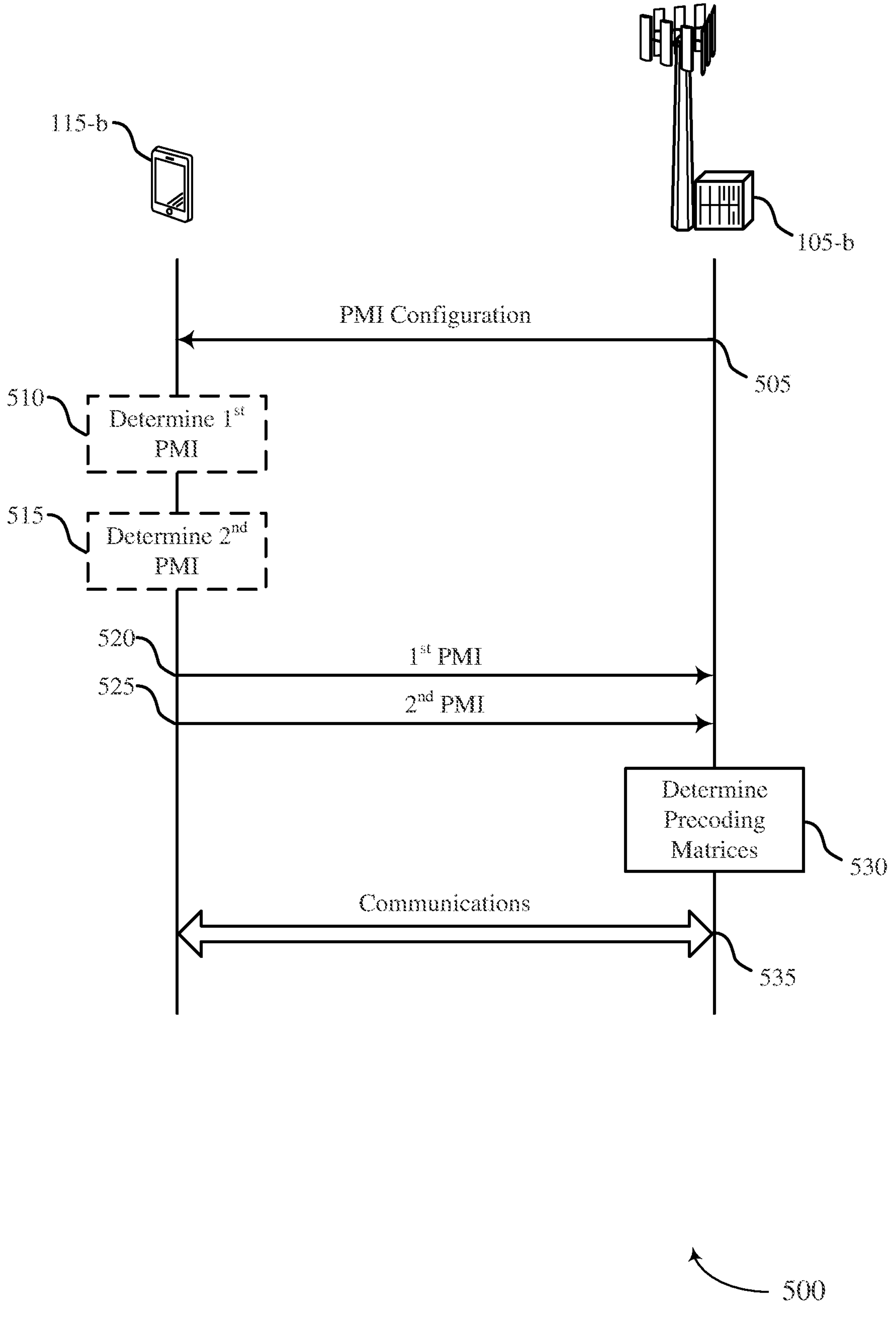
FIG. 5 illustrates an example of a process flow that supports CSI feedback for multiple TRPs in accordance with aspects of the present disclosure.

FIG. 5 illustrates an example of a process flow 500 that supports CSI feedback for multiple TRPs in accordance with aspects of the present disclosure. In some examples, process flow 500 may implement or be implemented by aspects of wireless communication systems 100 or 200. In some examples, process flow 500 may also implement or be implemented by aspects of processes 301, 302, 401, or 402, or any combination thereof. Process flow may be implemented by a UE 115-*b* and a base station 105-*b*, which may be examples of a UE 115 and a base station 105 described with reference to FIGS. 1-4. Base station 105-*b* and UE 115-*b* may communicate via multiple TRPs (e.g., two or more TRPs), using one or more multi-TRP transmission modes. While two TRPs are described with reference to the methods herein, it is to be understood that the base station 105 and the UE 115 may communicate via two or more TRPs, and that any method or procedure that applies to the first TRP and the second TRP may be extended to any number of TRPs (e.g., to N TRPs).

UE 115-*b* may implement aspects of process flow 500 in order to determine and report PMI for multi-TRP transmission modes, as described with reference to FIGS. 2-4. Similarly, base station 105-*b* may implement aspects of process flow 500 to configure UE 115-*b* to report the PMI, to receive the PMI, and to use the PMI to determine one or more precoding matrices for one or more scheduling requests, as described with reference to FIGS. 2-4.

In the following description of process flow 500, the operations between UE 115-*b* and base station 105-*b* may be transmitted in a different order than the order shown, or the operations performed by UE 115-*b* or base station 105-*b* may be performed in different orders or at different times. Specific operations may also be left out of process flow 500, or other operations may be added to process flow 500. Although UE 115-*b* and base station 105-*b* are shown performing the operations of process flow 500, some aspects of some operations may also be performed by one or more other wireless devices.

At 505, base station 105-*b* may transmit, to UE 115-*b*, a configuration for PMI reporting. For example, base station 105-*b* may configure UE 115-*b* to report PMI for the multiple TRPs used for communications between base station 105-*b* and UE 115-*b*. The PMI configuration may be or include a request for PMI related to multiple transmission modes associated with the multiple TRPs for base station 105-*b*.

At 510, UE 115-*b* may determine first PMI, where the first PMI may include a respective PMI report (e.g., full, complete PMI report) for each transmission mode in a first subset of the multiple transmission modes. The first subset of transmission modes may include transmission modes that each correspond to a single TRP of the multiple TRPs. Determining the first PMI may include performing one or more methods described with reference to FIG. 3A or 4A. For example, in a first method, determining the first PMI may include determining, for each transmission mode in the first subset, a respective spatial domain basis matrix. Determining the first PMI may also include determining, for each transmission mode in the first subset, a respective coefficient matrix, where each element of the respective coefficient matrix includes a coefficient for a corresponding beam within a corresponding transmission layer.

In a second method, determining the first PMI may include determining, for each or any other number of transmission modes in the first subset, a respective spatial domain basis matrix. Determining the first PMI according to the second method may also include determining, for each transmission mode in the first subset, a respective coefficient matrix, where elements of the coefficient matrix include linear combination coefficients for a set of beams. Determining the first PMI according to the second method may also include determining, for each transmission mode in the first subset, a respective frequency domain basis matrix.

At 515, UE 115-*b* may determine second PMI, where the second PMI may include a respective partial PMI report (e.g., incomplete, reduced, alternative PMI report) for each or any other number of transmission modes in a second subset of the multiple transmission modes. The second subset of transmission modes may include transmission modes that each correspond to at least two (e.g., multiple) TRPs of the multiple TRPs. Determining the second PMI may include performing one or more methods described with reference to FIG. 3B or 4B. For example, determining the second PMI according to a first method may include determining, for a transmission mode in the second subset, a first set of columns and a second set of columns (e.g., a number of columns or indices of columns) within a respective first precoding matrix and second precoding matrix. The first precoding matrix and the second precoding matrix may respectively correspond to a first transmission mode and a second transmission mode in the first subset.

In a second method of determining the second PMI, determining the second PMI may include determining, for a transmission mode in the second subset, a first alternative coefficient matrix and a second alternative coefficient matrix corresponding to respective first and second transmission modes in the first subset. In some cases, determining the second PMI may further include determining, for the transmission mode of the second subset, a first and second set of columns within respective spatial domain basis matrices corresponding to the first and second transmission modes. In some cases, determining the second PMI may further include determining, for the transmission mode of the second subset, a third and fourth set of columns within respective frequency domain basis matrices corresponding to the first and second transmission modes. Determining the second PMI may support determining a first and a second precoding matrix based on a product of a spatial domain basis matrix and a respective alternative coefficient matrix or based on a product of a spatial domain basis matrix, a respective alternative coefficient matrix, and a frequency domain basis matrix.

At 520, UE 115-*b* may transmit, to base station 105-*b*, the first PMI including a respective PMI report for each transmission mode in the first subset of the multiple transmission modes.

At 525, UE 115-*b* may transmit, to base station 105-*b*, the second PMI including a respective partial PMI report for each transmission mode in the second subset of the multiple transmission modes. In some cases, the first PMI and the second PMI may be transmitted within a single message (e.g., a CSI feedback message or report)—that is, though 520 and 525 are illustrated separately for clarity, they may in some cases be included in a single transmission or message. In some cases, the first PMI may be transmitted via a first message and the second PMI may be transmitted via a second message (e.g., via different CSI feedback messages).

At 530, base station 105-*b* may determine a precoding matrix of the transmission mode in the second subset based on the first PMI (e.g., PMI reports for the first and second transmission modes in the first subset) and the second PMI (e.g., a PMI report for the transmission mode in the second subset). In some cases, base station 105-*b* may determine the precoding matrix using a block diagonalization of the first and second sets of columns within the respective first precoding matrix and second precoding matrix. In some cases, base station 105-*b* may determine the precoding matrix using a block diagonalization of: a product of respective spatial domain basis matrix (e.g., or columns thereof) and the first alternative matrix and a product of respective spatial domain basis matrix (e.g., or columns thereof) and the second alternative matrix. In some cases, base station 105-*b* may determine the precoding matrix using a block diagonalization of: a product of a respective spatial domain basis matrix (e.g., or columns thereof), the first alternative matrix, and a respective frequency domain basis matrix (e.g., or columns thereof), and a product of a respective spatial domain basis matrix (e.g., or columns thereof), the second alternative matrix, and a respective frequency domain basis matrix (e.g., or columns thereof).

At 535, base station 105-*b* and UE 115-*b* may communicate based on the precoding matrix for the transmission mode in the second subset.

Figure 6:
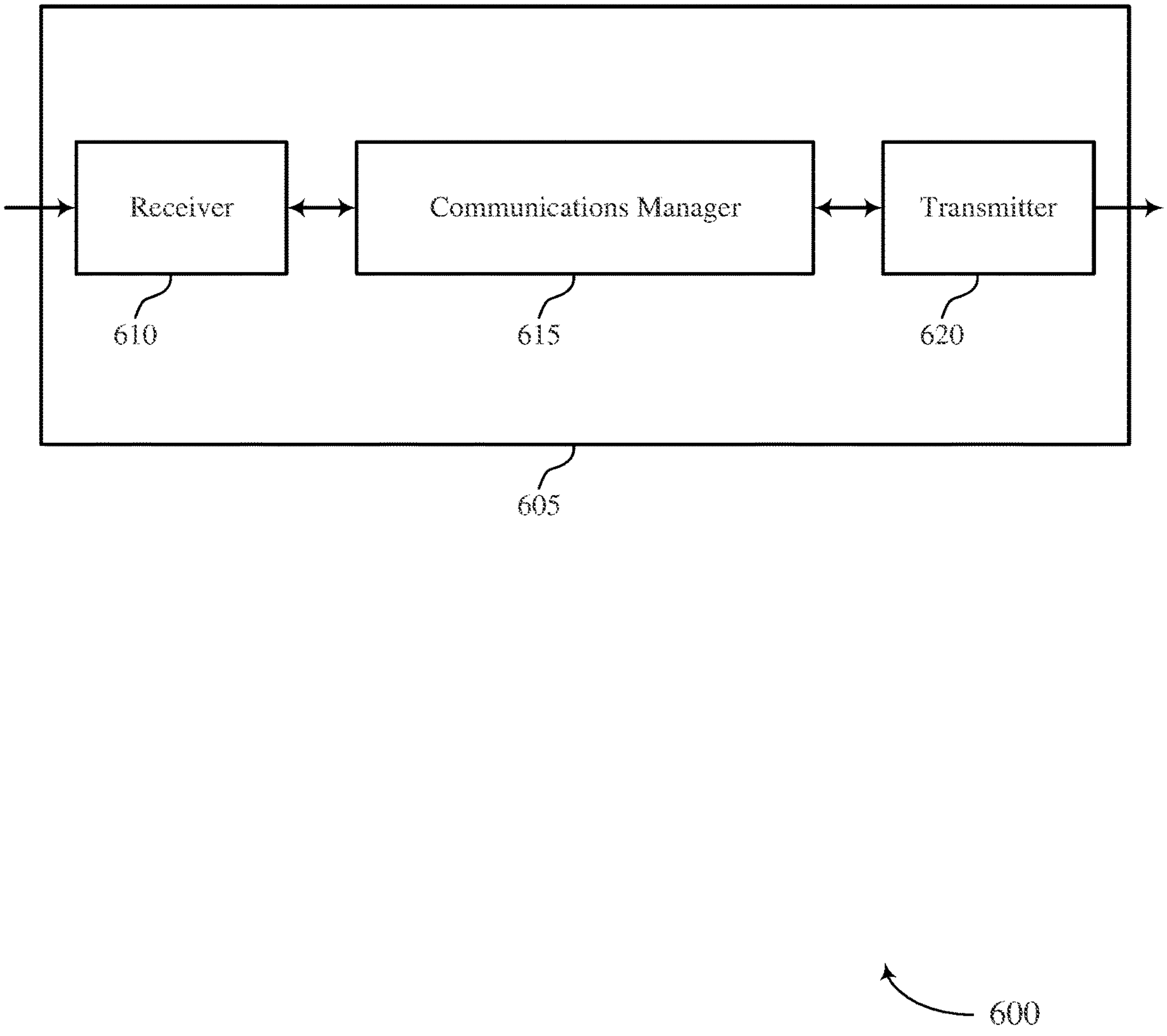
FIGS. 6 and 7 show block diagrams of devices that support CSI feedback for multiple TRPs in accordance with aspects of the present disclosure.

FIG. 6 shows a block diagram 600 of a device 605 that supports CSI feedback for multiple TRPs in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to CSI feedback for multiple TRPs, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, at a UE, a request for precoding matrix information related to a set of transmission modes associated with a set of TRPs for a base station, transmit, from the UE to the base station, a respective precoding matrix information report for each transmission mode in a first subset of the set of transmission modes, and transmit, from the UE to the base station, a respective partial precoding matrix information report for each transmission mode in a second subset of the set of transmission modes. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615, among other examples herein, as described herein may be implemented to realize one or more potential advantages. For example, communications manager 615 may decrease communication overhead, decrease communication latency, and increase available energy at a wireless device (e.g., a UE 115) by enabling a partial PMI reporting scheme. The partial PMI reporting may reduce overhead, reduce resources used for PMI reporting or processing, or reduce energy consumption (or any combination thereof) compared to other systems and techniques, for example, that transmit full PMI for multi-TRP transmission modes, which may increase overhead and energy consumption. Accordingly, communications manager 615 may save energy and increase battery life at a wireless device (e.g., a UE 115) by strategically reducing an amount of PMI reported or received by a wireless device (e.g., a UE 115).

Figure 7:
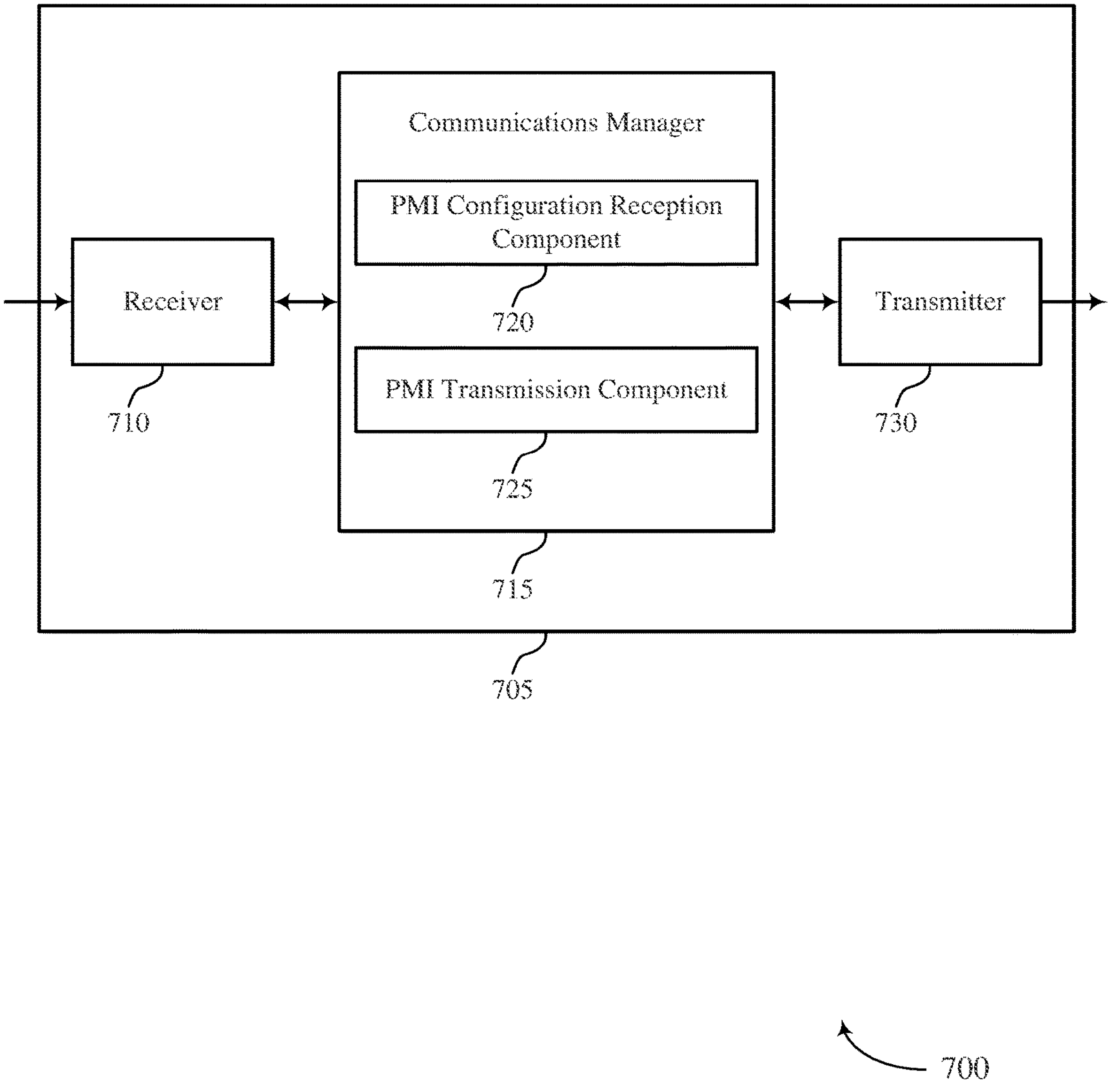

FIG. 7 shows a block diagram 700 of a device 705 that supports CSI feedback for multiple TRPs in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to CSI feedback for multiple TRPs, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a PMI configuration reception component 720 and a PMI transmission component 725. The communications manager 715 may be an example of aspects of the communications manager 910 described herein.

The PMI configuration reception component 720 may receive, at a UE, a request for precoding matrix information related to a set of transmission modes associated with a set of TRPs for a base station.

The PMI transmission component 725 may transmit, from the UE to the base station, a respective precoding matrix information report for each transmission mode in a first subset of the set of transmission modes and transmit, from the UE to the base station, a respective partial precoding matrix information report for each transmission mode in a second subset of the set of transmission modes.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

A processor of a wireless device (e.g., controlling the receiver 710, the transmitter 730, or the transceiver 920 as described with reference to FIG. 9) may increase communication reliability and accuracy by decreasing communication overhead and latency, and increasing available energy. The reduced overhead may reduce resource use and energy consumption (e.g., via implementation of system components described with reference to FIG. 8) compared to other systems and techniques, for example, that transmit full PMI for multi-TRP transmission modes, which may increase processing or signaling overhead and energy consumption. Further, the processor of the UE 115 may identify one or more aspects of a PMI reporting scheme to perform the processes described herein. The processor of the wireless device may use the PMI reporting scheme to perform one or more actions that may result in lower overhead use and energy consumption, as well as save energy and increase battery life at the wireless device (e.g., by determining and transmitting partial PMI), among other benefits.

Figure 8:
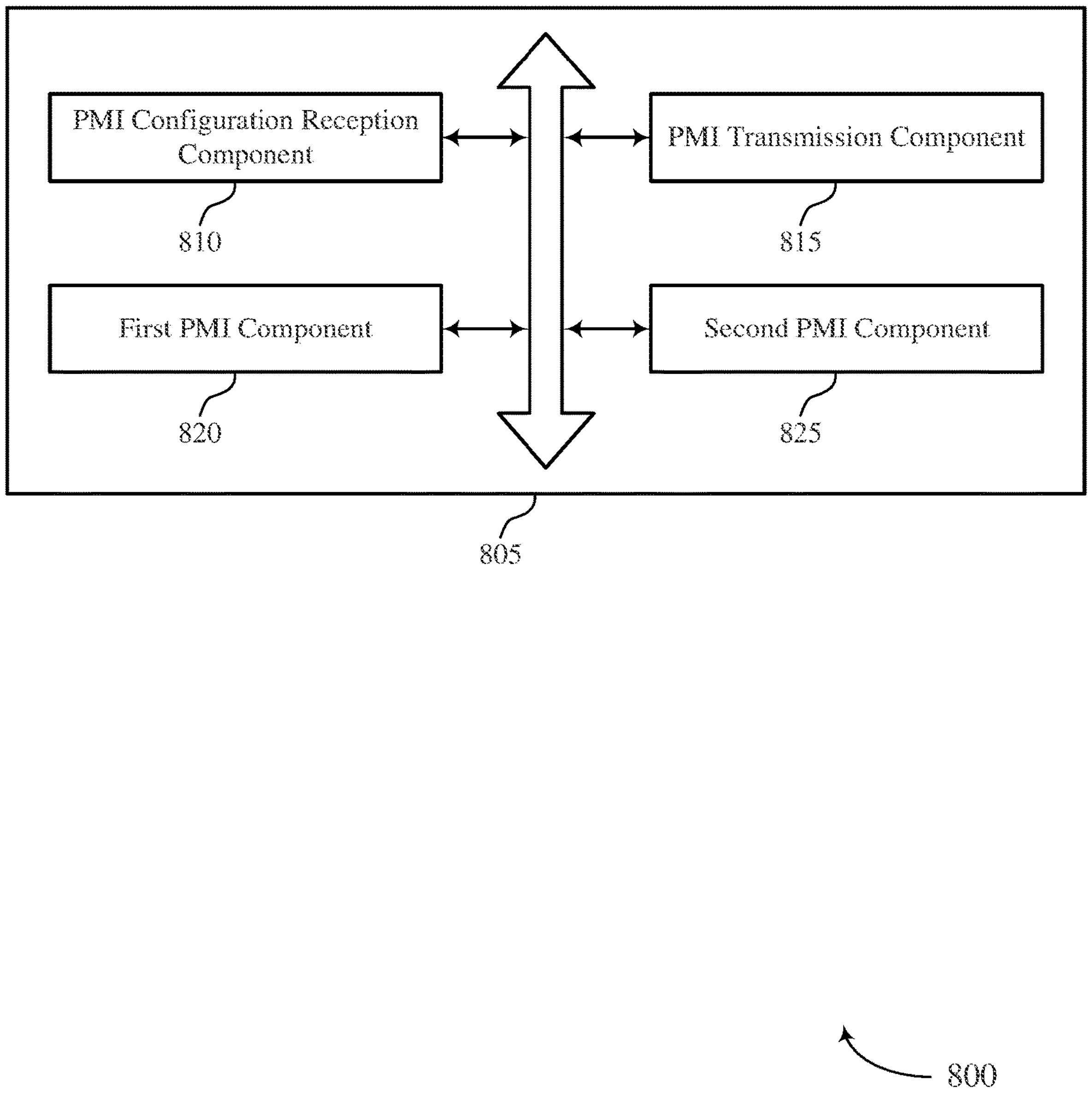
FIG. 8 shows a block diagram of a communications manager that supports CSI feedback for multiple TRPs in accordance with aspects of the present disclosure.

FIG. 8 shows a block diagram 800 of a communications manager 805 that supports CSI feedback for multiple TRPs in accordance with aspects of the present disclosure. The communications manager 805 may be an example of aspects of a communications manager 615, a communications manager 715, or a communications manager 910 described herein. The communications manager 805 may include a PMI configuration reception component 810, a PMI transmission component 815, a first PMI component 820, and a second PMI component 825. Each of these modules may communicate, directly or indirectly, with one another (e.g., via one or more buses).

The PMI configuration reception component 810 may receive, at a UE, a request for precoding matrix information related to a set of transmission modes associated with a set of TRPs for a base station.

The PMI transmission component 815 may transmit, from the UE to the base station, a respective precoding matrix information report for each transmission mode in a first subset of the set of transmission modes. In some examples, the PMI transmission component 815 may transmit, from the UE to the base station, a respective partial precoding matrix information report for each transmission mode in a second subset of the set of transmission modes. In some cases, each transmission mode in the first subset of the set of transmission modes corresponds to a single TRP of the set of TRPs. In some cases, each transmission mode in the second subset of the set of transmission modes corresponds to at least two TRPs of the set of TRPs.

In some cases, the respective precoding matrix information report for a transmission mode in the first subset includes a first quantity of information. In some cases, the respective partial precoding matrix information report for a transmission mode in the second subset includes a second quantity of information that is less than the first quantity of information. In some cases, the respective precoding matrix information report for a transmission mode in the first subset and the respective partial precoding matrix information report for a transmission mode in the second subset are transmitted within a single message. In some cases, the respective precoding matrix information report for a transmission mode in the first subset is transmitted within a first message. In some cases, the respective partial precoding matrix information report for a transmission mode in the second subset is transmitted within a second message.

The first PMI component 820 may determine, for each transmission mode in the first subset, a respective first set of values for a respective spatial domain basis matrix. In some examples, the first PMI component 820 may determine, for each transmission mode in the first subset, a respective second set of values for a respective coefficient matrix, each element of the respective coefficient matrix including a coefficient for a corresponding beam within a corresponding transmission layer, where the respective precoding matrix information report for a transmission mode in the first subset indicates the respective first set of values and the respective second set of values for the transmission mode in the first subset. In some cases, the coefficient for the corresponding beam is based on an amplitude coefficient and a phase coefficient for the corresponding beam. In some cases, the respective first set of values for a transmission mode corresponds to a set of one or more codebook indices for a precoding matrix for the transmission mode.

The second PMI component 825 may determine, for a transmission mode in the second subset, a first quantity of columns within a first precoding matrix for a first transmission mode in the first subset and a second quantity of columns within a second precoding matrix for a second transmission mode in the first subset, where the first precoding matrix for the first transmission mode in the first subset is based on the respective spatial domain basis matrix and the respective coefficient matrix for the first transmission mode in the first subset, the second precoding matrix for the second transmission mode in the first subset is based on the respective spatial domain basis matrix and the respective coefficient matrix for the second transmission mode in the first subset, and the respective partial precoding matrix information report for the transmission mode in the second subset indicates the first quantity of columns and the second quantity of columns.

In some examples, the second PMI component 825 may determine, for a transmission mode in the second subset, a first set of one or more columns within a first precoding matrix for a first transmission mode in the first subset and a second set of one or more columns within a second precoding matrix for a second transmission mode in the first subset, where the first precoding matrix for the first transmission mode in the first subset is based on the respective spatial domain basis matrix and the respective coefficient matrix for the first transmission mode in the first subset, the second precoding matrix for the second transmission mode in the first subset is based on the respective spatial domain basis matrix and the respective coefficient matrix for the second transmission mode in the first subset, and the respective partial precoding matrix information report for the transmission mode in the second subset indicates the first set of one or more columns and the second set of one or more columns.

In some examples, the second PMI component 825 may determine, for a transmission mode in the second subset, a first set of values for a first alternative coefficient matrix and a second set of values for a second alternative coefficient matrix, where a precoding matrix for the transmission mode in the second subset is based on a first product of the respective spatial domain basis matrix for the first transmission mode in the first subset and the first alternative coefficient matrix and based on a second product of the respective spatial domain basis matrix for the second transmission mode in the first subset and the second alternative coefficient matrix, and the respective partial precoding matrix information report for the transmission mode in the second subset indicates the first set of values and the second set of values.

In some examples, the second PMI component 825 may determine, for a transmission mode in the second subset, a first set of values for a first alternative coefficient matrix and a second set of values for a second alternative coefficient matrix. In some examples, the second PMI component 825 may determine, for the transmission mode in the second subset, a first set of one or more columns within the respective spatial domain basis matrix for a first transmission mode in the first subset and a second set of one or more columns within the respective spatial domain basis matrix for a second transmission mode in the first subset, where a precoding matrix for the transmission mode in the second subset is based on a first product of the first set of one or more columns and the first alternative coefficient matrix and based on a second product of the second set of one or more columns and the second alternative coefficient matrix, and the respective partial precoding matrix information report for the transmission mode in the second subset indicates the first set of values, the second set of values, the first set of one or more columns, and the second set of one or more columns.

In some cases, the precoding matrix for the transmission mode in the second subset is based on a block diagonalization of the first product and the second product.

In some examples, the first PMI component 820 may determine, for each transmission mode in the first subset, a respective first set of values for a respective spatial domain basis matrix. In some examples, the first PMI component 820 may determine, for each transmission mode in the first subset, a respective second set of values for a respective coefficient matrix, where elements of the coefficient matrix include linear combination coefficients for a set of beams. In some examples, the first PMI component 820 may determine, for each transmission mode in the first subset, a respective third set of values for a respective frequency domain basis matrix, where the respective precoding matrix information report for a transmission mode in the first subset indicates the respective first set of values, the respective second set of values, and the respective third set of values for the transmission mode in the first subset.

In some cases, the linear combination coefficients are based on amplitude coefficients and phase coefficients. In some cases, the respective first set of values for a transmission mode corresponds to a first set of one or more codebook indices for a precoding matrix for the transmission mode. In some cases, the respective third set of values for the transmission mode corresponds to a second set of one or more codebook indices for the precoding matrix for the transmission mode.

In some examples, the second PMI component 825 may determine, for a transmission mode in the second subset, a first quantity of columns within a first precoding matrix for a first transmission mode in the first subset and a second quantity of columns within a second precoding matrix for a second transmission mode in the first subset, where the first precoding matrix for the first transmission mode in the first subset is based on the respective spatial domain basis matrix, the respective coefficient matrix, and the respective frequency domain basis matrix for the first transmission mode in the first subset, the second precoding matrix for the second transmission mode in the first subset is based on the respective spatial domain basis matrix, the respective coefficient matrix, and the respective frequency domain basis matrix for the second transmission mode in the first subset, and the respective partial precoding matrix information report for the transmission mode in the second subset indicates the first quantity of columns and the second quantity of columns.

In some examples, the second PMI component 825 may determine, for a transmission mode in the second subset, a first set of one or more columns within a first precoding matrix for a first transmission mode in the first subset and a second set of one or more columns within a second precoding matrix for a second transmission mode in the first subset, where the first precoding matrix for the first transmission mode in the first subset is based on the respective spatial domain basis matrix, the respective coefficient matrix, and the respective frequency domain basis matrix for the first transmission mode in the first subset, the second precoding matrix for the second transmission mode in the first subset is based on the respective spatial domain basis matrix, the respective coefficient matrix, and the respective frequency domain basis matrix for the second transmission mode in the first subset, and the respective partial precoding matrix information report for the transmission mode in the second subset indicates the first set of one or more columns and the second set of one or more columns.

In some examples, the second PMI component 825 may determine, for a transmission mode in the second subset, a first set of values for a first alternative coefficient matrix and a second set of values for a second alternative coefficient matrix, where a precoding matrix for the transmission mode in the second subset is based on a first product of the respective spatial domain basis matrix for the first transmission mode in the first subset, the first alternative coefficient matrix, and the respective frequency domain basis matrix for the first transmission mode in the first subset and based on a second product of the respective spatial domain basis matrix for the second transmission mode in the first subset, the second alternative coefficient matrix, and the respective frequency domain basis matrix for the second transmission mode in the first subset, and the respective partial precoding matrix information report for the transmission mode in the second subset indicates the first set of values and the second set of values.

In some examples, the second PMI component 825 may determine, for the transmission mode in the second subset, a first set of one or more columns within the respective spatial domain basis matrix for a first transmission mode in the first subset and a second set of one or more columns within the respective spatial domain basis matrix for a second transmission mode in the first subset, where a precoding matrix for the transmission mode in the second subset is based on a first product of the respective spatial domain basis matrix for the first transmission mode in the first subset, the first alternative coefficient matrix, and the respective frequency domain basis matrix for the first transmission mode in the first subset and based on a second product of the respective spatial domain basis matrix for the second transmission mode in the first subset, the second alternative coefficient matrix, and the respective frequency domain basis matrix for the second transmission mode in the first subset, and the respective partial precoding matrix information report for the transmission mode in the second subset indicates the first set of values, the second set of values, the first set of one or more columns, and the second set of one or more columns.

In some cases, the precoding matrix for the transmission mode in the second subset is based on a block diagonalization of the first product and the second product.

Figure 9:
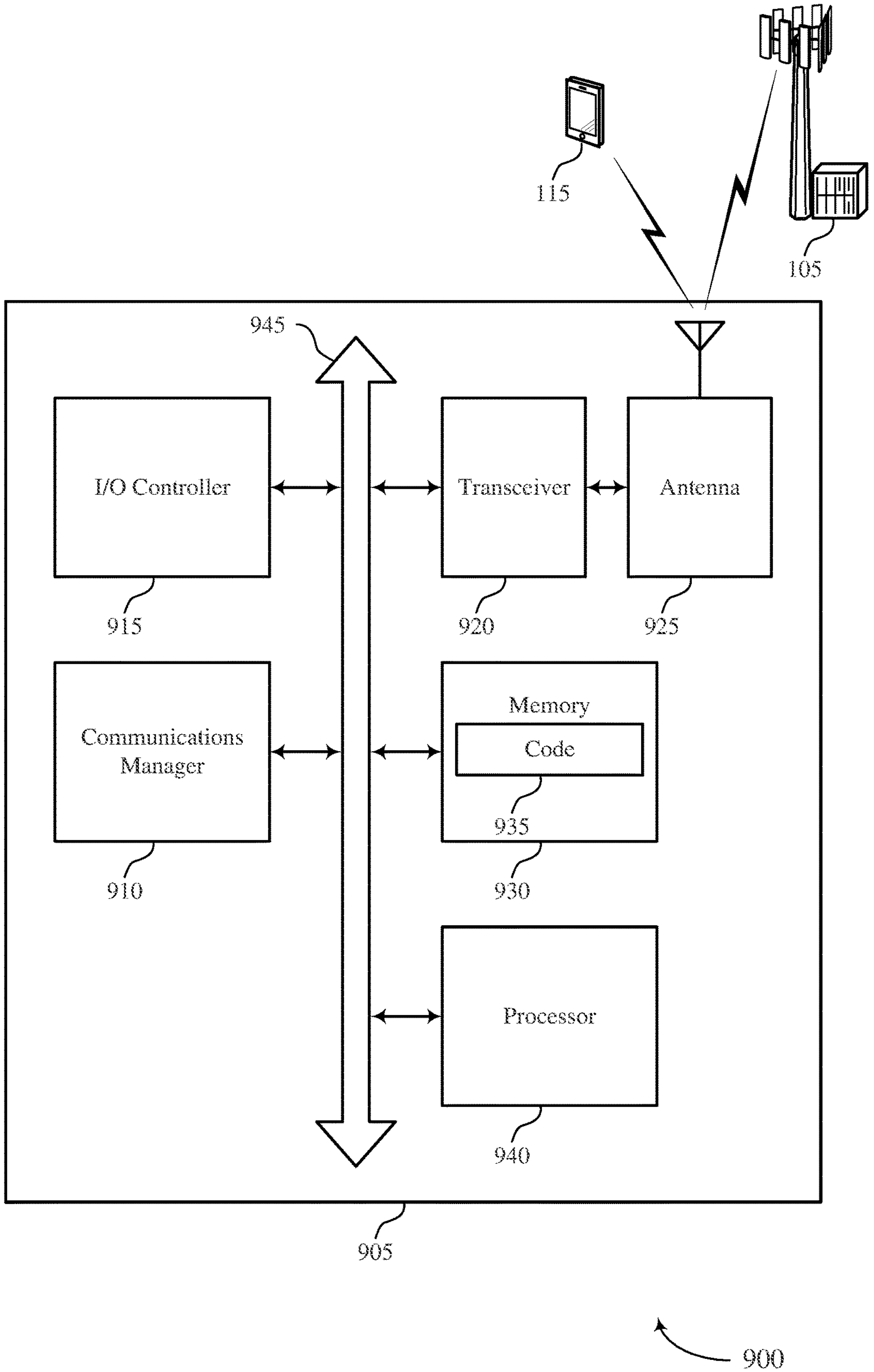
FIG. 9 shows a diagram of a system including a device that supports CSI feedback for multiple TRPs in accordance with aspects of the present disclosure.

FIG. 9 shows a diagram of a system 900 including a device 905 that supports CSI feedback for multiple TRPs in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, at a UE, a request for precoding matrix information related to a set of transmission modes associated with a set of TRPs for a base station, transmit, from the UE to the base station, a respective precoding matrix information report for each transmission mode in a first subset of the set of transmission modes, and transmit, from the UE to the base station, a respective partial precoding matrix information report for each transmission mode in a second subset of the set of transmission modes.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting CSI feedback for multiple TRPs).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
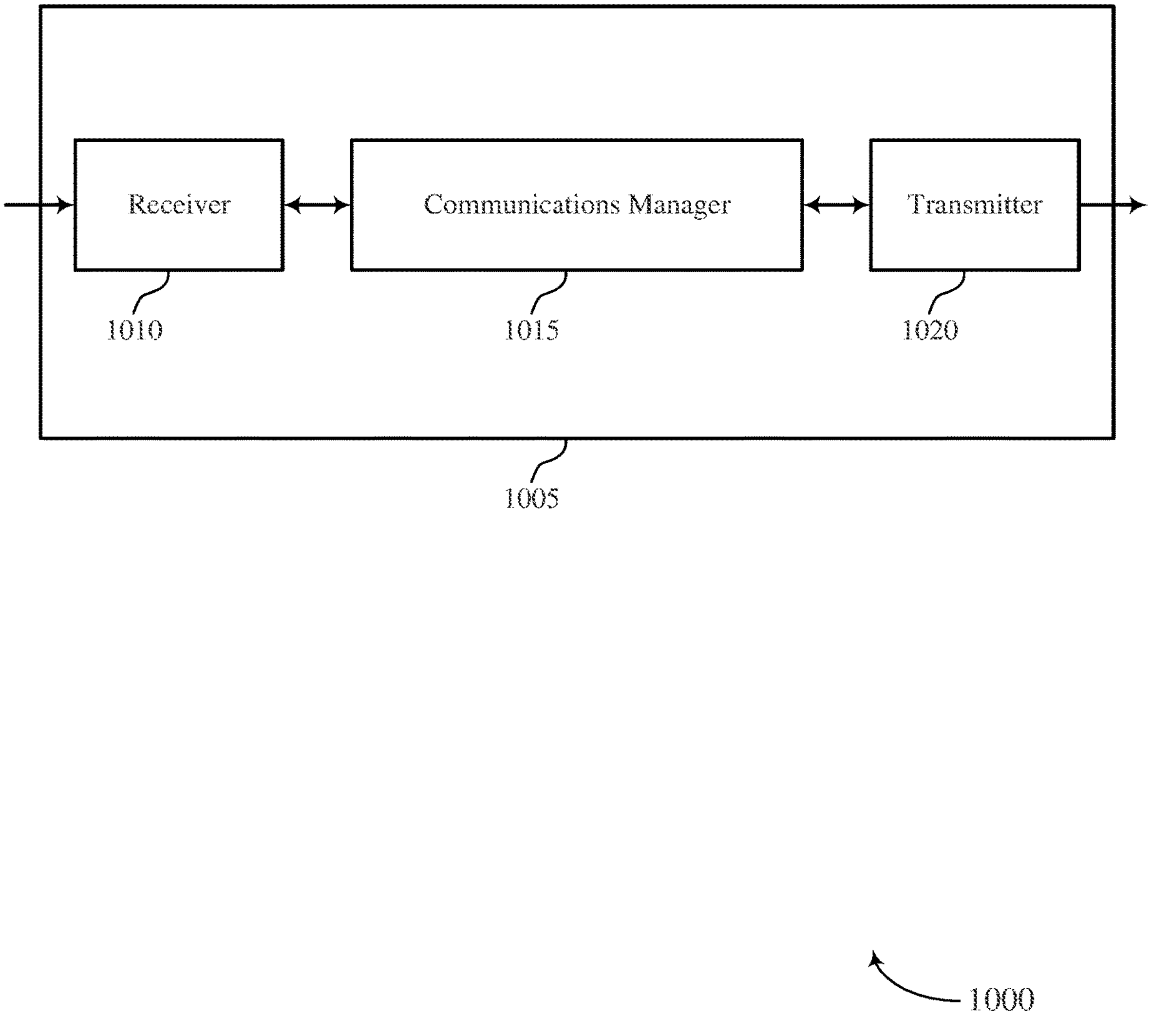
FIGS. 10 and 11 show block diagrams of devices that support CSI feedback for multiple TRPs in accordance with aspects of the present disclosure.

FIG. 10 shows a block diagram 1000 of a device 1005 that supports CSI feedback for multiple TRPs in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to CSI feedback for multiple TRPs, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, from a base station to a UE, a request for precoding matrix information related to a set of transmission modes associated with a set of TRPs for the base station, receive, at the base station from the UE, a respective precoding matrix information report for each transmission mode in a first subset of the set of transmission modes, receive, at the base station from the UE, a respective partial precoding matrix information report for each transmission mode in a second subset of the set of transmission modes, determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset, and communicate with the UE based on the precoding matrix for the transmission mode in the second subset. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
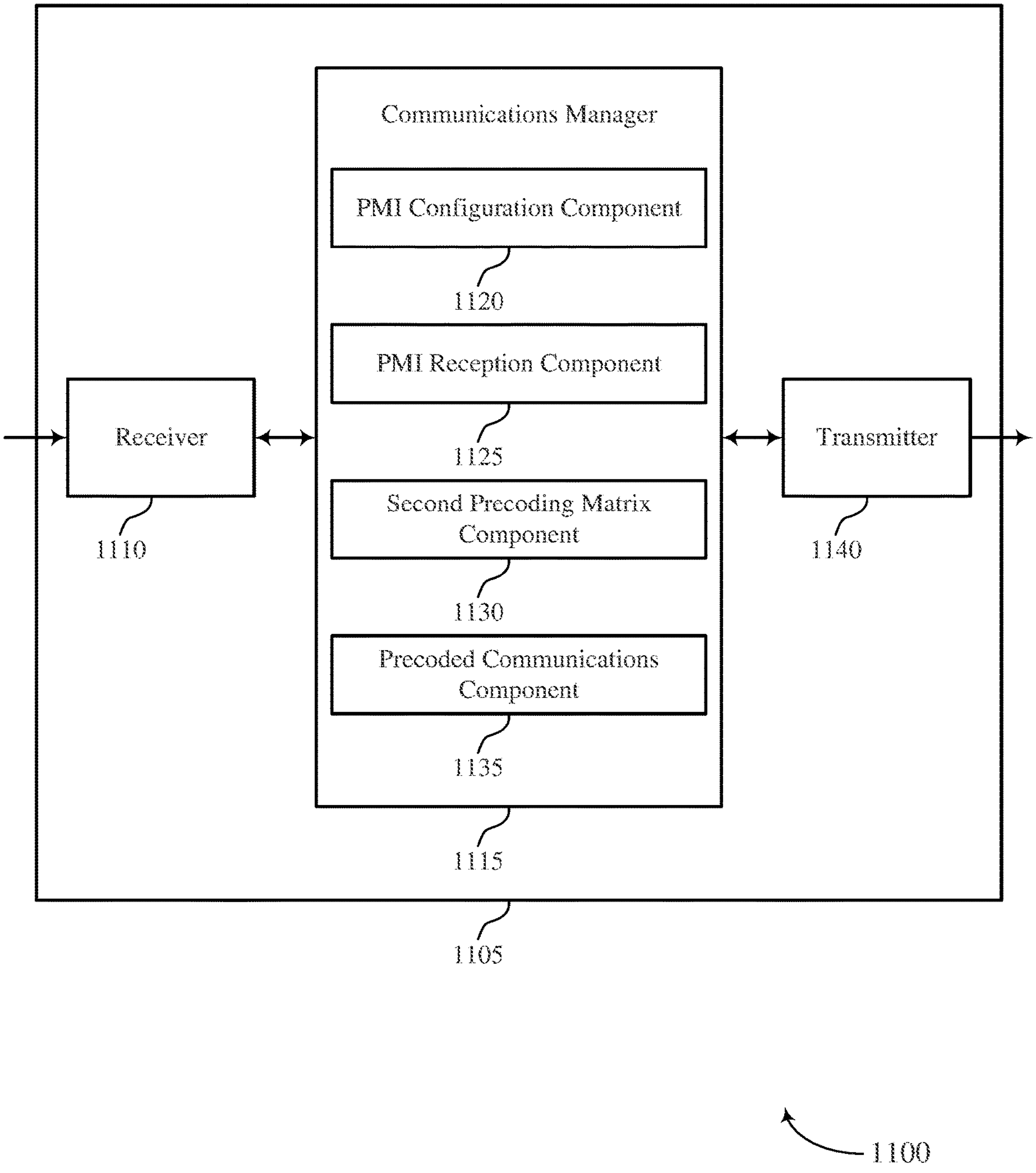

FIG. 11 shows a block diagram 1100 of a device 1105 that supports CSI feedback for multiple TRPs in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to CSI feedback for multiple TRPs, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a PMI configuration component 1120, a PMI reception component 1125, a second precoding matrix component 1130, and a precoded communications component 1135. The communications manager 1115 may be an example of aspects of the communications manager 1310 described herein.

The PMI configuration component 1120 may transmit, from a base station to a UE, a request for precoding matrix information related to a set of transmission modes associated with a set of TRPs for the base station.

The PMI reception component 1125 may receive, at the base station from the UE, a respective precoding matrix information report for each transmission mode in a first subset of the set of transmission modes and receive, at the base station from the UE, a respective partial precoding matrix information report for each transmission mode in a second subset of the set of transmission modes.

The second precoding matrix component 1130 may determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset.

The precoded communications component 1135 may communicate with the UE based on the precoding matrix for the transmission mode in the second subset.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
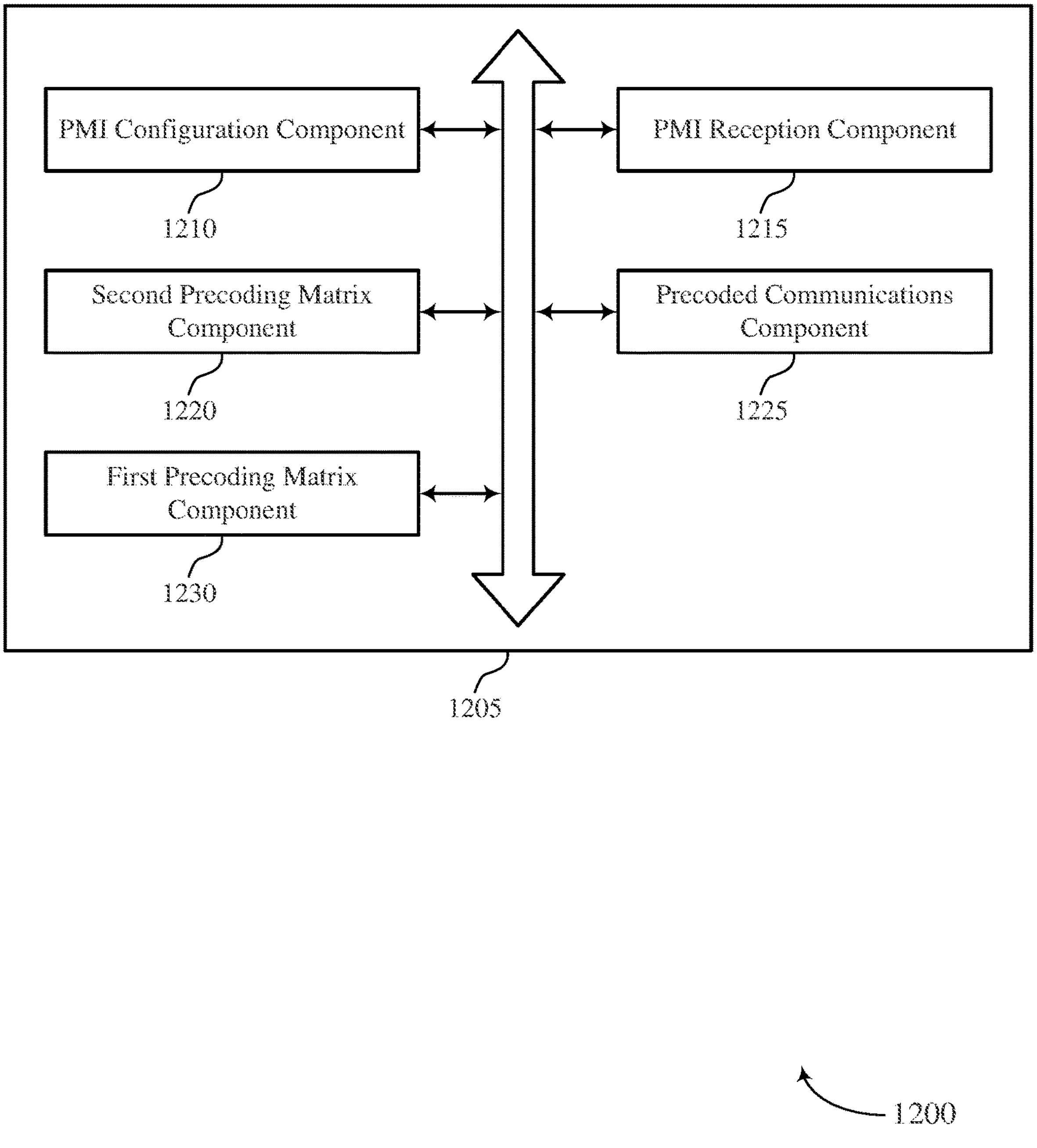
FIG. 12 shows a block diagram of a communications manager that supports CSI feedback for multiple TRPs in accordance with aspects of the present disclosure.

FIG. 12 shows a block diagram 1200 of a communications manager 1205 that supports CSI feedback for multiple TRPs in accordance with aspects of the present disclosure. The communications manager 1205 may be an example of aspects of a communications manager 1015, a communications manager 1115, or a communications manager 1310 described herein. The communications manager 1205 may include a PMI configuration component 1210, a PMI reception component 1215, a second precoding matrix component 1220, a precoded communications component 1225, and a first precoding matrix component 1230. Each of these modules may communicate, directly or indirectly, with one another (e.g., via one or more buses).

The PMI configuration component 1210 may transmit, from a base station to a UE, a request for precoding matrix information related to a set of transmission modes associated with a set of TRPs for the base station.

The PMI reception component 1215 may receive, at the base station from the UE, a respective precoding matrix information report for each transmission mode in a first subset of the set of transmission modes. In some examples, the PMI reception component 1215 may receive, at the base station from the UE, a respective partial precoding matrix information report for each transmission mode in a second subset of the set of transmission modes. In some cases, each transmission mode in the first subset of the set of transmission modes corresponds to a single TRP of the set of TRPs. In some cases, each transmission mode in the second subset of the set of transmission modes corresponds to at least two TRPs of the set of TRPs.

The first precoding matrix component 1230 may determine the precoding matrix for the first transmission mode in the first subset based on the spatial domain basis matrix and the coefficient matrix. In some examples, the first precoding matrix component 1230 may determine the precoding matrix for the transmission mode in the first subset based on the spatial domain basis matrix, the coefficient matrix, and the frequency domain basis matrix.

The second precoding matrix component 1220 may determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset.

The second precoding matrix component 1220 may determine the precoding matrix for the transmission mode in the second subset based on a first set of columns within the first precoding matrix for the first transmission mode in the first subset and a second set of columns within the second precoding matrix for the second transmission mode in the first subset, where the first set of columns includes the first quantity of columns and the second set of columns includes the second quantity of columns. In some examples, the second precoding matrix component 1220 may determine a block diagonalization of the first set of columns and the second set of columns.

In some examples, the second precoding matrix component 1220 may determine the precoding matrix for the transmission mode in the second subset based on the first set of one or more columns within the first precoding matrix for the first transmission mode in the first subset and the second set of one or more columns within the second precoding matrix for the second transmission mode in the first subset. In some examples, the second precoding matrix component 1220 may determine a block diagonalization of the first set of one or more columns and the second set of one or more columns.

In some examples, the second precoding matrix component 1220 may determine the precoding matrix for the transmission mode in the second subset based on a first product of the spatial domain basis matrix for the first transmission mode in the first subset and the first alternative coefficient matrix and based on a second product of a second spatial domain basis matrix for the second transmission mode in the first subset and the second alternative coefficient matrix. In some examples, the second precoding matrix component 1220 may determine a block diagonalization of the first product and the second product. In some examples, the second precoding matrix component 1220 may determine the precoding matrix for a transmission mode in the second subset based on a first product of the first set of one or more columns and the first alternative coefficient matrix and based on a second product of the second set of one or more columns and the second alternative coefficient matrix.

In some examples, determining the precoding matrix for the transmission mode in the second subset based on a first set of columns within the precoding matrix for the first transmission mode in the first subset and a second set of columns within the second precoding matrix for the second transmission mode in the first subset, where the first set of columns includes the first quantity of columns and the second set of columns includes the second quantity of columns. In some examples, the second precoding matrix component 1220 may determine the precoding matrix for the transmission mode in the second subset based on the first set of one or more columns within the precoding matrix for the transmission mode in the first subset and the second set of one or more columns within the second precoding matrix for the second transmission mode in the first subset.

In some examples, the second precoding matrix component 1220 may determine a precoding matrix for a transmission mode in the second subset based on a first product of the spatial domain basis matrix for the first transmission mode in the first subset, the first alternative coefficient matrix, and the frequency domain basis matrix for the first transmission mode in the first subset and based on a second product of a second spatial domain basis matrix for the second transmission mode in the first subset, the second alternative coefficient matrix, and a second frequency domain basis matrix for the second transmission mode in the first subset.

In some examples, the second precoding matrix component 1220 may determine the precoding matrix for the transmission mode in the second subset based on a first product of the spatial domain basis matrix for the first transmission mode in the first subset, the first alternative coefficient matrix, and the frequency domain basis matrix for the first transmission mode in the first subset and based on a second product of the second spatial domain basis matrix for the second transmission mode in the first subset, the second alternative coefficient matrix, and a second frequency domain basis matrix for the second transmission mode in the first subset.

The precoded communications component 1225 may communicate with the UE based on the precoding matrix for the transmission mode in the second subset.

Figure 13:
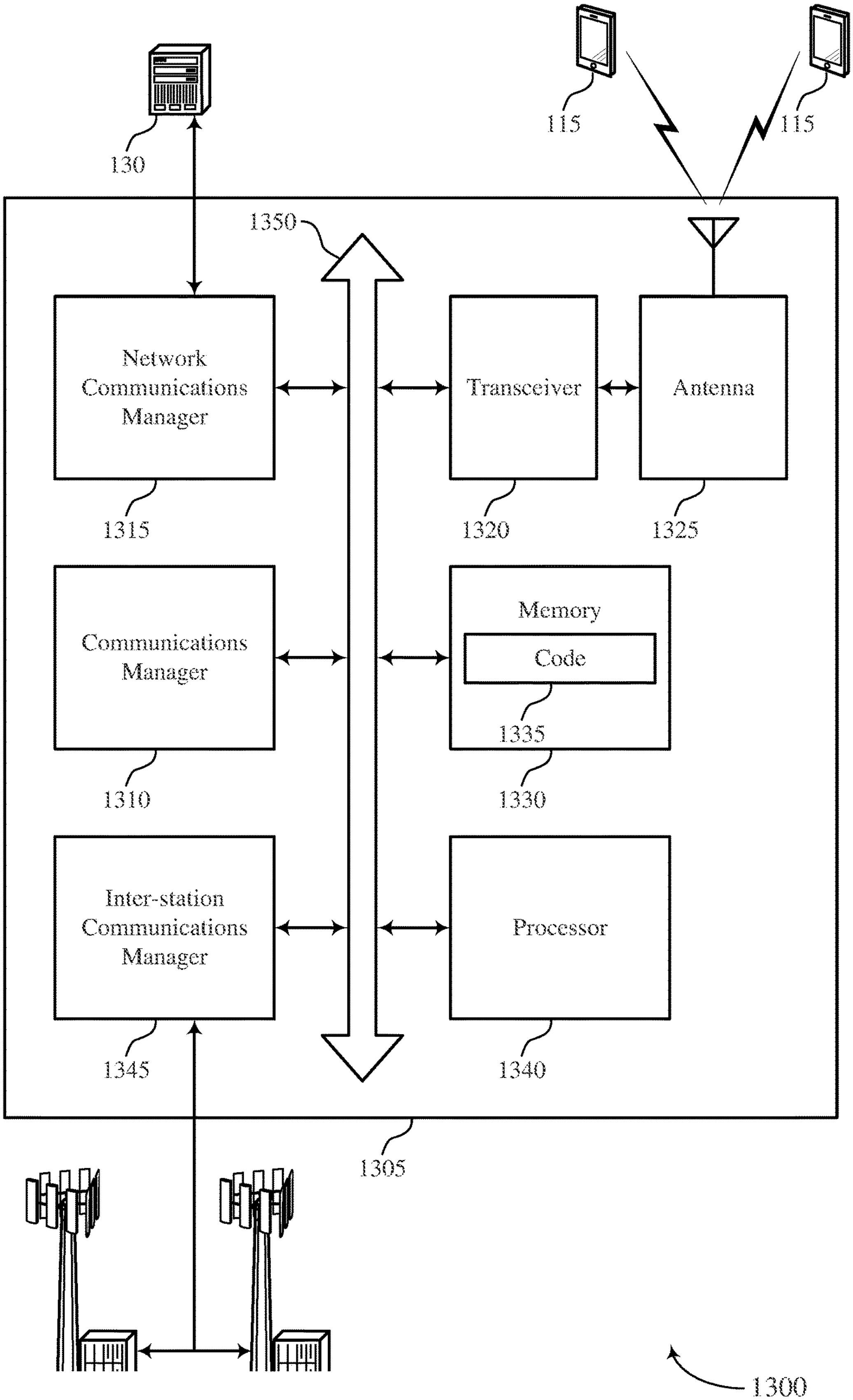
FIG. 13 shows a diagram of a system including a device that supports CSI feedback for multiple TRPs in accordance with aspects of the present disclosure.

FIG. 13 shows a diagram of a system 1300 including a device 1305 that supports CSI feedback for multiple TRPs in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, from a base station to a UE, a request for precoding matrix information related to a set of transmission modes associated with a set of TRPs for the base station, receive, at the base station from the UE, a respective precoding matrix information report for each transmission mode in a first subset of the set of transmission modes, receive, at the base station from the UE, a respective partial precoding matrix information report for each transmission mode in a second subset of the set of transmission modes, determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset, and communicate with the UE based on the precoding matrix for the transmission mode in the second subset.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting CSI feedback for multiple TRPs).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
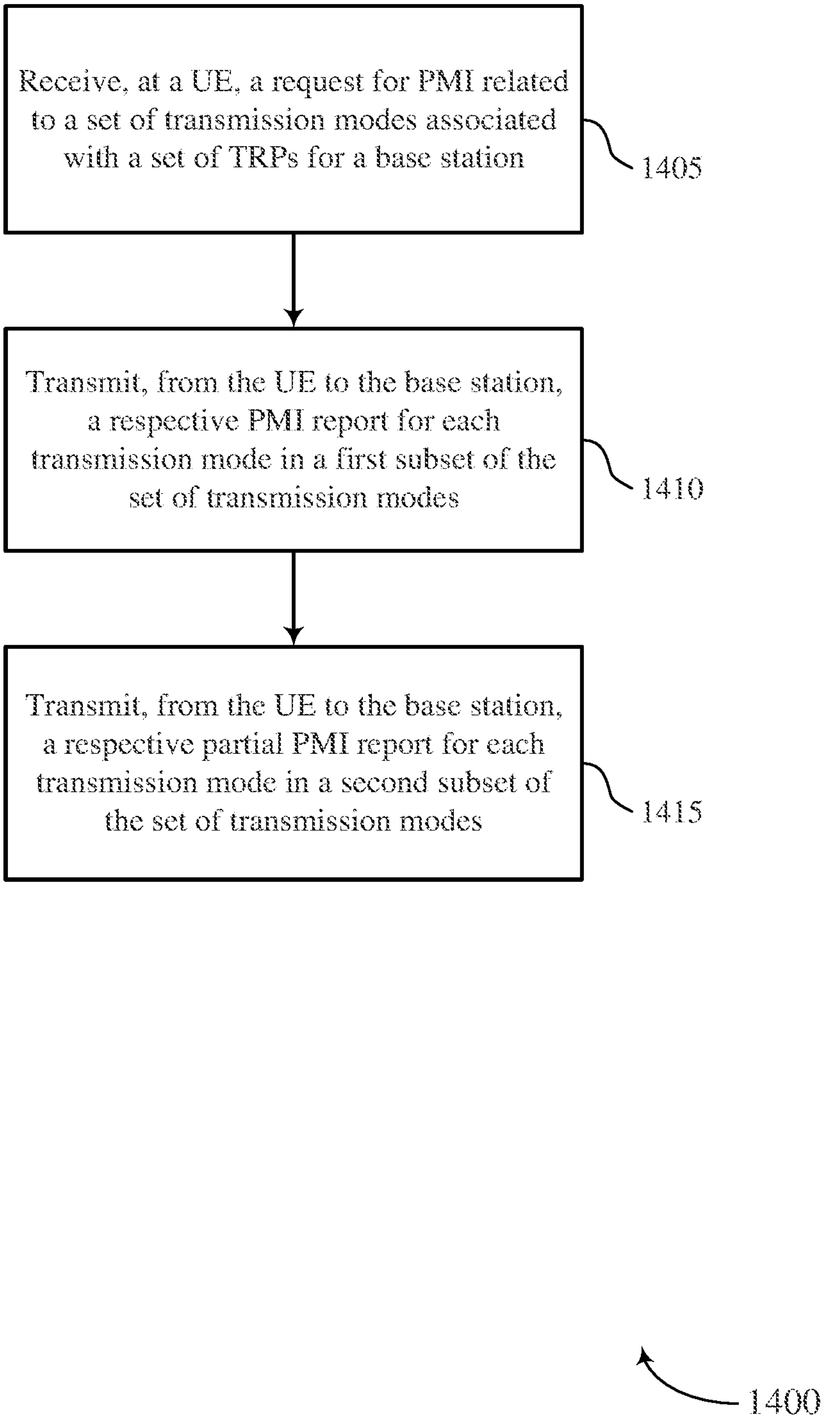
FIGS. 14 through 21 show flowcharts illustrating methods that support CSI feedback for multiple TRPs in accordance with aspects of the present disclosure.

FIG. 14 shows a flowchart illustrating a method 1400 that supports CSI feedback for multiple TRPs in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, at a UE, a request for precoding matrix information related to a set of transmission modes associated with a set of TRPs for a base station. The operations of 1405 may be performed according to the methods described herein. In some examples, aspects of the operations of 1405 may be performed by a PMI configuration reception component as described with reference to FIGS. 6 through 9. Additionally or alternatively, means for performing 1405 may, but not necessarily, include, for example, antenna 925, transceiver 920, communications manager 910, memory 930 (including code 935), processor 940 and/or bus 945.

At 1410, the UE may transmit, from the UE to the base station, a respective precoding matrix information report for each transmission mode in a first subset of the set of transmission modes. The operations of 1410 may be performed according to the methods described herein. In some examples, aspects of the operations of 1410 may be performed by a PMI transmission component as described with reference to FIGS. 6 through 9. Additionally or alternatively, means for performing 1410 may, but not necessarily, include, for example, antenna 925, transceiver 920, communications manager 910, memory 930 (including code 935), processor 940 and/or bus 945.

At 1415, the UE may transmit, from the UE to the base station, a respective partial precoding matrix information report for each transmission mode in a second subset of the set of transmission modes. The operations of 1415 may be performed according to the methods described herein. In some examples, aspects of the operations of 1415 may be performed by a PMI transmission component as described with reference to FIGS. 6 through 9. Additionally or alternatively, means for performing 1415 may, but not necessarily, include, for example, antenna 925, transceiver 920, communications manager 910, memory 930 (including code 935), processor 940 and/or bus 945.

Figure 15:
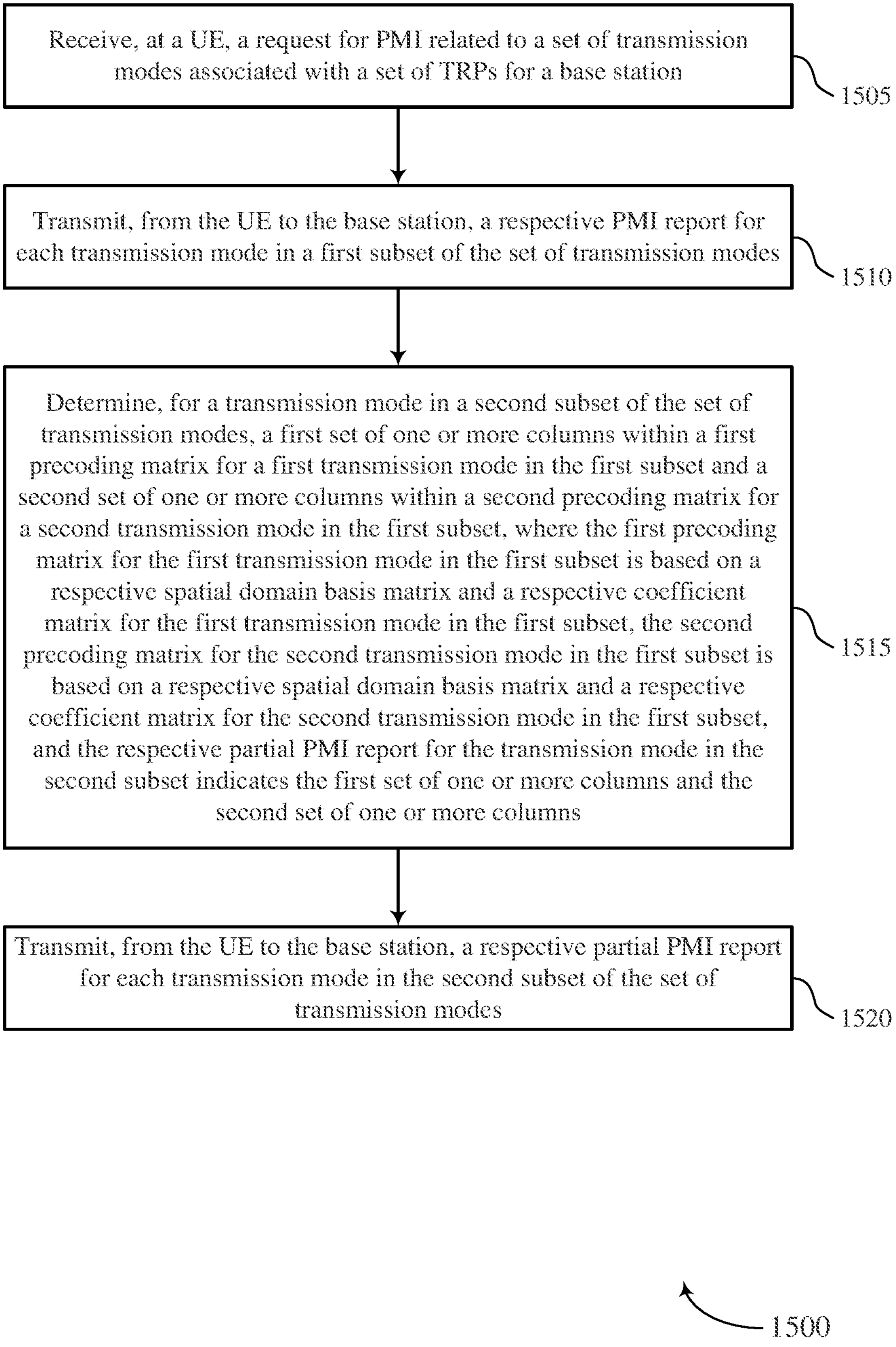

FIG. 15 shows a flowchart illustrating a method 1500 that supports CSI feedback for multiple TRPs in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, at a UE, a request for precoding matrix information related to a set of transmission modes associated with a set of TRPs for a base station. The operations of 1505 may be performed according to the methods described herein. In some examples, aspects of the operations of 1505 may be performed by a PMI configuration reception component as described with reference to FIGS. 6 through 9.

At 1510, the UE may transmit, from the UE to the base station, a respective precoding matrix information report for each transmission mode in a first subset of the set of transmission modes. The operations of 1510 may be performed according to the methods described herein. In some examples, aspects of the operations of 1510 may be performed by a PMI transmission component as described with reference to FIGS. 6 through 9.

At 1515, the UE may determine, for a transmission mode in a second subset of the set of transmission modes, a first set of one or more columns within a first precoding matrix for a first transmission mode in the first subset and a second set of one or more columns within a second precoding matrix for a second transmission mode in the first subset, where the first precoding matrix for the first transmission mode in the first subset is based on a respective spatial domain basis matrix and a respective coefficient matrix for the first transmission mode in the first subset, the second precoding matrix for the second transmission mode in the first subset is based on a respective spatial domain basis matrix and a respective coefficient matrix for the second transmission mode in the first subset, and the respective partial precoding matrix information report for the transmission mode in the second subset indicates the first set of one or more columns and the second set of one or more columns. The operations of 1515 may be performed according to the methods described herein. In some examples, aspects of the operations of 1515 may be performed by a second PMI component as described with reference to FIGS. 6 through 9.

At 1520, the UE may transmit, from the UE to the base station, a respective partial precoding matrix information report for each transmission mode in the second subset of the set of transmission modes, including at least the respective partial precoding matrix information report for the transmission mode in the second subset described with reference to 1515. The operations of 1520 may be performed according to the methods described herein. In some examples, aspects of the operations of 1520 may be performed by a PMI transmission component as described with reference to FIGS. 6 through 9.

Figure 16:
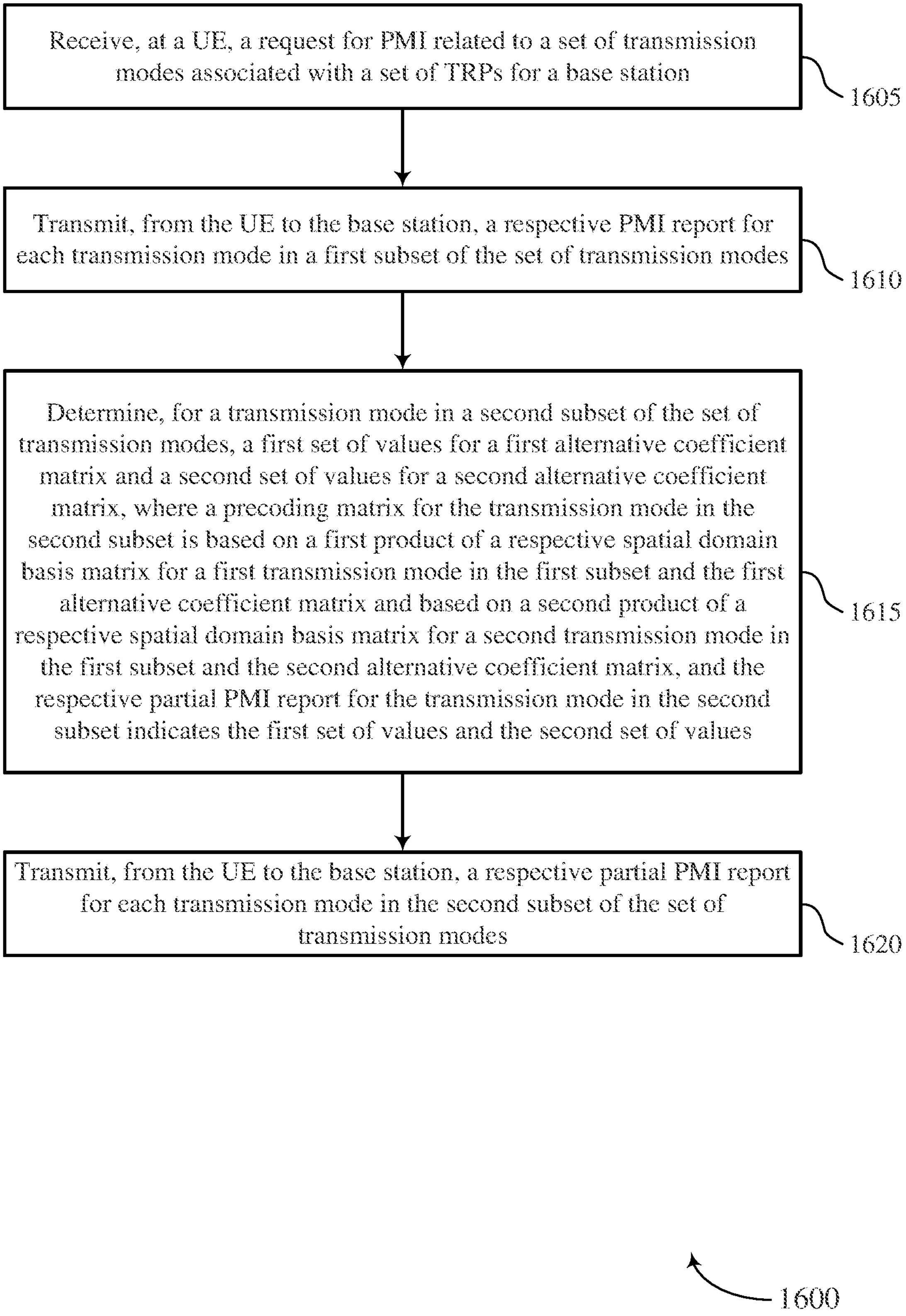

FIG. 16 shows a flowchart illustrating a method 1600 that supports CSI feedback for multiple TRPs in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, at a UE, a request for precoding matrix information related to a set of transmission modes associated with a set of TRPs for a base station. The operations of 1605 may be performed according to the methods described herein. In some examples, aspects of the operations of 1605 may be performed by a PMI configuration reception component as described with reference to FIGS. 6 through 9.

At 1610, the UE may transmit, from the UE to the base station, a respective precoding matrix information report for each transmission mode in a first subset of the set of transmission modes. The operations of 1610 may be performed according to the methods described herein. In some examples, aspects of the operations of 1610 may be performed by a PMI transmission component as described with reference to FIGS. 6 through 9.

At 1615, the UE may determine, for a transmission mode in a second subset of the set of transmission modes, a first set of values for a first alternative coefficient matrix and a second set of values for a second alternative coefficient matrix, where a precoding matrix for the transmission mode in the second subset is based on a first product of a respective spatial domain basis matrix for a first transmission mode in the first subset and the first alternative coefficient matrix and based on a second product of a respective spatial domain basis matrix for a second transmission mode in the first subset and the second alternative coefficient matrix, and the respective partial precoding matrix information report for the transmission mode in the second subset indicates the first set of values and the second set of values. The operations of 1615 may be performed according to the methods described herein. In some examples, aspects of the operations of 1615 may be performed by a second PMI component as described with reference to FIGS. 6 through 9.

At 1620, the UE may transmit, from the UE to the base station, a respective partial precoding matrix information report for each transmission mode in the second subset of the set of transmission modes, including at least the respective partial precoding matrix information report for the transmission mode in the second subset described with reference to 1615. The operations of 1620 may be performed according to the methods described herein. In some examples, aspects of the operations of 1620 may be performed by a PMI transmission component as described with reference to FIGS. 6 through 9.

Figure 17:
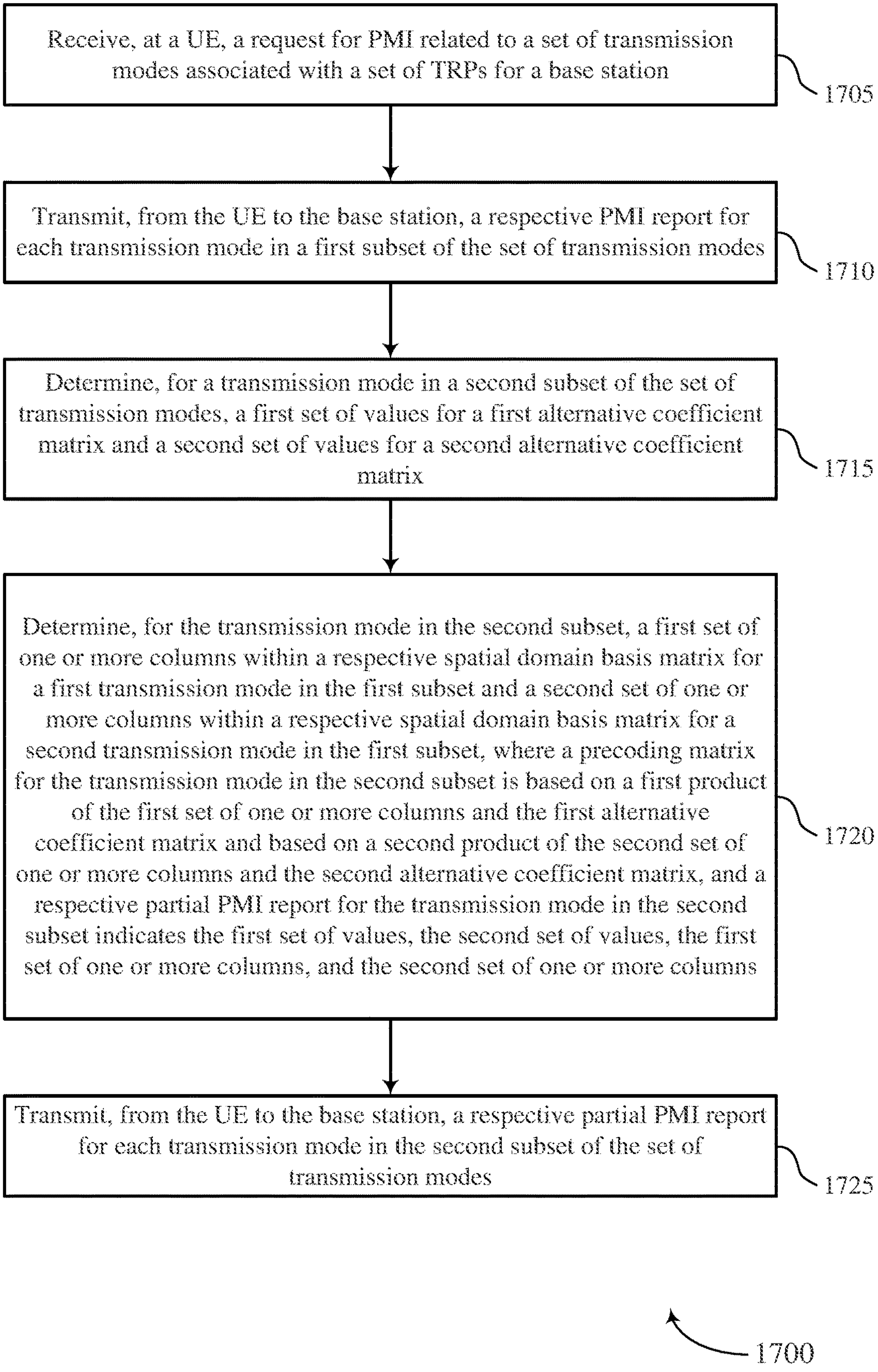

FIG. 17 shows a flowchart illustrating a method 1700 that supports CSI feedback for multiple TRPs in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, at a UE, a request for precoding matrix information related to a set of transmission modes associated with a set of TRPs for a base station. The operations of 1705 may be performed according to the methods described herein. In some examples, aspects of the operations of 1705 may be performed by a PMI configuration reception component as described with reference to FIGS. 6 through 9.

At 1710, the UE may transmit, from the UE to the base station, a respective precoding matrix information report for each transmission mode in a first subset of the set of transmission modes. The operations of 1710 may be performed according to the methods described herein. In some examples, aspects of the operations of 1710 may be performed by a PMI transmission component as described with reference to FIGS. 6 through 9.

At 1715, the UE may determine, for a transmission mode in a second subset of the set of transmission modes, a first set of values for a first alternative coefficient matrix and a second set of values for a second alternative coefficient matrix. The operations of 1715 may be performed according to the methods described herein. In some examples, aspects of the operations of 1715 may be performed by a second PMI component as described with reference to FIGS. 6 through 9.

At 1720, the UE may determine, for the transmission mode in the second subset, a first set of one or more columns within a respective spatial domain basis matrix for a first transmission mode in the first subset and a second set of one or more columns within a respective spatial domain basis matrix for a second transmission mode in the first subset, where a precoding matrix for the transmission mode in the second subset is based on a first product of the first set of one or more columns and the first alternative coefficient matrix and based on a second product of the second set of one or more columns and the second alternative coefficient matrix, and a respective partial precoding matrix information report for the transmission mode in the second subset indicates the first set of values, the second set of values, the first set of one or more columns, and the second set of one or more columns. The operations of 1720 may be performed according to the methods described herein. In some examples, aspects of the operations of 1720 may be performed by a second PMI component as described with reference to FIGS. 6 through 9.

At 1725, the UE may transmit, from the UE to the base station, a respective partial precoding matrix information report for each transmission mode in the second subset of the set of transmission modes, including at least the respective partial precoding matrix information report for the transmission mode in the second subset described with reference to 1715 and 1720. The operations of 1725 may be performed according to the methods described herein. In some examples, aspects of the operations of 1725 may be performed by a PMI transmission component as described with reference to FIGS. 6 through 9.

Figure 18:
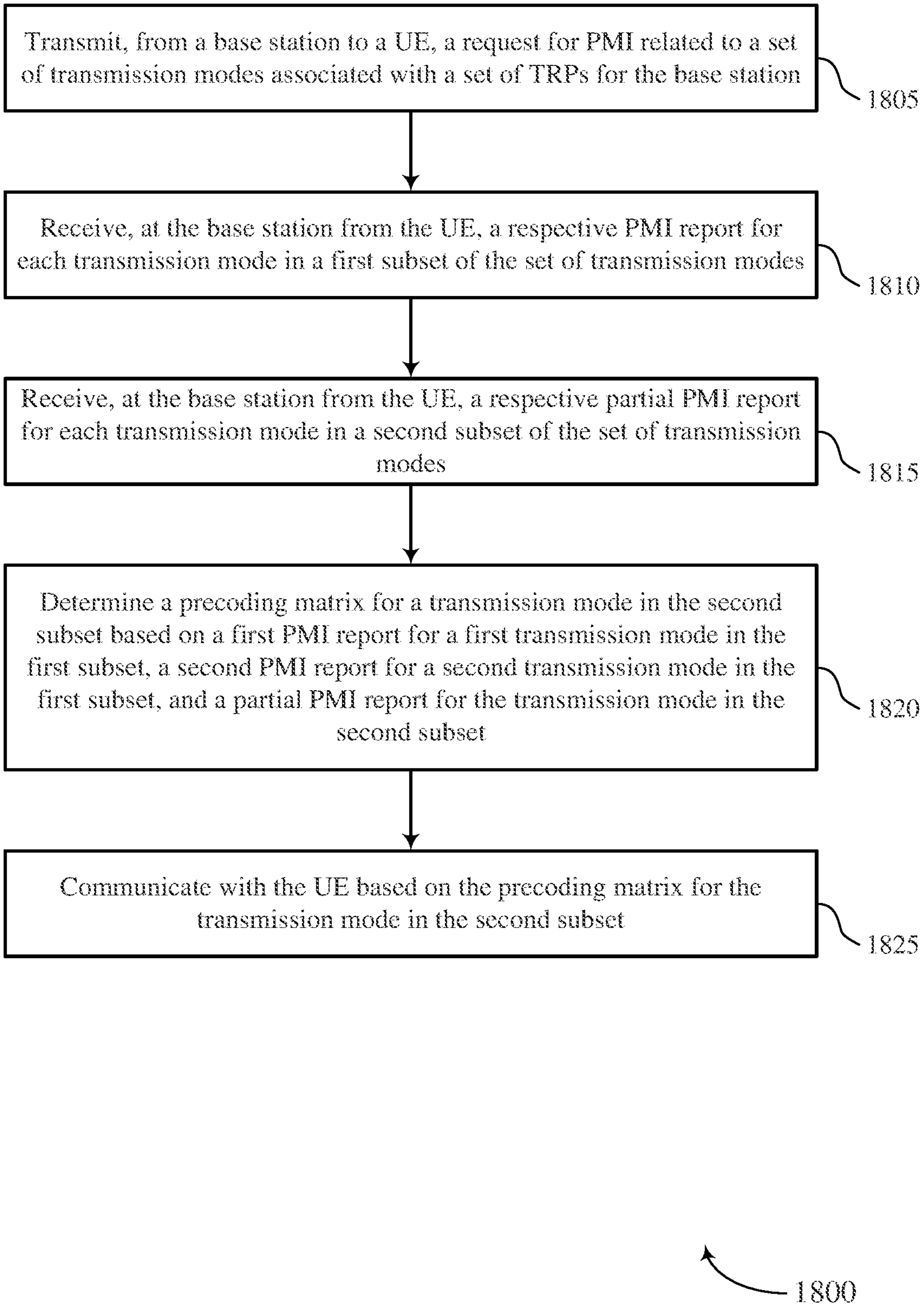

FIG. 18 shows a flowchart illustrating a method 1800 that supports CSI feedback for multiple TRPs in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, from a base station to a UE, a request for precoding matrix information related to a set of transmission modes associated with a set of TRPs for the base station. The operations of 1805 may be performed according to the methods described herein. In some examples, aspects of the operations of 1805 may be performed by a PMI configuration component as described with reference to FIGS. 10 through 13. Additionally or alternatively, means for performing 1805 may, but not necessarily, include, for example, antenna 1325, transceiver 1320, communications manager 1310, memory 1330 (including code 1335), processor 1340 and/or bus 1350.

At 1810, the base station may receive, at the base station from the UE, a respective precoding matrix information report for each transmission mode in a first subset of the set of transmission modes. The operations of 1810 may be performed according to the methods described herein. In some examples, aspects of the operations of 1810 may be performed by a PMI reception component as described with reference to FIGS. 10 through 13. Additionally or alternatively, means for performing 1810 may, but not necessarily, include, for example, antenna 1325, transceiver 1320, communications manager 1310, memory 1330 (including code 1335), processor 1340 and/or bus 1350.

At 1815, the base station may receive, at the base station from the UE, a respective partial precoding matrix information report for each transmission mode in a second subset of the set of transmission modes. The operations of 1815 may be performed according to the methods described herein. In some examples, aspects of the operations of 1815 may be performed by a PMI reception component as described with reference to FIGS. 10 through 13. Additionally or alternatively, means for performing 1815 may, but not necessarily, include, for example, antenna 1325, transceiver 1320, communications manager 1310, memory 1330 (including code 1335), processor 1340 and/or bus 1350.

At 1820, the base station may determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset. The operations of 1820 may be performed according to the methods described herein. In some examples, aspects of the operations of 1820 may be performed by a second precoding matrix component as described with reference to FIGS. 10 through 13. Additionally or alternatively, means for performing 1820 may, but not necessarily, include, for example, antenna 1325, transceiver 1320, communications manager 1310, memory 1330 (including code 1335), processor 1340 and/or bus 1350.

At 1825, the base station may communicate with the UE based on the precoding matrix for the transmission mode in the second subset. The operations of 1825 may be performed according to the methods described herein. In some examples, aspects of the operations of 1825 may be performed by a precoded communications component as described with reference to FIGS. 10 through 13. Additionally or alternatively, means for performing 1825 may, but not necessarily, include, for example, antenna 1325, transceiver 1320, communications manager 1310, memory 1330 (including code 1335), processor 1340 and/or bus 1350.

Figure 19:
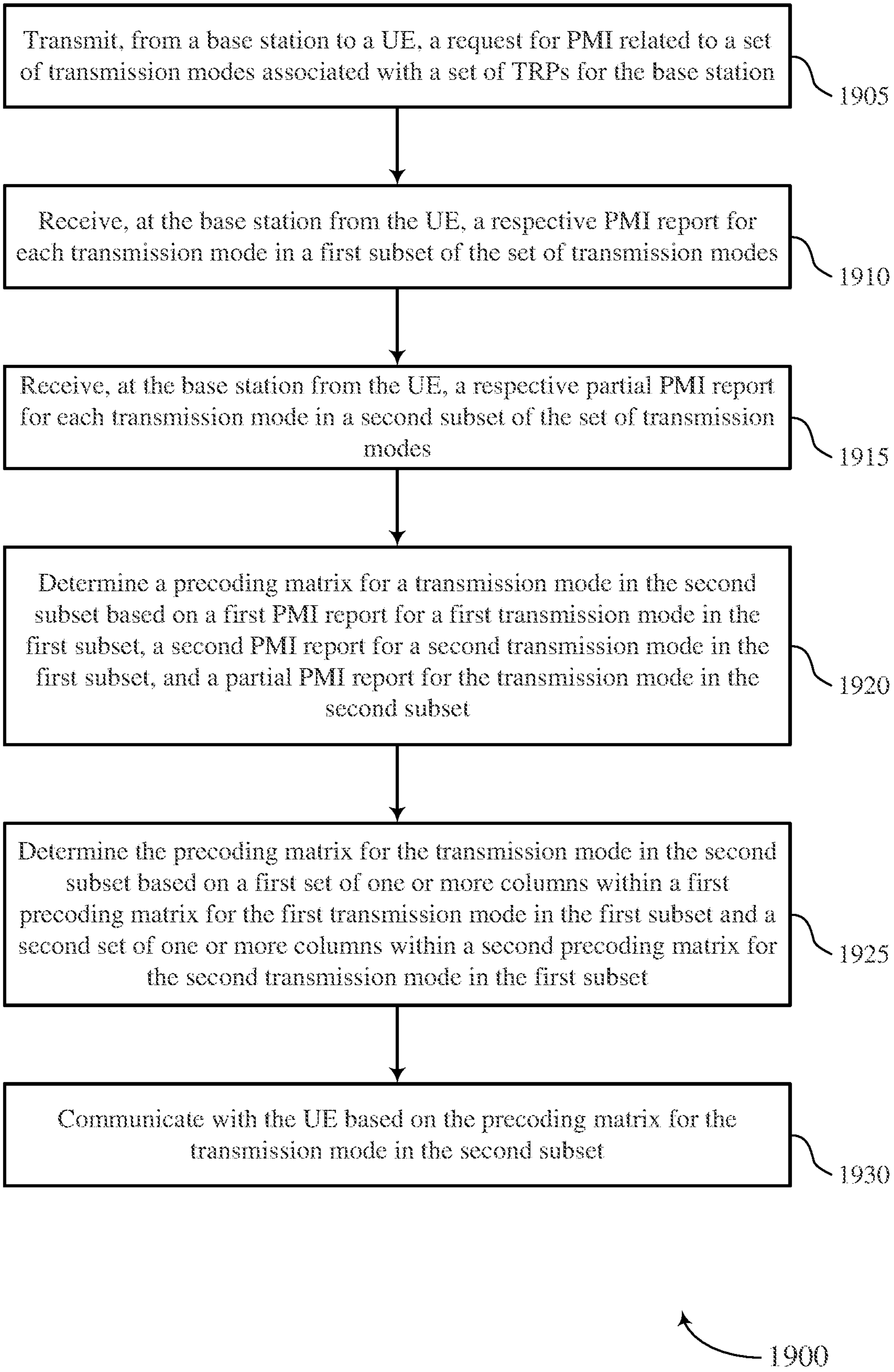

FIG. 19 shows a flowchart illustrating a method 1900 that supports CSI feedback for multiple TRPs in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit, from a base station to a UE, a request for precoding matrix information related to a set of transmission modes associated with a set of TRPs for the base station. The operations of 1905 may be performed according to the methods described herein. In some examples, aspects of the operations of 1905 may be performed by a PMI configuration component as described with reference to FIGS. 10 through 13.

At 1910, the base station may receive, at the base station from the UE, a respective precoding matrix information report for each transmission mode in a first subset of the set of transmission modes. The operations of 1910 may be performed according to the methods described herein. In some examples, aspects of the operations of 1910 may be performed by a PMI reception component as described with reference to FIGS. 10 through 13.

At 1915, the base station may receive, at the base station from the UE, a respective partial precoding matrix information report for each transmission mode in a second subset of the set of transmission modes. The operations of 1915 may be performed according to the methods described herein. In some examples, aspects of the operations of 1915 may be performed by a PMI reception component as described with reference to FIGS. 10 through 13.

At 1920, the base station may determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset. The operations of 1920 may be performed according to the methods described herein. In some examples, aspects of the operations of 1920 may be performed by a second precoding matrix component as described with reference to FIGS. 10 through 13.

At 1925, the base station may determine the precoding matrix for the transmission mode in the second subset based on a first set of one or more columns within a first precoding matrix for the first transmission mode in the first subset and a second set of one or more columns within a second precoding matrix for the second transmission mode in the first subset. The operations of 1925 may be performed according to the methods described herein. In some examples, aspects of the operations of 1925 may be performed by a second precoding matrix component as described with reference to FIGS. 10 through 13.

At 1930, the base station may communicate with the UE based on the precoding matrix for the transmission mode in the second subset. The operations of 1930 may be performed according to the methods described herein. In some examples, aspects of the operations of 1930 may be performed by a precoded communications component as described with reference to FIGS. 10 through 13.

Figure 20:
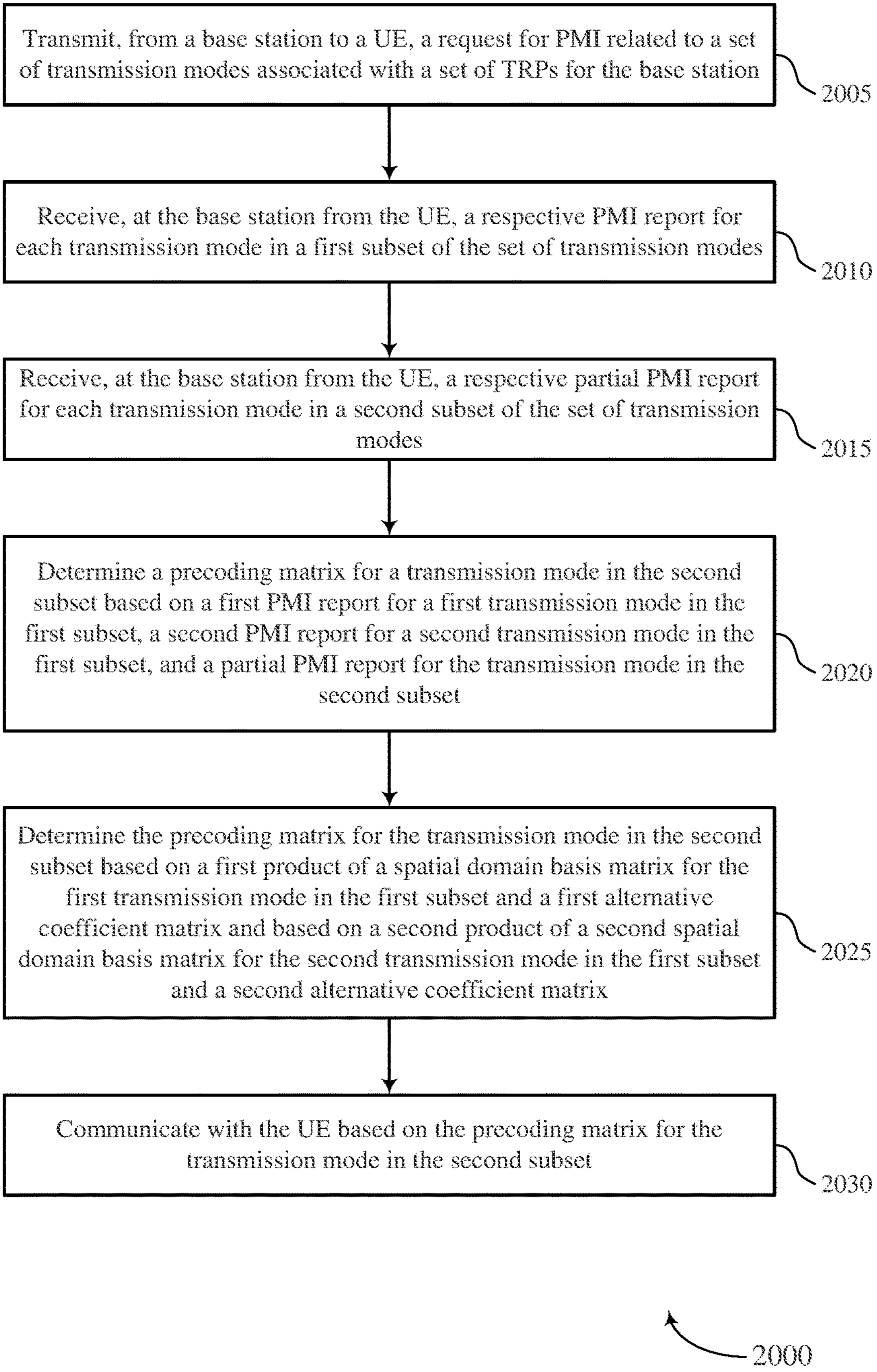

FIG. 20 shows a flowchart illustrating a method 2000 that supports CSI feedback for multiple TRPs in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit, from a base station to a UE, a request for precoding matrix information related to a set of transmission modes associated with a set of TRPs for the base station. The operations of 2005 may be performed according to the methods described herein. In some examples, aspects of the operations of 2005 may be performed by a PMI configuration component as described with reference to FIGS. 10 through 13.

At 2010, the base station may receive, at the base station from the UE, a respective precoding matrix information report for each transmission mode in a first subset of the set of transmission modes. The operations of 2010 may be performed according to the methods described herein. In some examples, aspects of the operations of 2010 may be performed by a PMI reception component as described with reference to FIGS. 10 through 13.

At 2015, the base station may receive, at the base station from the UE, a respective partial precoding matrix information report for each transmission mode in a second subset of the set of transmission modes. The operations of 2015 may be performed according to the methods described herein. In some examples, aspects of the operations of 2015 may be performed by a PMI reception component as described with reference to FIGS. 10 through 13.

At 2020, the base station may determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset. The operations of 2020 may be performed according to the methods described herein. In some examples, aspects of the operations of 2020 may be performed by a second precoding matrix component as described with reference to FIGS. 10 through 13.

At 2025, the base station may determine the precoding matrix for the transmission mode in the second subset based on a first product of a spatial domain basis matrix for the first transmission mode in the first subset and a first alternative coefficient matrix and based on a second product of a second spatial domain basis matrix for the second transmission mode in the first subset and a second alternative coefficient matrix. The operations of 2025 may be performed according to the methods described herein. In some examples, aspects of the operations of 2025 may be performed by a second precoding matrix component as described with reference to FIGS. 10 through 13.

At 2030, the base station may communicate with the UE based on the precoding matrix for the transmission mode in the second subset. The operations of 2030 may be performed according to the methods described herein. In some examples, aspects of the operations of 2030 may be performed by a precoded communications component as described with reference to FIGS. 10 through 13.

Figure 21:
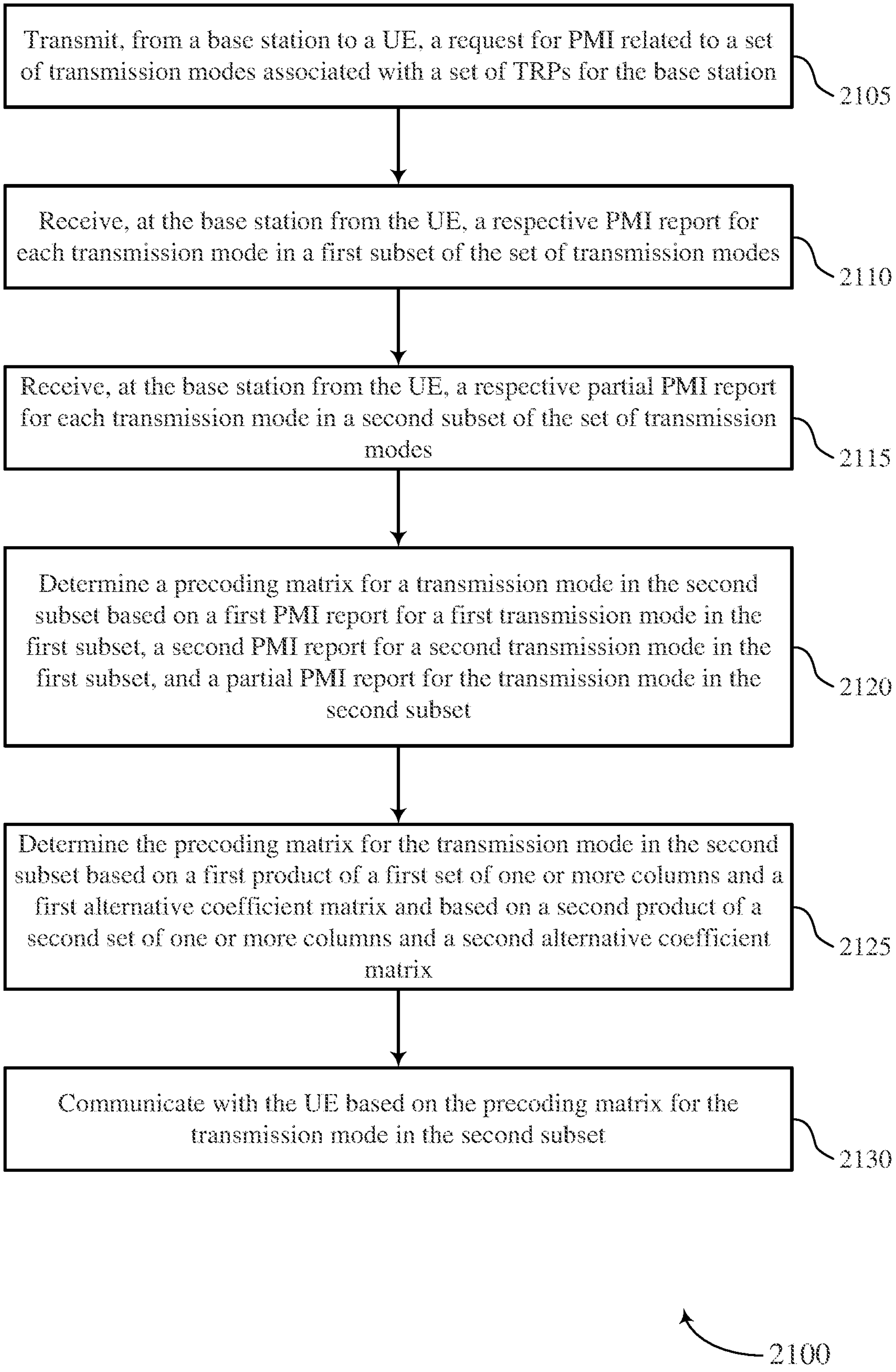

FIG. 21 shows a flowchart illustrating a method 2100 that supports CSI feedback for multiple TRPs in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may transmit, from a base station to a UE, a request for precoding matrix information related to a set of transmission modes associated with a set of TRPs for the base station. The operations of 2105 may be performed according to the methods described herein. In some examples, aspects of the operations of 2105 may be performed by a PMI configuration component as described with reference to FIGS. 10 through 13.

At 2110, the base station may receive, at the base station from the UE, a respective precoding matrix information report for each transmission mode in a first subset of the set of transmission modes. The operations of 2110 may be performed according to the methods described herein. In some examples, aspects of the operations of 2110 may be performed by a PMI reception component as described with reference to FIGS. 10 through 13.

At 2115, the base station may receive, at the base station from the UE, a respective partial precoding matrix information report for each transmission mode in a second subset of the set of transmission modes. The operations of 2115 may be performed according to the methods described herein. In some examples, aspects of the operations of 2115 may be performed by a PMI reception component as described with reference to FIGS. 10 through 13.

At 2120, the base station may determine a precoding matrix for a transmission mode in the second subset based on a first precoding matrix information report for a first transmission mode in the first subset, a second precoding matrix information report for a second transmission mode in the first subset, and a partial precoding matrix information report for the transmission mode in the second subset. The operations of 2120 may be performed according to the methods described herein. In some examples, aspects of the operations of 2120 may be performed by a second precoding matrix component as described with reference to FIGS. 10 through 13.

At 2125, the base station may determine the precoding matrix for the transmission mode in the second subset based on a first product of a first set of one or more columns and a first alternative coefficient matrix and based on a second product of a second set of one or more columns and a second alternative coefficient matrix. The operations of 2125 may be performed according to the methods described herein. In some examples, aspects of the operations of 2125 may be performed by a second precoding matrix component as described with reference to FIGS. 10 through 13.

At 2130, the base station may communicate with the UE based on the precoding matrix for the transmission mode in the second subset. The operations of 2130 may be performed according to the methods described herein. In some examples, aspects of the operations of 2130 may be performed by a precoded communications component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the term "set" or "subset" indicates a group of one or more.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

receiving, at a user equipment (UE), a request for precoding matrix information related to a plurality of transmission modes associated with a plurality of transmission reception points for a network device;

transmitting, from the UE to the network device, a respective precoding matrix information report for each transmission mode in a first subset of the plurality of transmission modes, wherein each transmission mode in the first subset of the plurality of transmission modes corresponds to transmission from a single transmission reception point of the plurality of transmission reception points; and transmitting, from the UE to the network device, a respective partial precoding matrix information report for each transmission mode in a second subset of the plurality of transmission modes, wherein each transmission mode in the second subset of the plurality of transmission modes corresponds to transmission from at least two transmission reception points of the plurality of transmission reception points, wherein the respective partial precoding matrix information report for each transmission mode in the second subset indicates a set of respective multiple columns selected by the UE as sub-portions of a respective matrix for each transmission reception point of a combination of transmission reception points associated with a respective transmission mode in the second subset, wherein a respective precoding matrix associated with each transmission mode in the second subset corresponds to a block diagonalization of the set of respective multiple columns selected for each respective transmission reception point of the combination of transmission reception points associated with the respective transmission mode, and wherein each respective partial precoding matrix information report comprises a smaller quantity of bits than each respective precoding matrix information report.

2. The method of claim 1, further comprising:

determining, for each transmission mode in the first subset, a respective first set of values for a respective spatial domain basis matrix; and determining, for each transmission mode in the first subset, a respective second set of values for a respective coefficient matrix, each element of the respective coefficient matrix comprising a coefficient for a corresponding beam within a corresponding transmission layer, wherein:

the respective precoding matrix information report for a transmission mode in the first subset indicates the respective first set of values and the respective second set of values for the transmission mode in the first subset.

3. The method of claim 2, further comprising:

determining, for a transmission mode in the second subset, a first quantity of columns within a first precoding matrix for a first transmission mode in the first subset and a second quantity of columns within a second precoding matrix for a second transmission mode in the first subset, wherein:

the first precoding matrix for the first transmission mode in the first subset is based at least in part on the respective spatial domain basis matrix and the respective coefficient matrix for the first transmission mode in the first subset;

the second precoding matrix for the second transmission mode in the first subset is based at least in part on the respective spatial domain basis matrix and the respective coefficient matrix for the second transmission mode in the first subset; and the respective partial precoding matrix information report for the transmission mode in the second subset indicates the first quantity of columns and the second quantity of columns.

4. The method of claim 2, further comprising:

determining, for a transmission mode in the second subset, a first set of one or more columns within a first precoding matrix for a first transmission mode in the first subset and a second set of one or more columns within a second precoding matrix for a second transmission mode in the first subset, wherein:

the first precoding matrix for the first transmission mode in the first subset is based at least in part on the respective spatial domain basis matrix and the respective coefficient matrix for the first transmission mode in the first subset;

the second precoding matrix for the second transmission mode in the first subset is based at least in part on the respective spatial domain basis matrix and the respective coefficient matrix for the second transmission mode in the first subset; and the respective partial precoding matrix information report for the transmission mode in the second subset indicates the first set of one or more columns and the second set of one or more columns.

5. The method of claim 2, further comprising:

determining, for a transmission mode in the second subset, a first set of values for a first alternative coefficient matrix and a second set of values for a second alternative coefficient matrix, wherein:

the respective precoding matrix for the transmission mode in the second subset is based at least in part on a first product of the respective spatial domain basis matrix for a first transmission mode in the first subset and the first alternative coefficient matrix and at least in part on a second product of the respective spatial domain basis matrix for a second transmission mode in the first subset and the second alternative coefficient matrix; and the respective partial precoding matrix information report for the transmission mode in the second subset indicates the first set of values and the second set of values.

6. The method of claim 5, wherein the respective precoding matrix for the transmission mode in the second subset is based at least in part on a block diagonalization of the first product and the second product.

7. The method of claim 2, further comprising:

determining, for a transmission mode in the second subset, a first set of values for a first alternative coefficient matrix and a second set of values for a second alternative coefficient matrix; and determining, for the transmission mode in the second subset, a first set of one or more columns within the respective spatial domain basis matrix for a first transmission mode in the first subset and a second set of one or more columns within the respective spatial domain basis matrix for a second transmission mode in the first subset, wherein:

the respective precoding matrix for the transmission mode in the second subset is based at least in part on a first product of the first set of one or more columns and the first alternative coefficient matrix and at least in part on a second product of the second set of one or more columns and the second alternative coefficient matrix; and the respective partial precoding matrix information report for the transmission mode in the second subset indicates the first set of values, the second set of values, the first set of one or more columns, and the second set of one or more columns.

8. The method of claim 7, wherein the respective precoding matrix for the transmission mode in the second subset is based at least in part on a block diagonalization of the first product and the second product.

9. The method of claim 1, further comprising:

determining, for each transmission mode in the first subset, a respective first set of values for a respective spatial domain basis matrix;

determining, for each transmission mode in the first subset, a respective second set of values for a respective coefficient matrix, wherein elements of the respective coefficient matrix comprise linear combination coefficients for a set of beams; and determining, for each transmission mode in the first subset, a respective third set of values for a respective frequency domain basis matrix, wherein:

the respective precoding matrix information report for a transmission mode in the first subset indicates the respective first set of values, the respective second set of values, and the respective third set of values for the transmission mode in the first subset.

10. The method of claim 9, further comprising:

determining, for a transmission mode in the second subset, a first quantity of columns within a first precoding matrix for a first transmission mode in the first subset and a second quantity of columns within a second precoding matrix for a second transmission mode in the first subset, wherein:

the first precoding matrix for the first transmission mode in the first subset is based at least in part on the respective spatial domain basis matrix, the respective coefficient matrix, and the respective frequency domain basis matrix for the first transmission mode in the first subset;

the second precoding matrix for the second transmission mode in the first subset is based at least in part on the respective spatial domain basis matrix, the respective coefficient matrix, and the respective frequency domain basis matrix for the second transmission mode in the first subset; and the respective partial precoding matrix information report for the transmission mode in the second subset indicates the first quantity of columns and the second quantity of columns.

11. The method of claim 9, further comprising:

determining, for a transmission mode in the second subset, a first set of one or more columns within a first precoding matrix for a first transmission mode in the first subset and a second set of one or more columns within a second precoding matrix for a second transmission mode in the first subset, wherein:

the first precoding matrix for the first transmission mode in the first subset is based at least in part on the respective spatial domain basis matrix, the respective coefficient matrix, and the respective frequency domain basis matrix for the first transmission mode in the first subset;

the second precoding matrix for the second transmission mode in the first subset is based at least in part on the respective spatial domain basis matrix, the respective coefficient matrix, and the respective frequency domain basis matrix for the second transmission mode in the first subset; and the respective partial precoding matrix information report for the transmission mode in the second subset indicates the first set of one or more columns and the second set of one or more columns.

12. The method of claim 9, further comprising:

determining, for a transmission mode in the second subset, a first set of values for a first alternative coefficient matrix and a second set of values for a second alternative coefficient matrix, wherein:

the respective precoding matrix for the transmission mode in the second subset is based at least in part on a block diagonalization of a first product and a second product, the first product being of the respective spatial domain basis matrix for a first transmission mode in the first subset, the first alternative coefficient matrix, and the respective frequency domain basis matrix for the first transmission mode in the first subset and the second product being of the respective spatial domain basis matrix for a second transmission mode in the first subset, the second alternative coefficient matrix, and the respective frequency domain basis matrix for the second transmission mode in the first subset; and the respective partial precoding matrix information report for the transmission mode in the second subset indicates the first set of values and the second set of values.

13. The method of claim 9, further comprising:

determining, for a transmission mode in the second subset, a first set of values for a first alternative coefficient matrix and a second set of values for a second alternative coefficient matrix; and determining, for the transmission mode in the second subset, a first set of one or more columns within the respective spatial domain basis matrix for a first transmission mode in the first subset and a second set of one or more columns within the respective spatial domain basis matrix for a second transmission mode in the first subset, wherein:

the respective precoding matrix for the transmission mode in the second subset is based at least in part on a block diagonalization of a first product and a second product, the first product being of the respective spatial domain basis matrix for the first transmission mode in the first subset, the first alternative coefficient matrix, and the respective frequency domain basis matrix for the first transmission mode in the first subset and the second product being of the respective spatial domain basis matrix for the second transmission mode in the first subset, the second alternative coefficient matrix, and the respective frequency domain basis matrix for the second transmission mode in the first subset; and the respective partial precoding matrix information report for the transmission mode in the second subset indicates the first set of values, the second set of values, the first set of one or more columns, and the second set of one or more columns.

14. The method of claim 9, wherein:

the respective first set of values for a first transmission mode corresponds to a first set of one or more codebook indices for a precoding matrix for the first transmission mode; and the respective third set of values for the first transmission mode corresponds to a second set of one or more codebook indices for the precoding matrix for the first transmission mode.

15. The method of claim 1, wherein:

the respective precoding matrix information report for a transmission mode in the first subset comprises a first quantity of information; and the respective partial precoding matrix information report for a transmission mode in the second subset comprises a second quantity of information that is less than the first quantity of information.

16. The method of claim 1, wherein the plurality of transmission reception points comprises three of more transmission reception points, and wherein the second subset of the plurality of transmission modes comprises two or more transmission modes.

17. A method for wireless communication, comprising:

transmitting, from a network device to a user equipment (UE), a request for precoding matrix information related to a plurality of transmission modes associated with a plurality of transmission reception points for the network device;

receiving, at the network device from the UE, a respective precoding matrix information report for each transmission mode in a first subset of the plurality of transmission modes, wherein each transmission mode in the first subset of the plurality of transmission modes corresponds to transmission from a single transmission reception point of the plurality of transmission reception points;

receiving, at the network device from the UE, a respective partial precoding matrix information report for each transmission mode in a second subset of the plurality of transmission modes, wherein each transmission mode in the second subset of the plurality of transmission modes corresponds to transmission from at least two transmission reception points of the plurality of transmission reception points, wherein the respective partial precoding matrix information report for each transmission mode in the second subset indicates a set of respective multiple columns that are sub-portions of a respective matrix for each transmission reception point of a combination of transmission reception points associated with a respective transmission mode in the second subset, wherein a respective precoding matrix associated with each transmission mode in the second subset corresponds to a block diagonalization of the set of respective multiple columns for each respective transmission reception point of the combination of transmission reception points associated with the respective transmission mode, and wherein each respective partial precoding matrix information report comprises a smaller quantity of bits than each respective precoding matrix information report;

determining the respective precoding matrix for a transmission mode in the second subset based at least in part on a first precoding matrix information report for a first transmission mode in the first subset, a second precoding matrix information report for a second transmission mode in the first subset, and a partial precoding matrix information report for the transmission mode in the second subset; and communicating with the UE based at least in part on the respective precoding matrix for the transmission mode in the second subset.

18. The method of claim 17, wherein the first precoding matrix information report for the first transmission mode in the first subset indicates a first set of values for a spatial domain basis matrix and a second set of values for a coefficient matrix, each element of the coefficient matrix comprising a coefficient for a corresponding beam within a corresponding transmission layer, the method further comprising:

determining a first precoding matrix for the first transmission mode in the first subset based at least in part on the spatial domain basis matrix and the coefficient matrix.

19. The method of claim 18, wherein the partial precoding matrix information report for the transmission mode in the second subset indicates a first quantity of columns within the first precoding matrix for the first transmission mode in the first subset and a second quantity of columns within a second precoding matrix for the second transmission mode in the first subset, the method further comprising:

determining the respective precoding matrix for the transmission mode in the second subset based at least in part on a block diagonalization of a first set of columns within the first precoding matrix for the first transmission mode in the first subset and a second set of columns within the second precoding matrix for the second transmission mode in the first subset, wherein the first set of columns comprises the first quantity of columns and the second set of columns comprises the second quantity of columns.

20. The method of claim 18, wherein the partial precoding matrix information report for the transmission mode in the second subset indicates a first set of one or more columns within the first precoding matrix for the first transmission mode in the first subset and a second set of one or more columns within a second precoding matrix for the second transmission mode in the first subset, the method further comprising:

determining the respective precoding matrix for the transmission mode in the second subset based at least in part on a block diagonalization of the first set of one or more columns within the first precoding matrix for the first transmission mode in the first subset and the second set of one or more columns within the second precoding matrix for the second transmission mode in the first subset.

21. The method of claim 18, wherein the partial precoding matrix information report for the transmission mode in the second subset indicates a first set of values for a first alternative coefficient matrix and a second set of values for a second alternative coefficient matrix, the method further comprising:

determining the respective precoding matrix for the transmission mode in the second subset based at least in part on a block diagonalization of a first product and a second product, the first product being of the spatial domain basis matrix for the first transmission mode in the first subset and the first alternative coefficient matrix and the second product being of a second spatial domain basis matrix for the second transmission mode in the first subset and the second alternative coefficient matrix.

22. The method of claim 18, wherein the partial precoding matrix information report for the transmission mode in the second subset indicates a first set of values for a first alternative coefficient matrix, a second set of values for a second alternative coefficient matrix, a first set of one or more columns within the spatial domain basis matrix for the first transmission mode in the first subset, and a second set of one or more columns within a second spatial domain basis matrix for the second transmission mode in the first subset, the method further comprising:

determining the respective precoding matrix for a transmission mode in the second subset based at least in part on a block diagonalization of a first product and a second product, the first product being of the first set of one or more columns and the first alternative coefficient matrix and the second product being of the second set of one or more columns and the second alternative coefficient matrix.

23. The method of claim 17, wherein the first precoding matrix information report for the first transmission mode in the first subset indicates a first set of values for a spatial domain basis matrix, a second set of values for a coefficient matrix, and a third set of values for a frequency domain basis matrix, and wherein elements of the coefficient matrix comprise linear combination coefficients for a set of beams, the method further comprising:

determining a first precoding matrix for the transmission mode in the first subset based at least in part on the spatial domain basis matrix, the coefficient matrix, and the frequency domain basis matrix.

24. The method of claim 23, wherein the partial precoding matrix information report for the transmission mode in the second subset indicates a first quantity of columns within the first precoding matrix for the first transmission mode in the first subset and a second quantity of columns within a second precoding matrix for the second transmission mode in the first subset, the method further comprising:

determining the respective precoding matrix for the transmission mode in the second subset based at least in part on a block diagonalization of a first set of columns within the first precoding matrix for the first transmission mode in the first subset and a second set of columns within the second precoding matrix for the second transmission mode in the first subset, wherein the first set of columns comprises the first quantity of columns and the second set of columns comprises the second quantity of columns.

25. The method of claim 23, wherein the partial precoding matrix information report for the transmission mode in the second subset indicates a first set of one or more columns within the first precoding matrix for the first transmission mode in the first subset and a second set of one or more columns within a second precoding matrix for the second transmission mode in the first subset, the method further comprising:

determining the respective precoding matrix for the transmission mode in the second subset based at least in part on a block diagonalization of the first set of one or more columns within the first precoding matrix for the transmission mode in the first subset and the second set of one or more columns within the second precoding matrix for the second transmission mode in the first subset.

26. The method of claim 23, wherein the partial precoding matrix information report for the transmission mode in the second subset indicates a first set of values for a first alternative coefficient matrix and a second set of values for a second alternative coefficient matrix, the method further comprising:

determining a precoding matrix for a transmission mode in the second subset based at least in part on a block diagonalization of a first product and a second product, the first product being of the spatial domain basis matrix for the first transmission mode in the first subset, the first alternative coefficient matrix, and the frequency domain basis matrix for the first transmission mode in the first subset and the second product being of a second spatial domain basis matrix for the second transmission mode in the first subset, the second alternative coefficient matrix, and a second frequency domain basis matrix for the second transmission mode in the first subset.

27. The method of claim 23, wherein the partial precoding matrix information report for the transmission mode in the second subset indicates a first set of values for a first alternative coefficient matrix, a second set of values for a second alternative coefficient matrix, a first set of one or more columns within the spatial domain basis matrix for the first transmission mode in the first subset, and a second set of one or more columns within a second spatial domain basis matrix for the second transmission mode in the first subset, the method further comprising:

determining the respective precoding matrix for the transmission mode in the second subset based at least in part on a block diagonalization of a first product and a second product, the first product being of the spatial domain basis matrix for the first transmission mode in the first subset, the first alternative coefficient matrix, and the frequency domain basis matrix for the first transmission mode in the first subset and the second product being of the second spatial domain basis matrix for the second transmission mode in the first subset, the second alternative coefficient matrix, and a second frequency domain basis matrix for the second transmission mode in the first subset.

28. The method of claim 17, wherein the plurality of transmission reception points comprises three of more transmission reception points, and wherein the second subset of the plurality of transmission modes comprises two or more transmission modes.

29. An apparatus for wireless communication, comprising:

one or more processors of a user equipment (UE), memory coupled with the one or more processors; and instructions stored in the memory and executable by the one or more processors individually or collectively to cause the apparatus to:

receive, at the UE, a request for precoding matrix information related to a plurality of transmission modes associated with a plurality of transmission reception points for a network device;

transmit, from the UE to the network device, a respective precoding matrix information report for each transmission mode in a first subset of the plurality of transmission modes, wherein each transmission mode in the first subset of the plurality of transmission modes corresponds to transmission from a single transmission reception point of the plurality of transmission reception points; and transmit, from the UE to the network device, a respective partial precoding matrix information report for each transmission mode in a second subset of the plurality of transmission modes, wherein each transmission mode in the second subset of the plurality of transmission modes corresponds to transmission from at least two transmission reception points of the plurality of transmission reception points, wherein the respective partial precoding matrix information report for each transmission mode in the second subset indicates a set of respective multiple columns selected by the UE as sub-portions of a respective matrix for each transmission reception point of a combination of transmission reception points associated with a respective transmission mode in the second subset, wherein a respective precoding matrix associated with each transmission mode in the second subset corresponds to a block diagonalization of the set of respective multiple columns selected for each respective transmission reception point of the combination of transmission reception points associated with the respective transmission mode, and wherein each respective partial precoding matrix information report comprises a smaller quantity of bits than each respective precoding matrix information report.

30. The apparatus of claim 29, wherein the instructions are further executable by the one or more processors individually or collectively to cause the apparatus to:

determine, for each transmission mode in the first subset, a respective first set of values for a respective spatial domain basis matrix; and determine, for each transmission mode in the first subset, a respective second set of values for a respective coefficient matrix, each element of the respective coefficient matrix comprising a coefficient for a corresponding beam within a corresponding transmission layer, wherein:

the respective precoding matrix information report for a transmission mode in the first subset indicates the respective first set of values and the respective second set of values for the transmission mode in the first subset.

31. The apparatus of claim 29, wherein the instructions are further executable by the one or more processors individually or collectively to cause the apparatus to:

determine, for each transmission mode in the first subset, a respective first set of values for a respective spatial domain basis matrix;

determine, for each transmission mode in the first subset, a respective second set of values for a respective coefficient matrix, wherein elements of the respective coefficient matrix comprise linear combination coefficients for a set of beams; and determine, for each transmission mode in the first subset, a respective third set of values for a respective frequency domain basis matrix, wherein:

the respective precoding matrix information report for a transmission mode in the first subset indicates the respective first set of values, the respective second set of values, and the respective third set of values for the transmission mode in the first subset.

32. The apparatus of claim 29, wherein:

the respective precoding matrix information report for a transmission mode in the first subset comprises a first quantity of information; and the respective partial precoding matrix information report for a transmission mode in the second subset comprises a second quantity of information that is less than the first quantity of information.

33. The apparatus of claim 29, wherein the plurality of transmission reception points comprises three of more transmission reception points, and wherein the second subset of the plurality of transmission modes comprises two or more transmission modes.

34. An apparatus for wireless communication, comprising:

one or more processors of a network device, memory coupled with the one or more processors; and instructions stored in the memory and executable by the one or more processors individually or collectively to cause the apparatus to:

transmit, from the network device to a user equipment (UE), a request for precoding matrix information related to a plurality of transmission modes associated with a plurality of transmission reception points for the network device;

receive, at the network device from the UE, a respective precoding matrix information report for each transmission mode in a first subset of the plurality of transmission modes, wherein each transmission mode in the first subset of the plurality of transmission modes corresponds to transmission from a single transmission reception point of the plurality of transmission reception points;

receive, at the network device from the UE, a respective partial precoding matrix information report for each transmission mode in a second subset of the plurality of transmission modes, wherein each transmission mode in the second subset of the plurality of transmission modes corresponds to transmission from at least two transmission reception points of the plurality of transmission reception points, wherein the respective partial precoding matrix information report for each transmission mode in the second subset indicates a set of respective multiple columns that are sub-portions of a respective matrix for each transmission reception point of a combination of transmission reception points associated with a respective transmission mode in the second subset, wherein a respective precoding matrix associated with each transmission mode in the second subset corresponds to a block diagonalization of the set of respective multiple columns for each respective transmission reception point of the combination of transmission reception points associated with the respective transmission mode, and wherein each respective partial precoding matrix information report comprises a smaller quantity of bits than each respective precoding matrix information report;

determine the respective precoding matrix for a transmission mode in the second subset based at least in part on a first precoding matrix information report for a first transmission mode in the first subset, a second precoding matrix information report for a second transmission mode in the first subset, and a partial precoding matrix information report for the transmission mode in the second subset; and communicate with the UE based at least in part on the respective precoding matrix for the transmission mode in the second subset.

35. An apparatus for wireless communication, comprising:

means for receiving, at a user equipment (UE), a request for precoding matrix information related to a plurality of transmission modes associated with a plurality of transmission reception points for a network device;

means for transmitting, from the UE to the network device, a respective precoding matrix information report for each transmission mode in a first subset of the plurality of transmission modes, wherein each transmission mode in the first subset of the plurality of transmission modes corresponds to transmission from a single transmission reception point of the plurality of transmission reception points; and means for transmitting, from the UE to the network device, a respective partial precoding matrix information report for each transmission mode in a second subset of the plurality of transmission modes, wherein each transmission mode in the second subset of the plurality of transmission modes corresponds to transmission from at least two transmission reception points of the plurality of transmission reception points, wherein the respective partial precoding matrix information report for each transmission mode in the second subset indicates a set of respective multiple columns selected by the UE as sub-portions of a respective matrix for each transmission reception point of a combination of transmission reception points associated with a respective transmission mode in the second subset, wherein a respective precoding matrix associated with each transmission mode in the second subset corresponds to a block diagonalization of the set of respective multiple columns selected for each respective transmission reception point of the combination of transmission reception points associated with the respective transmission mode, and wherein each respective partial precoding matrix information report comprises a smaller quantity of bits than each respective precoding matrix information report.

* * * * *